United States Patent
Lee et al.

(10) Patent No.: US 10,757,518 B2
(45) Date of Patent: *Aug. 25, 2020

(54) COMPACT PUBLIC ADDRESS ACCESS POINT APPARATUSES

(71) Applicant: Ubiquiti Inc., New York, NY (US)

(72) Inventors: Jude Lee, San Jose, CA (US); Mark A. Blanchard, San Jose, CA (US); Robert J. Pera, Seattle, WA (US)

(73) Assignee: Ubiquiti Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,034

(22) Filed: Oct. 29, 2018

(65) Prior Publication Data

US 2019/0069108 A1 Feb. 28, 2019

Related U.S. Application Data

(63) Continuation of application No. 15/262,564, filed on Sep. 12, 2016, now Pat. No. 10,136,233.

(Continued)

(51) Int. Cl.
*H04R 27/00* (2006.01)
*H04W 88/08* (2009.01)
(Continued)

(52) U.S. Cl.
CPC ............. *H04R 27/00* (2013.01); *H04R 1/24* (2013.01); *H04W 88/08* (2013.01); *H04L 12/10* (2013.01);
(Continued)

(58) Field of Classification Search
CPC ...... H04R 27/00; H04R 1/2803; H04R 1/345; H04R 2227/003; H04R 2420/09; H04W 88/08; H04L 12/10
See application file for complete search history.

(56) References Cited

U.S. PATENT DOCUMENTS

| 2,455,888 A | 12/1948 | Brown |
| 2,460,869 A | 2/1949 | Braden |

(Continued)

FOREIGN PATENT DOCUMENTS

| CN | 202042599 U | 11/2011 |
| EP | 2416449 A1 | 2/2012 |

(Continued)

OTHER PUBLICATIONS

Schulz et al.; U.S. Appl. No. 16/430,326 entitled "Radio system for long-range high-speed wireless communication," filed Jun. 3, 2019.

(Continued)

*Primary Examiner* — Tuan D Nguyen

(74) *Attorney, Agent, or Firm* — Shay Glenn LLP

(57) ABSTRACT

Apparatuses that operate as both a public address speaker and a wireless access point (AP) for mounting to a ceiling or wall. The compact public address access points described herein may include an AP housing, enclosing a radio (e.g., a 3×3 MIMO radio) and antenna, that is coupled to a speaker assembly including a speaker, a conical acoustic reflector positioned between a front of the speaker and the housing of the AP, and an annular region comprising a concave inner wall facing the conical acoustic reflector. Although the AP is nested atop the front of the speaker, the speaker may produce high-quality sound with accurate voice reproduction without interfering with the operation of the wireless transmission of the AP. Methods of operating and installing these apparatuses are also described.

22 Claims, 43 Drawing Sheets

Related U.S. Application Data

(60) Provisional application No. 62/217,779, filed on Sep. 11, 2015.

(51) Int. Cl.
*H04R 1/24* (2006.01)
*H04R 1/34* (2006.01)
*H04R 1/28* (2006.01)
*H04L 12/10* (2006.01)

(52) U.S. Cl.
CPC ............ *H04R 1/2803* (2013.01); *H04R 1/345* (2013.01); *H04R 2201/021* (2013.01); *H04R 2201/028* (2013.01); *H04R 2227/003* (2013.01); *H04R 2420/07* (2013.01)

(56) References Cited

U.S. PATENT DOCUMENTS

| | | |
|---|---|---|
| 3,140,491 A | 7/1964 | Ashbaugh et al. |
| 3,599,219 A | 8/1971 | Holtum et al. |
| 3,739,392 A | 6/1973 | Ross et al. |
| 4,578,638 A | 3/1986 | Takano et al. |
| 4,598,178 A * | 7/1986 | Rollins .................. H04R 9/06 381/354 |
| 4,626,863 A | 12/1986 | Knop et al. |
| 4,788,554 A | 11/1988 | Smith |
| 4,918,459 A | 4/1990 | De Teso |
| 5,010,348 A | 4/1991 | Rene et al. |
| 5,131,006 A | 7/1992 | Kamerman et al. |
| 5,151,920 A | 9/1992 | Haagh et al. |
| 5,295,154 A | 3/1994 | Meier et al. |
| 5,374,911 A | 12/1994 | Kich et al. |
| 5,402,136 A | 3/1995 | Goto et al. |
| 5,406,260 A | 4/1995 | Cummings et al. |
| 5,422,887 A | 6/1995 | Diepstraten et al. |
| 5,428,636 A | 6/1995 | Meier |
| 5,446,792 A | 8/1995 | Sango |
| 5,504,746 A | 4/1996 | Meier |
| 5,521,983 A * | 5/1996 | Thompson, III ......... H03G 5/00 381/94.1 |
| 5,546,397 A | 8/1996 | Mahany |
| 5,625,365 A | 4/1997 | Tom et al. |
| 5,706,428 A | 1/1998 | Boer et al. |
| 5,740,366 A | 4/1998 | Mahany et al. |
| 5,760,739 A | 6/1998 | Pauli |
| 5,760,749 A | 6/1998 | Minowa et al. |
| 5,844,893 A | 12/1998 | Gollnick et al. |
| 5,907,310 A | 5/1999 | Seewig et al. |
| 5,936,542 A | 8/1999 | Kleinrock et al. |
| 5,940,771 A | 8/1999 | Gollnick et al. |
| 5,943,430 A | 8/1999 | Saitoh |
| 6,130,892 A | 10/2000 | Short et al. |
| 6,137,449 A | 10/2000 | Kildal |
| 6,169,522 B1 | 1/2001 | Ma et al. |
| 6,184,840 B1 * | 2/2001 | Hsin-Loug ............... H01Q 1/42 343/781 P |
| 6,194,992 B1 | 2/2001 | Short et al. |
| 6,337,990 B1 | 1/2002 | Koshino |
| 6,374,311 B1 | 4/2002 | Mahany et al. |
| 6,437,757 B1 | 8/2002 | Butler |
| 6,522,305 B2 | 2/2003 | Sharman |
| 6,563,786 B1 | 5/2003 | Nee |
| 6,636,894 B1 | 10/2003 | Short et al. |
| 6,665,536 B1 | 12/2003 | Mahany |
| 6,697,415 B1 | 2/2004 | Mahany |
| 6,714,559 B1 | 3/2004 | Meier |
| 6,789,110 B1 | 9/2004 | Short et al. |
| 6,795,035 B2 | 9/2004 | Jocher |
| 6,795,852 B1 | 9/2004 | Kleinrock et al. |
| 6,810,426 B2 | 10/2004 | Mysore et al. |
| 6,857,009 B1 | 2/2005 | Ferreria et al. |
| 6,868,399 B1 | 3/2005 | Short et al. |
| 6,970,680 B1 | 11/2005 | Tomoe |
| 7,020,082 B2 | 3/2006 | Bhagavath et al. |
| 7,088,727 B1 | 8/2006 | Short et al. |
| 7,117,526 B1 | 10/2006 | Short |
| 7,155,196 B1 | 12/2006 | Beard |
| 7,194,554 B1 | 3/2007 | Short et al. |
| 7,197,556 B1 | 3/2007 | Short et al. |
| 7,254,191 B2 | 8/2007 | Sugar et al. |
| 7,295,165 B2 | 11/2007 | Ferguson et al. |
| 7,295,812 B2 | 11/2007 | Haapoja et al. |
| 7,386,002 B2 | 6/2008 | Meier |
| 7,457,646 B2 | 11/2008 | Mahany et al. |
| 7,577,398 B2 | 8/2009 | Judd et al. |
| 7,656,363 B2 | 2/2010 | Devicque et al. |
| 7,715,800 B2 | 5/2010 | Sinha |
| 7,739,383 B1 | 6/2010 | Short et al. |
| 7,752,334 B2 | 7/2010 | Paunikar et al. |
| 7,800,551 B2 | 9/2010 | McCown |
| 7,826,426 B1 | 11/2010 | Bharghavan et al. |
| 8,077,113 B2 | 12/2011 | Syed et al. |
| 8,190,708 B1 | 5/2012 | Short et al. |
| 8,335,272 B2 | 12/2012 | Roberts |
| 8,385,869 B2 | 2/2013 | Feenaghty et al. |
| 8,466,847 B2 | 6/2013 | Pera et al. |
| 8,483,188 B2 | 7/2013 | Walton et al. |
| 8,493,279 B2 | 7/2013 | Pera et al. |
| 8,581,795 B2 | 11/2013 | Simms et al. |
| 8,804,622 B1 * | 8/2014 | Thai .................. H04W 4/00 370/328 |
| 8,836,601 B2 | 9/2014 | Sanford et al. |
| 9,151,572 B1 | 10/2015 | Sieracki |
| 9,191,037 B2 | 11/2015 | Lascari et al. |
| 9,397,820 B2 | 7/2016 | Schulz et al. |
| 9,490,533 B2 | 11/2016 | Sanford et al. |
| 9,496,620 B2 | 11/2016 | Schulz et al. |
| 9,543,635 B2 | 1/2017 | Schulz et al. |
| 9,634,373 B2 | 4/2017 | Lee et al. |
| 9,912,034 B2 | 3/2018 | Sanford et al. |
| 9,941,570 B2 | 4/2018 | Sanford et al. |
| 9,972,912 B2 | 5/2018 | Schulz et al. |
| 10,069,580 B2 | 9/2018 | Hardy et al. |
| 10,136,233 B2 | 11/2018 | Lee et al. |
| 2002/0044032 A1 | 4/2002 | Guguen et al. |
| 2002/0098805 A1 | 7/2002 | King |
| 2003/0032398 A1 | 2/2003 | Harris |
| 2003/0038753 A1 | 2/2003 | Mahon |
| 2003/0203743 A1 | 10/2003 | Sugar et al. |
| 2003/0207669 A1 | 11/2003 | Kroeger |
| 2003/0221304 A1 | 12/2003 | Janssen et al. |
| 2003/0224801 A1 | 12/2003 | Lovberg et al. |
| 2004/0071298 A1 | 4/2004 | Geeng |
| 2004/0108966 A1 | 6/2004 | McKivergan et al. |
| 2005/0245254 A1 | 11/2005 | Hall |
| 2006/0001589 A1 | 1/2006 | Nicolae |
| 2006/0007044 A1 | 1/2006 | Crouch et al. |
| 2006/0009177 A1 | 1/2006 | Persico et al. |
| 2007/0057860 A1 | 3/2007 | Jaffer et al. |
| 2007/0132651 A1 | 6/2007 | Nilsson |
| 2007/0157482 A1 | 7/2007 | Wallace |
| 2008/0199037 A1 | 8/2008 | Xu et al. |
| 2008/0224938 A1 | 9/2008 | Udagawa et al. |
| 2008/0240313 A1 | 10/2008 | Deisher et al. |
| 2008/0261548 A1 | 10/2008 | Krone |
| 2008/0297425 A1 | 12/2008 | Axton et al. |
| 2009/0174622 A1 | 7/2009 | Kanou |
| 2009/0295677 A1 | 12/2009 | Grattan et al. |
| 2009/0310721 A1 | 12/2009 | Redfern et al. |
| 2010/0013729 A1 | 1/2010 | Harel et al. |
| 2010/0053022 A1 | 3/2010 | Mak et al. |
| 2010/0152600 A1 | 6/2010 | Droitcour et al. |
| 2010/0245187 A1 | 9/2010 | Omuro et al. |
| 2010/0285769 A1 | 11/2010 | Conroy et al. |
| 2010/0289705 A1 | 11/2010 | Shtrom et al. |
| 2011/0012801 A1 | 1/2011 | Monte et al. |
| 2011/0068988 A1 | 3/2011 | Monte |
| 2011/0168480 A1 | 7/2011 | Sterling et al. |
| 2011/0181479 A1 * | 7/2011 | Martin ................. H01Q 13/025 343/756 |
| 2011/0258678 A1 | 10/2011 | Cowling et al. |
| 2012/0013516 A1 | 1/2012 | Ahn et al. |
| 2012/0176608 A1 | 7/2012 | McCown |

(56) References Cited

U.S. PATENT DOCUMENTS

| | | |
|---|---|---|
| 2012/0213086 A1 | 8/2012 | Matsuura |
| 2012/0250793 A1 | 10/2012 | Khatana et al. |
| 2013/0002515 A1 | 1/2013 | Hills et al. |
| 2013/0012134 A1 | 1/2013 | Jin et al. |
| 2013/0017794 A1 | 1/2013 | Kloper et al. |
| 2013/0028150 A1 | 1/2013 | Ma et al. |
| 2013/0135146 A1 | 5/2013 | Ransom et al. |
| 2013/0154894 A1 | 6/2013 | Caimi et al. |
| 2013/0163770 A1 | 6/2013 | Takemura |
| 2013/0249754 A1 | 9/2013 | Rice |
| 2013/0271337 A1 | 10/2013 | Lee et al. |
| 2014/0118220 A1 | 5/2014 | Ley |
| 2014/0169194 A1 | 6/2014 | Banerjee et al. |
| 2014/0274177 A1 | 9/2014 | Carbajal |
| 2014/0315599 A1 | 10/2014 | Teichmann et al. |
| 2015/0133060 A1 | 5/2015 | Duan |
| 2015/0292948 A1 | 10/2015 | Goldring et al. |
| 2015/0349427 A1 | 12/2015 | Camden et al. |
| 2016/0112074 A1 | 4/2016 | Lascari et al. |
| 2016/0183353 A1 | 6/2016 | Louh et al. |
| 2016/0218406 A1 | 7/2016 | Sanford |
| 2017/0229773 A1 | 8/2017 | Lee et al. |
| 2018/0233799 A1 | 8/2018 | Sanford et al. |
| 2018/0261926 A1 | 9/2018 | Schulz et al. |
| 2018/0269554 A1 | 9/2018 | Sanford |
| 2019/0280788 A1 | 9/2019 | Hardy et al. |

FOREIGN PATENT DOCUMENTS

| | | |
|---|---|---|
| JP | S54-95157 U | 7/1979 |
| JP | 2002299940 A | 10/2002 |
| JP | 2007259001 A | 10/2007 |
| JP | 2010192992 A | 9/2010 |
| JP | 2012227863 A | 11/2012 |
| KR | 10-20080079357 A | 9/2008 |
| KR | 200450128 Y1 | 8/2010 |
| KR | 101023789 B1 | 3/2011 |
| KR | 101068766 B1 | 9/2011 |
| WO | WO98/40990 A1 | 9/1998 |
| WO | WO01/31855 A2 | 5/2001 |
| WO | WO01/31886 A2 | 5/2001 |
| WO | WO01/86877 A2 | 11/2001 |
| WO | WO2008/042804 A2 | 4/2008 |
| WO | WO2008/154514 A2 | 12/2008 |
| WO | WO2009/131219 A1 | 10/2009 |
| WO | WO2011/005710 A2 | 1/2011 |
| WO | WO20131071810 A1 | 5/2013 |

OTHER PUBLICATIONS

Le-Ngoc et al.; Design aspects and performance evaluation of ATCS mobile data link; IEEE 39th; InVehicular Technology Conference; pp. 860-867; May 1, 1989.

Hardy et al.; U.S. Appl. No. 16/112,000 entitled "Wireless radio device alignment tools and methods," filed Aug. 24, 2018.

Lascar et al., U.S. Appl. No. 16/232,858 entitled "Wireless radio system optimization by persistent spectrum analysis," filed Dec. 26, 2018.

\* cited by examiner

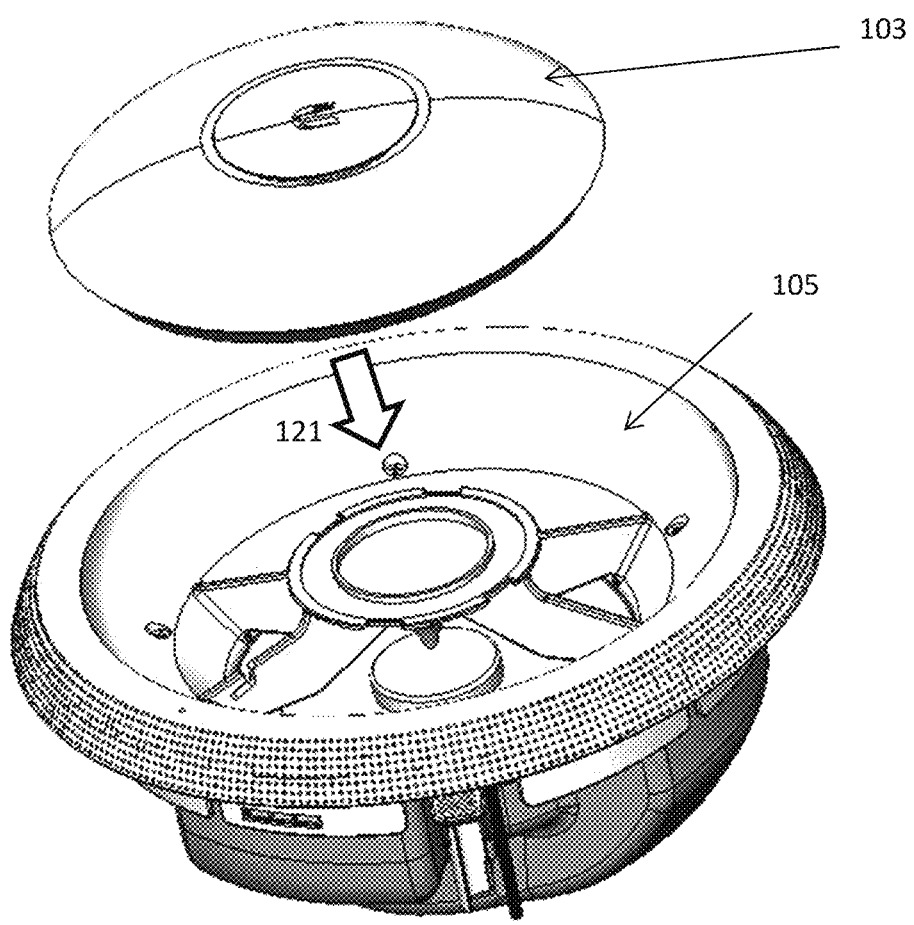
FIG. 5
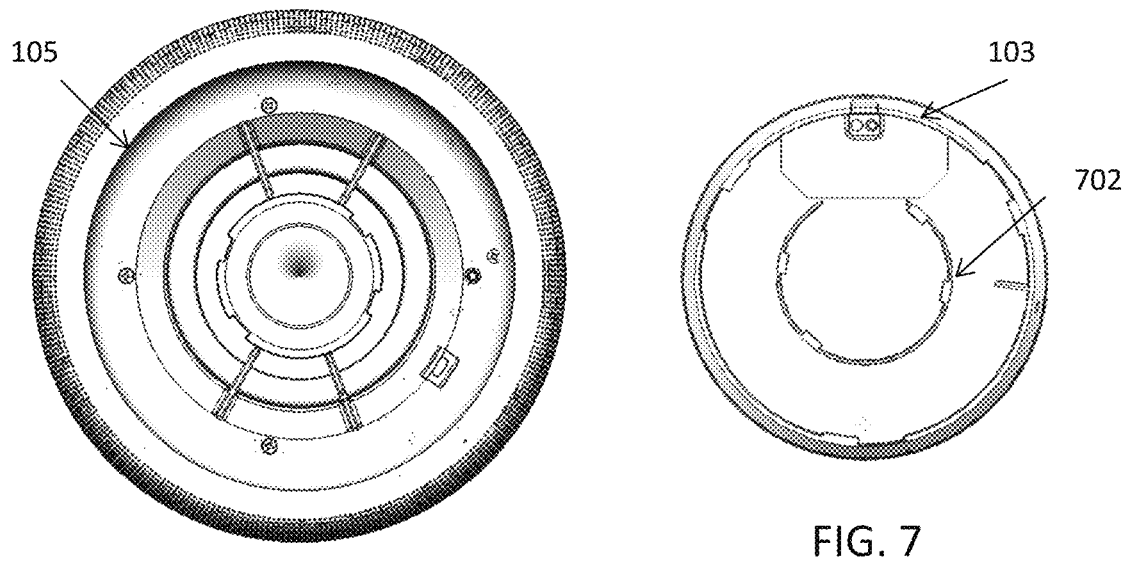
FIG. 6
FIG. 7

4057

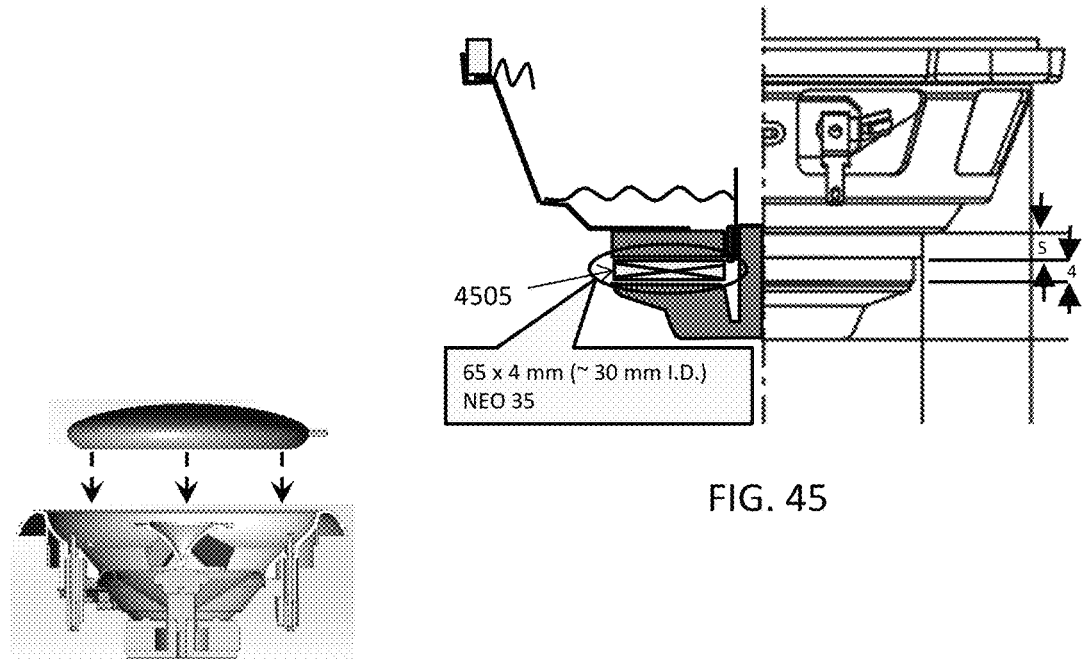
FIG. 45
FIG. 46
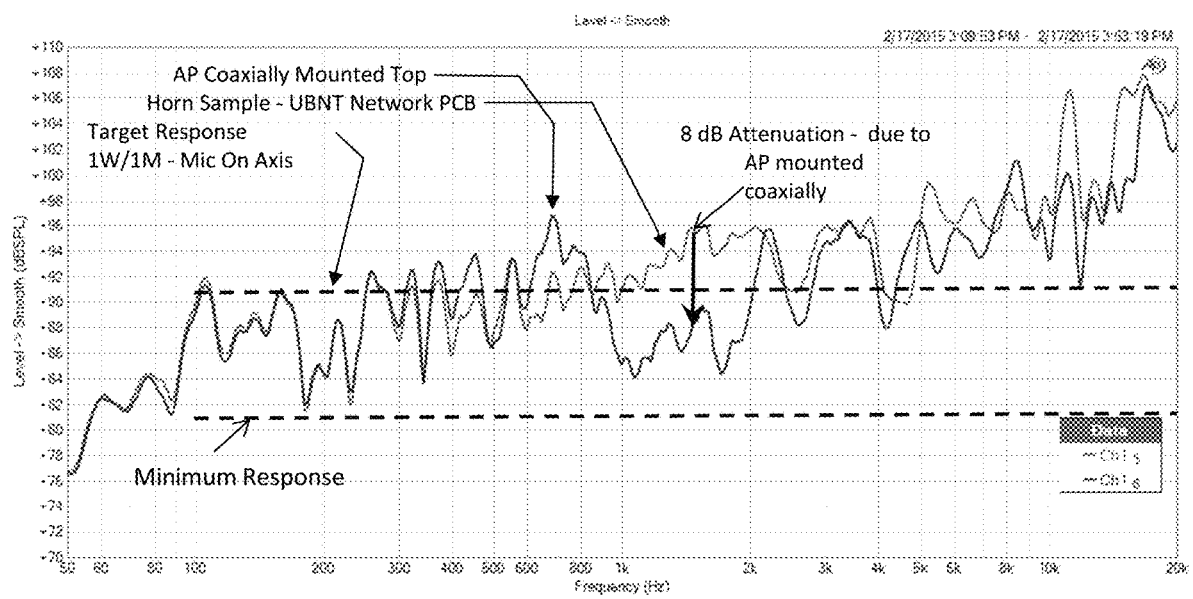
FIG. 47

Operation of combined speaker/AP

Mesh Configuration

Engineering Specification - Low Cost Ceiling Speaker
Frequency Response: 80 - 15,000 Hz, ±5 dB
Power-Handling Capacity: ..........................................10 watts
(per EIA RS-426-A 1980 (80 - 15,000 Hz bandlimited pink noise, 6
dB crest factor):
Impedance:
Nominal: ..............................................................8 ohms
Minimum: ............................................... 7 ohms (230 Hz)
Sound Pressure Level: ..................................................... 94 dB
(at 1 Meter, 1 Watt Input, 200-4,000 Hz Average)
Maximum SPL: ........................................ 104 dB for 10W @ 1M
Voice-Coil Diameter: ......................................... 2.54 cm (1.0 in.)
Magnet Weight: ............................................... 0.32 kg (0.72 lb)
Magnet Material: ..................................................Barium Ferrite
Flux Density: ............................................................. 1.0 Tesla
Diaphragm.................... Pulp Cone with whizzer cone(Treated)

Speaker Frame: .................................. 22-gauge stamped steel
Frame Color: .................................................. Black, Powder Coat
Dimensions:
Diameter: ............................................... 20.6 cm (8.1 in.)
Height: ..................................................... 7.0 cm (2.75 in.)
Transformer Input:
Distribution .................................... 25/70.7 (100 volt operation)
Speaker Grill...................Punched Aluminum,     White Color
Hardware .........................Stainless Steel (Weather Resistant)

FIG. 66

COMPACT PUBLIC ADDRESS ACCESS POINT APPARATUSES

CROSS REFERENCE TO RELATED APPLICATIONS

This application is a continuation of U.S. patent application Ser. No. 15/262,564, titled "COMPACT PUBLIC ADDRESS ACCESS POINT APPARATUSES", filed Sep. 12, 2016; which application claims the benefit of priority of U.S. Provisional Application No. 62/217,779, titled "SPEAKER INTERFACES FOR WIRELESS ACCESS POINTS", filed Sep. 11, 2015; all of which are herein incorporated by reference in their entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Speaker apparatuses (including public address systems) configured for mounting to a ceiling or wall for integration with a wireless access point.

BACKGROUND

A wireless access point (AP) may be a device that allows wireless devices to connect to a wired network using WiFi, Bluetooth, or another local wireless networking standard. A mobile device such as a laptop, smartphone, or tablet computer may be configured to automatically connect to a wireless access point when the mobile device is in range of a compatible wireless access point.

A wireless access point may have a relatively short range, such as about 20 meters. However, multiple overlapping wireless access points may be used to cover relatively large areas. For example, a commercial premises such as a hospital, airport, or retail outlet, may install a network of wireless access points throughout the premises. Mobile devices, of users moving throughout the premises, may automatically switch to an in-range wireless access point, to thereby provide the users with seamless network connectivity throughout the premises.

Access points may be mounted to walls, ceilings, etc.

Generally, audio speaker systems are maintained within their own physical housing, which may also be mounted to walls, ceilings, etc. In particular, public address speakers (e.g., speakers having sufficient audio capabilities for projecting within a large room) may be mounted to a ceiling.

To date, a speaker (and particularly a public address speaker) that physically interfaces with, e.g., mounts and provides data/power input to, a wireless access point has not been suggested. As described herein, although challenging to design and implement, such apparatuses (systems and devices) may provide numerous surprising advantages.

SUMMARY OF THE DISCLOSURE

In general, described herein are compact public address access point (AP) apparatuses and methods of using (and installing) them. Typically, such devices include one or more speakers (e.g., tweeters, woofers, etc.) coupled to a mounting or holding frame and one or more mounts, such as clamp brackets, and an access point, which may include an access point housing (AP housing) enclosing a radio and antenna. The combination of the one or more speakers, the frame and/or the mount may be referred to as a speaker assembly; the access point housing may be referred to as the access point assembly.

In order to achieve a compact form, the apparatuses (which may include devices and systems) may be preferentially arranged with the AP housing on an outermost-facing portion with the speaker recessed and at least partially (or completely) blocked by the AP housing. Although this would appear to be less optimal, particularly where the AP housing is formed of a solid, rigid or semi-rigid material, such as a plastic/polymeric, metal, ceramic or any other material, which would otherwise block any sound emitted by the speaker, it is surprisingly effective, as it may allow better wireless operation, at least in part because any magnetic components of the speaker (e.g., speaker coil, etc.) may be kept relatively close to the antenna and wireless (e.g., Wi-Fi_33) components of the AP, but in a portion that would otherwise prevent distortion and interference, such as behind the AP, towards the ceiling or wall. Instead, the apparatuses described herein may be configured so that the apparatus includes one or more components, such as frame components that efficiently direct sound from the speaker(s) in the forward direction and in a desired spread away from the apparatus. For example, any of the apparatuses described herein may include a frame to which the speaker is secured with the AP (e.g., AP housing) mounted in front of the speaker, and an acoustic reflector directing sound around the otherwise occlusive AP. For example, the frame to which the speaker(s) is/are mounted may include a conical acoustic reflector in front of the speaker, oriented with the direction of the conical acoustic reflector (some of which embodiments described herein may be referred to as a "horn") is oriented so the direction of the apex of the conical acoustic reflector is directed towards the face of the speaker (from which sound is emitted). The conical acoustic reflector may have a generally conical shape, which may be truncated (e.g., the apex of the conical acoustic reflector may be snubbed or shortened). The sidewall of the conical acoustic reflector may be concave, so that a section through the conical acoustic reflector may have a trumpet shape. In operation, is is the outer surface of this conical acoustic reflector that is used to reflect sound from the speaker to be emitted around the AP. The frame may also include a second acoustically reflective opposite from the conical acoustic reflector, such as an annular ring or perimeter. An annular region may surround (or partially surround) the AP housing when the AP housing is mounted to the frame; sound may be emitted from between the annular region and the AP housing down and away from the AP (e.g., into a room, when the apparatus is mounted to a ceiling).

These devices may include additional sound filtering, including passive or active sound filtering, including baffles, phase plug(s) or acoustical transformer(s), or the like. In general, these apparatuses may be particularly well suited for transmission of human speech (e.g., between 80 and 300 Hz).

In addition, the compact apparatuses described herein may include one or more microphones for receiving sound input (allowing the apparatus to operate as a two-way public address system). The microphone may be mounted to the frame, the AP, or coupled to the speaker. In particular, the microphone(s) may be on an external surface of the frame, including the annular region.

The apparatuses described herein may be operated together as part of a public address system, and may be controlled to provide synchronous-sounding activity, so that even devices operated within the same open space (e.g., outside or inside, e.g., a hallway, large room, warehouse, etc.) may produce an acoustically clear sound quality.

The apparatuses described herein operate as both public address (acoustic) speakers and/or microphones and access points (e.g., mesh access points, etc.). The apparatus may receive both power and data from the same connection (e.g., a power-over-Ethernet connection) or through separate power and data sources). The apparatus may include audio circuitry coupled to the speaker (e.g., speaker driver, acoustic encoder, digital to analog (D/A) converters, etc.); this acoustic or audio circuitry may be part of a circuitry such as a PCB or other substrate that is housed within the frame, and/or coupled to the frame. For example any of these apparatuses may include a digital to analog (D/A) converter and an analog amplifier coupled to the speaker. Data (sound signals) may be transmitted to the AP, e.g., from the network via the network (e.g., Ethernet) connection, and may drive the speaker. In parallel, data (digital data signals) may be transmitted and received by the AP and communicated to the network. The acoustic signals transmitted may be digital or analog, or some combination thereof. The apparatus may be configured to receive acoustic information for broadcasting from the speaker by a dedicated device, or a device running software (e.g., a smartphone, or other hand held electronics device) that can transmit the acoustic signal(s) to the apparatus for emission by the speaker. A remote (e.g., network) server may coordinate the operation of the speaker, including transmitting acoustic signals to/from one or more apparatuses.

For example, described herein are compact public address access point (AP) apparatuses including: a speaker having a front from which sound is projected; a frame mounted over the speaker, the frame comprising: a conical acoustic reflector centered over the front of the speaker, and an annular region surrounding the conical acoustic reflector, wherein the annular region comprises a concave inner wall facing the conical acoustic reflector; an access point (AP) housing mounted to the frame so that the AP housing covers the front of the speaker and the conical acoustic reflector is between the AP housing and the front of the speaker, wherein an outer surface of the AP housing is opposite from the concave inner wall of the annular region of the frame; and an antenna and a radio housed within the AP housing and configured to connect a plurality of wireless devices to a network.

A compact public address access point (AP) apparatus may include: a speaker having a front from which sound is projected; a frame mounted over the speaker, the frame comprising a conical acoustic reflector centered over a central region of the front of the speaker, wherein the conical acoustic reflector tapers towards a point in a direction of the speaker, and an annular region surrounding the conical acoustic reflector, wherein the annular region comprises a concave inner wall facing the conical acoustic reflector; a microphone coupled to the frame; and an AP housing mounted to the frame so that the AP housing covers the front of the speaker and the conical acoustic reflector is between the AP housing and the front of the speaker, wherein an outer surface of the AP housing is opposite from the concave inner wall of the annular region of the frame, further wherein the AP housing encloses an antenna and a radio configured to connect a plurality of wireless devices to a network.

As mentioned, the conical acoustic reflector may have a concave outer profile (e.g., through the tapering side of the conical reflector). The conical acoustic reflector may be made of any appropriate material(s), including a polymeric (e.g., plastic) material. The conical acoustic reflector may be oriented in the apparatus so that it tapers as it approaches the front of the speaker.

Any of these apparatuses may include a network connector coupled to the frame and configured to couple a cable (e.g., Ethernet, such as PoE) in communication with a network.

In any of these variations, the AP housing may be removable, e.g., by screwing on or off, from the rest of the apparatus (such as the speaker assembly). The AP housing may be configured to attach to the base of the conical acoustic reflector, and/or to the frame, including to one or more struts extending between the conical acoustic reflector and the annular region. In general, the annular region may form a recess into which the AP housing may be partially recessed. For example, the AP housing may be recessed within the annular region.

Any of these apparatuses may include a mount, such as (but not limited to) a clamp mount, including a plurality of clamps, on a lateral and/or back side of the frame. The clamps may be configured to compress a portion of a ceiling surface/wall between each clamp and the frame.

As mentioned, any of these apparatuses may include a circuitry coupled to the frame and configured to receive input from a network connection to drive the speaker.

In general, an Ethernet connection (e.g., a power over Ethernet connection) may be included and configured to connect to a power and/or Ethernet source to provide power to the radio and speaker. This connection may be on a back or lateral surface of the apparatus, including on or in the frame of the apparatus (e.g., on a back cover of the apparatus). The apparatus may also include one or more connectors between the speaker assembly portion of the apparatus and the AP housing portion. For example, the apparatus may include an Ethernet connection within the annular region configured to connect to the AP housing and provide data and power to the radio. Any of these apparatuses may include an Ethernet dongle, USB dongle, or both Ethernet dongle and USB dongle passing through an axis of the speaker.

As mentioned above, any of the these apparatuses may include a two-way acoustic transducer and filter network coupled to the speaker. These apparatuses may include a conical phase plug on a central axis of speaker for improvement of bandwidth and polar directivity pattern.

Any appropriate AP circuitry may be included. For example, the AP housing may enclose one or more antenna (e.g., an array, including a phase array, antenna), and one or more radio (receiver/transmitter) chains. For example, in some variations the AP radio may be a dual-radio AP. The AP radio may be, in some examples, configured to support simultaneous dual-band, 3×3 MIMO operation in the 2.4 and 5 GHz radio bands for up to 1750 Mbps. Thus, the radio may be configured as a 3×3 MIMO radio.

In general, the compact public address access point apparatuses described herein may have a "stacked" arrangement, such that the AP is in front of (rather than alongside) of the one or more speakers. Despite this counterintuitive arrangement, which would otherwise block the speaker and potentially interfere with the sound quality, the apparatuses described herein may be adapted to provide a high-quality sound performance with accurate voice reproduction. For example, any of the apparatuses described herein may be adapted such that the speaker, conical acoustic reflector and annular region are arranged and configured so that an acoustic signal of between, e.g., 70 Hz and 20 kHz (e.g., between 80 Hz and 20 kHz, between 90 Hz and 20 kHz, between 100 Hz and 20 kHz, etc.) that is emitted by the compact public address access point (during normal operation, e.g., when the access point is mounted over the speaker) is greater than a minimum level (e.g., greater than 75 dBSPL, greater than 78 dbSPL, greater than 80 dBSPL, greater than 82 dBSPL, greater than 85 dbSPL, greater than 87 dbSPL, greater than 90 dBSPL, etc, greater than 92 dBSPL, greater than 95 dBSPL, etc.).

Also described herein are methods of operating any of the apparatuses described herein. For example, a method of making a public address from a wireless access point (AP). Such a method may include: receiving a public address signal indicated for audio broadcast at a compact public address AP apparatus; and emitting the public address signal as an audible signal from a speaker of the compact public address AP, wherein the speaker is mounted behind a housing of the AP, the housing enclosing an antenna and radio, so that the audible signal is projected from a front of the speaker and reflected from a conical acoustic reflector positioned between the front of the speaker and the housing of the AP so that the audible signal is directed out of an annular region surrounding the conical acoustic reflector and housing of the AP, wherein the annular region comprises a concave inner wall facing the conical acoustic reflector.

A method of method of making a public address from a wireless access point (AP) may include: wirelessly transmitting a public address signal from a handheld device, wherein the public address signal is indicated for audio broadcast; receiving the public address signal at a compact public address AP apparatus; and emitting the public address signal as an audible signal from a speaker of the compact public address AP, wherein the speaker is mounted behind a housing of the AP, the housing enclosing an antenna and radio, so that the audible signal is projected from a front of the speaker and reflected from a conical acoustic reflector positioned between the front of the speaker and the housing of the AP so that the audible signal is directed out of an annular region surrounding the conical acoustic reflector and housing of the AP, wherein the annular region comprises a concave inner wall facing the conical acoustic reflector; wherein the compact public address AP apparatus concurrently connects a plurality of wireless devices to a network to which the radio of the compact public address AP is connected.

In general, any of these methods may include concurrent transmission of data between a network and one or more wireless devices (e.g., acting as a wireless access point) and a transmission (and in some cases receipt) of audio information (e.g., acting as a speaker).

Any of these methods may include wirelessly transmitting the public address signal from a handheld device, wherein the public address signal is indicated for audio broadcast. The compact public address AP apparatus may concurrently connect a plurality of wireless devices to a network to which the radio of the compact public address AP is connected.

These methods may include receiving an audible response signal from a microphone of the compact public address AP, encoding the audible response, and transmitting the encoded audible response signal.

Transmitting the encoded audible response signal may comprise transmitting the encoded audible response signal to the handheld device (e.g., smartphone, smartwatch, pad, etc.) or laptop/desktop.

As mentioned, the radio and antenna of the compact public address AP may concurrently emit the public address signal as an audible signal and simultaneously couple one or a plurality of wireless devices to a network using 3×3 MIMO operation in the 2.4 GHz, 5 GHz or 2.4 and 5 GHz radio bands.

Also described herein are methods of installing a compact public address access point (AP). As mentioned, the compact public address AP may be any of those described herein, e.g., including a speaker surrounded by a frame and an access point housing covering the speaker, further wherein the access point housing may enclose a wireless radio and antenna configured to connect a plurality of wireless devices to a network. A method of installing such a compact public address AP may include: cutting a hole into a ceiling surface; connecting an Ethernet cable from the ceiling into a main port of the compact public address access point for connection to the network; adjusting a plurality of clamp brackets so that the compact public address AP is held within the hole when the clamp brackets hold the ceiling surface between the clamp bracket and the compact public address AP; and applying data and power through the Ethernet connection to the wireless radio and antenna of the AP.

For example, a method of installing a compact public address access point (AP) (e.g., wherein the compact public address access point includes a speaker surrounded by a frame and an access point housing covering the speaker, further wherein the access point housing encloses a wireless radio and antenna configured to connect a plurality of wireless devices to a network) may include: placing a mounting template against a ceiling surface; cutting a hole into a ceiling surface; releasing the access point housing from a speaker assembly of the compact public address access point to expose a conical acoustic reflector positioned between a front of the speaker and the housing of the AP and an annular region comprising a concave inner wall facing the conical acoustic reflector; connecting an Ethernet cable from the ceiling into a main port of the compact public address access point for connection to the network; adjusting a plurality of clamp brackets so that the compact public address access point is held within the hole when the clamp brackets hold the ceiling surface between the clamp bracket and the compact public address access point; connecting a second Ethernet cable between the access point housing and the speaker assembly; connecting a USB connector between the access point housing and the speaker assembly; re-attaching the access point housing to the speaker assembly; and applying data and power through the Ethernet connection to the wireless radio and antenna of the AP.

Thus, any of these method of installing a compact public address access point may include cutting the hole into the ceiling surface by placing a mounting template against the ceiling surface to guide cutting the hole.

In general, any of these methods may include releasing the access point housing from a speaker assembly of the compact public address access point to expose a conical acoustic reflector positioned between a front of the speaker and the housing of the AP and an annular region comprising a concave inner wall facing the conical acoustic reflector. Releasing the access point housing may comprise rotating the access point housing relative to the compact public address access point. Any of these methods may also include connecting a second Ethernet cable between the access point housing and the speaker assembly, and/or connecting a USB connector between the access point housing and the speaker assembly. Any of these methods may also include re-attaching the access point housing to the speaker assembly.

In addition, when installing these compact public address access points, the method may include attaching a safety wire coupled to the compact public address access point to a structural point in the ceiling.

As mentioned, any of these methods (including the method of installing the apparatus) may include concurrently emitting an audible signal from a speaker of the compact public address AP and connecting, via the wireless radio, a plurality of wireless devices to the network.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

In FIG. 2, the compact public address access point is shown with the AP housing (enclosing the radio and antenna and additional AP circuitry) removed.

FIG. 5 illustrates one example of mounting of the AP to the speaker interface (also referred to herein as the speaker assembly).

FIG. 6 shows a top view of the speaker interface, including the engagement region for the AP housing.

FIG. 7 shows a bottom view of an AP housing with a complimentary engagement region.

FIG. 45 is another schematic view of a speaker portion of a compact public address access point apparatus. In this example, a ring magnet (for the speaker) is designed with a very low Mms to keep the efficiency of the speaker high. The speaker is powered by only 8 W USB amp. The target output is 94 dB (1 W/1 M).

FIG. 46 is an illustration of one example of an apparatus (compact public address access point apparatus) in connecting the AP housing (for the AP portion of the apparatus) being mounted over the frame (e.g., the speaker assembly).

FIGS. 47 and 48 illustrate exemplary output for a prototype compact public address access point apparatus over a range of frequencies. These examples are configured as a ceiling mounted compact public address access point apparatus.

In FIG. 51, the mesh configuration shows an overlay of speaker coverage for even SPL mapping. FIG. 52 shows systems that include the compact public address access point apparatuses described herein as well as additional "audio hubs" added to optimize sound patterns on the floor.

In FIG. 53 the speaker is off-set (off of the central axis of the apparatus) relative to the AP housing.

FIG. 54 show another compact public address access point apparatus variation.

FIG. 55 is another example of a compact public address access point apparatus including two speakers.

FIG. 56 is an example of a compact public address access point apparatus showing alternative profiles for the inner acoustic reflector.

FIG. 57 is example showing how the variation of FIG. 56 may be modified, e.g., to increase the curvature.

FIG. 58 shows another modifications suggested in FIG. 57.

FIG. 59 shows a variation similar to that shown in FIG. 56.

FIG. 60 shows the output over frequency for the variation shown in FIG. 56.

FIGS. 61, 62, and 63 illustrate variations including different sizes and shapes of central annular reflector regions beneath the AP attachment region (shown as domes, rather than conical acoustic reflectors) of various shapes and sizes.

FIG. 64 is a schematic of a compact public address access point apparatus similar to the variation shown in FIGS. 1-15.

FIG. 66 lists engineering specifications for one example of a compact public address access point apparatus as described herein.

DETAILED DESCRIPTION

Figure 1:
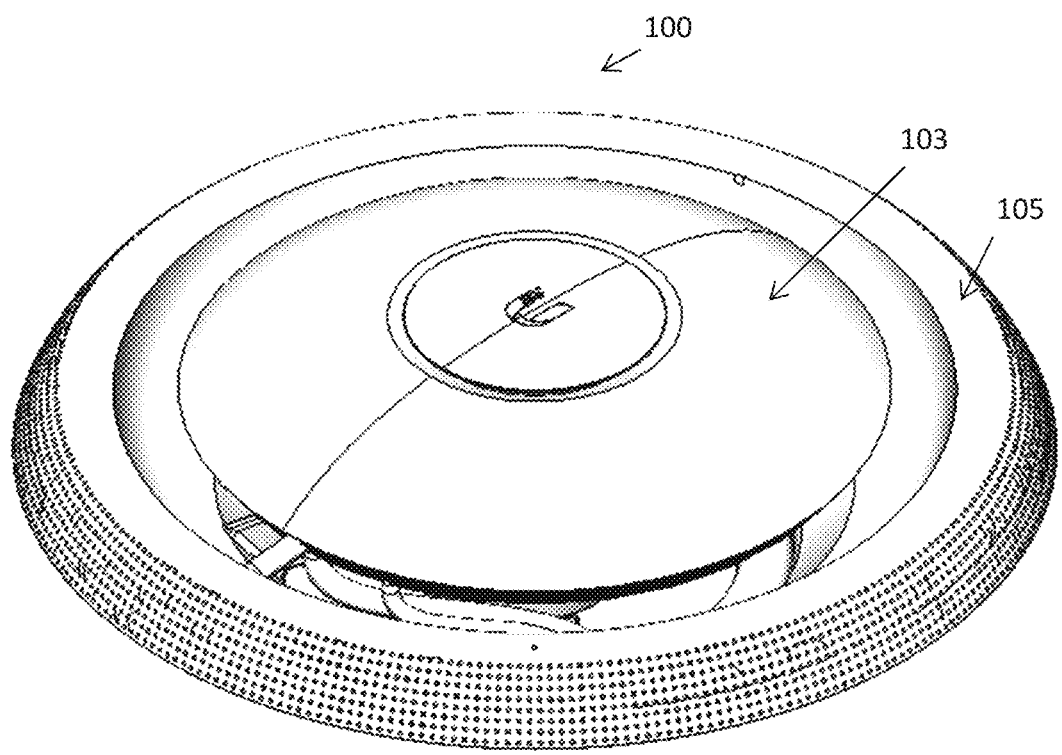
FIGS. 1 and 2 show front perspective views of a compact public address access point (also referred to herein as a public address speaker and wireless access point, and/or a speaker interface for a wireless access point).

In general, described herein are compact public address access point apparatuses. These apparatuses typically include an access point (AP) within an integrated or removable AP housing. However, any of these apparatuses may be separately sold from the AP housing and configured to mate with a separate AP housing. Thus, any of these apparatuses may be adapted for use with an AP but may not include the AP and may be referred to herein as a mount for a wireless access point that includes audio output (and in some variations input), such as speaker interfaces for wireless access points.

Any of these apparatuses, such as compact public address access point apparatuses, may be operated as ceiling or wall (or any other surface) mounted speakers to which an access point (AP) is integrated and/or coupled. Any of these compact public address access point apparatus may be configured as public address speaker and wireless access points. Also described herein are method of operating these apparatuses, methods of installing the apparatuses, and kits including one or more of these apparatuses.

For example, these apparatuses may allow a user to make announcements over a WiFi system without the need for additional separate hardware, and may provide high-quality sound with accurate voice reproduction, and any of these apparatuses may support simultaneous dual-band, 3×3 MIMO in the 2.4 and 5 GHz radio bands for up to 1750 Mbps. These apparatuses may be used with any handheld device (e.g., smartphone, pad, wearable electronics, etc.) and/or laptop to control and operate the apparatus. For example, in some variations an apparatus may be operate with software, firmware and/or hardware that permits a user to configure and operate (e.g., speak over, listen over, etc.) the public address speaker and wireless access point. In one example, the apparatus may be used with (or may include) a mobile Announcement Application software that may be used to broadcast announcements from the combined speaker/access point using a handheld device (e.g., phone).

In general, these apparatuses include a form factor that includes a mount (to which the AP may be attached) over top of the speaker, e.g., the central region of a speaker. Thus, the speaker may be held in a mount or frame. The combined speaker and frame may be referred to as a speaker assembly; in general an AP housing may be coupled or attached to the frame so that the AP housing covers all or most of the speaker. To avoid muffling or acoustic interference of the speaker output, the frame may be configured (e.g., to include an acoustic waveguide, such as a horn/housing) specifically to prevent muffling/drop out. For example, the central region of the frame beneath the AP mount may be an acoustic waveguide region having a conical (concave-shaped cone region) acoustic reflector region that is immediately above the speaker (e.g., tweeter). A second truncated conical (horn) region may be annularly positioned around this central acoustic reflector; for convenience this second portion may be referred to as an annular region or annular reflector. The lateral walls of the annular region extending from the internal speaker may be curved to match the curvature of the bottom surface of the AP housing (which may be recessed therein) when attached. Thus, the outer bell shape of the frame may be configured complementary to the AP housing. The AP housing itself may give a compressor phasing plug effect that allows for better efficiency for the projection of sound. The outer region of the annular region of the frame may include a flared region.

Note that in some variations shown herein, the outer (exposed/visible region) of the horn of the speaker interface includes multiple openings/holes, which are optional. One or more microphones may be positioned within this region (e.g. on an outer surface or within the outer face of the frame and/or AP housing).

The shape/curvature of the inner horn region (conical acoustic reflector) and outer horn region (annular region) shown in FIGS. 1-15 are configured to provide a wave path that starts in a smaller space and projects out, giving a more open area to flare of horn.

The speaker within the apparatus may be a very high-efficiency, light-weight speaker. For example, the magnet may be solid neodymium ring.

In general, the speaker interface for an access point (which may be referred to herein as simply a speaker interface, speaker mount, etc.) may connect, e.g., by POE connection, to an Ethernet line, which may then through the apparatus, provide data and/or power connection to the mounted/attached AP. Thus, the entire apparatus may be powered by the relatively low-low energy POE connection. Powering with USB (POE power) means that the speaker must be very efficient, as traditional POE does not provide much power. In the examples shown herein, the speaker provides 95 dB of loudspeaker output, usable output with one 1 Watt, using about 1 Watt of acoustic power (peak wattage). Thus, in some variations these apparatuses are configured to operate in the 5-15 (e.g., 12) Watt range (compared to most ceiling speaker which may extend up to 50 Watts or more). Although the speaker transducers shown herein may be configured to take this higher wattage, the electronics are adapted to provide and operate within the 5-15 (e.g., 12) Watt range. Thus, these apparatuses are configured as high efficiency loudspeaker transducers.

In general, the moving mass of the speakers are very light and low (e.g., less than approx. 2 g, 3 g, 4 g, (e.g., 2-7 g, 1 g-5 g, etc.). The weight of the moving parts is ultralight with strong, high-flux density motor. The coil may be a narrow diameter (e.g., having less copper—so lower weight of moving mass). Also, the gap of the motor may be a chamfered gap providing a dimension that focuses the flux to a higher density in the gap where the coil is.

In operation, these apparatuses may be used as speakers. Arrays of these devices (as described in the figures) may be connected together. For example, these apparatuses may find use in classrooms, public buildings, etc. In addition, these apparatuses may be used for surveillance/alarm systems/ applications.

Because they are connected and potentially controlled by the AP, these apparatuses may also be coordinated to provide acoustic effects such as focusing of projected/received sounds. Arrays of speaker sand microphones are well characterized, and these apparatuses may be adapted to operate in arrays, including focusing the energy of the speakers or microphone arrays to optimize the acoustic requirements. Array capabilities are known, but are not typically networked, or performed with POE, etc. The system may be configured to measure acoustic output from nearby apparatuses (other speaker interfaces) and triangulate acoustically to optimize the output of the overall system and/or individual speakers, e.g., one apparatus sending and the other(s) listening.

Any of these apparatuses may be used with a user interface for communicating with the AP(s) and therefore the speaker(s) or connected system of speakers. A user interface may allow a user to select one or more speaker to transmit/receive from, and may allow public address and/or monitoring from the apparatus. A user interface may be accessed by any appropriate device, e.g., cell phone, lap top, etc.

EXAMPLES

Figure 2:
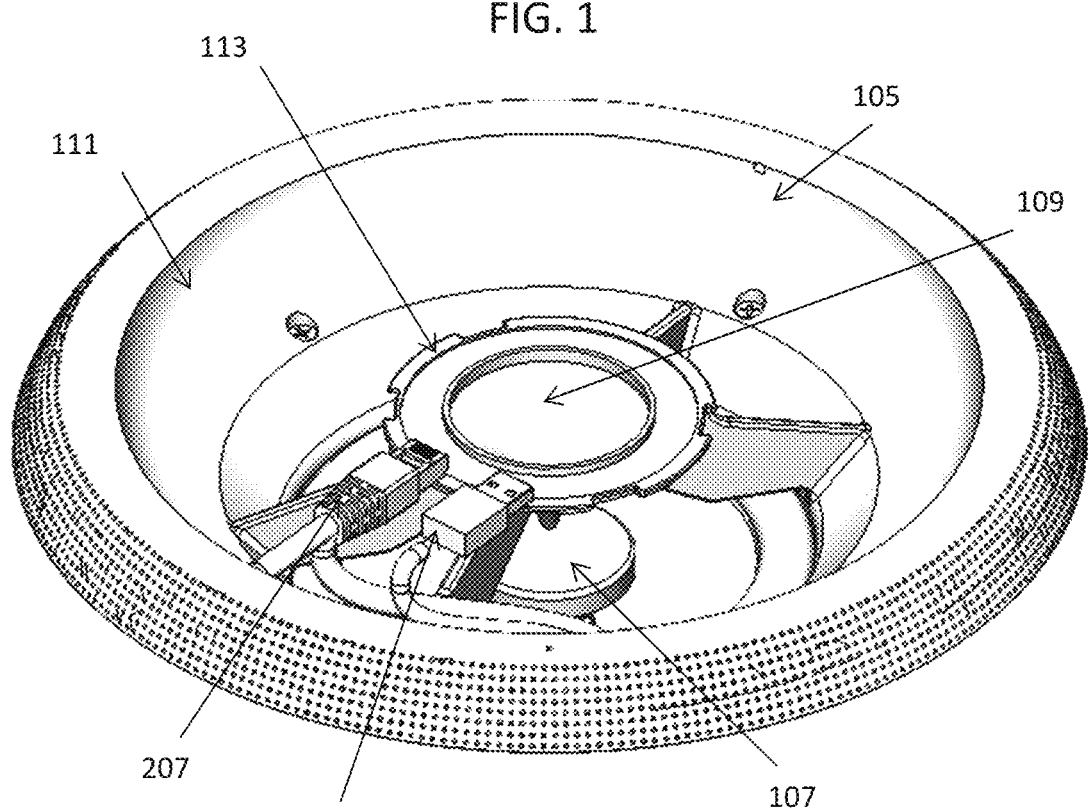

FIGS. 1-15 illustrate one example of a compact public address access point (also referred to herein as a public address speaker and wireless access point, and/or a speaker interface for a wireless access point). In the front perspective view of FIG. 1, the compact public address access point (AP) 100 includes the AP housing 103, in which all of the circuitry for the AP radio and the AP antenna may be held. The AP housing in this example is a disc-shaped housing that mounts to the frame 105. FIG. 2 illustrates the compact public address access point of FIG. 1 with the AP housing shown removed. In FIG. 2 the speaker 107 is coupled to the frame 105. The speaker has a front 107 from which sound is projected. In this example, the frame 105 is mounted over the speaker, and surrounds the speaker. The frame includes a conical acoustic reflector 109 that is centered over the front of the speaker with the peak (apex) of the conical acoustic reflector facing the front of the speaker; the base of the conical acoustic reflector includes a mating region 113 for coupling to an AP housing. The conical acoustic reflector forms a first horn portion and the outer annular region 117 of the frame 105 forms a second horn portion that surrounds the conical acoustic reflector (the first horn). The annular region in this example includes a concave inner wall facing the conical acoustic reflector. When the access point (AP) housing is mounted to the frame, the the AP housing covers the front of the speaker and the conical acoustic reflector is between the AP housing and the front of the speaker. Because of this arrangement, in which an outer surface of the AP housing is opposite from the concave inner wall of the annular region of the frame, sound emitted by the speaker (particularly in the voice range of 70 Hz to 300 Hz or more) is reliably transmitted by the acoustic waveguide that is formed when the AP housing is attached, between the inner acoustic reflector (e.g., the conical acoustic reflector) and concave inner wall of the annular region of the frame. In FIG. 2, a pair of connectors (including a USB connector 205 and an Ethernet connector 207) are visible for connecting between the speaker assembly (e.g., frame 105 and speaker 107) and the access point (e.g., within the AP housing 103). In FIG. 2, the compact public address access point is shown with the AP housing (enclosing the radio and antenna and additional AP circuitry) removed.

Figure 3:
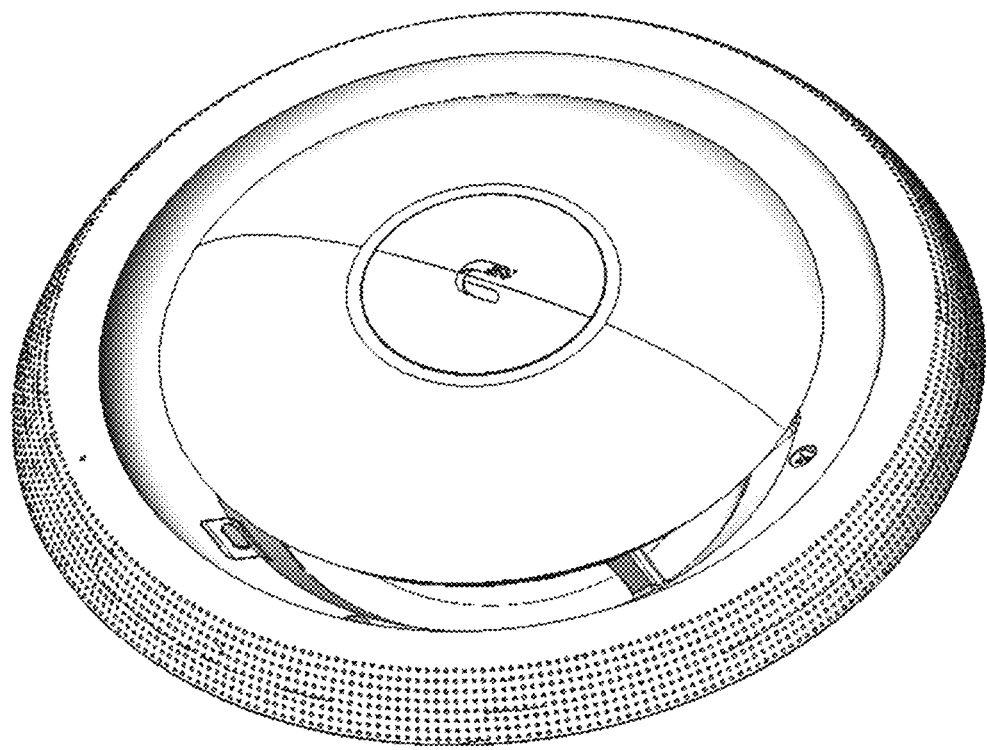
FIGS. 3 and 4 show alternative front perspective views of a compact public address access point (speaker interface for a wireless access point), with and without, respectively, the AP housing connected.
Figure 4:
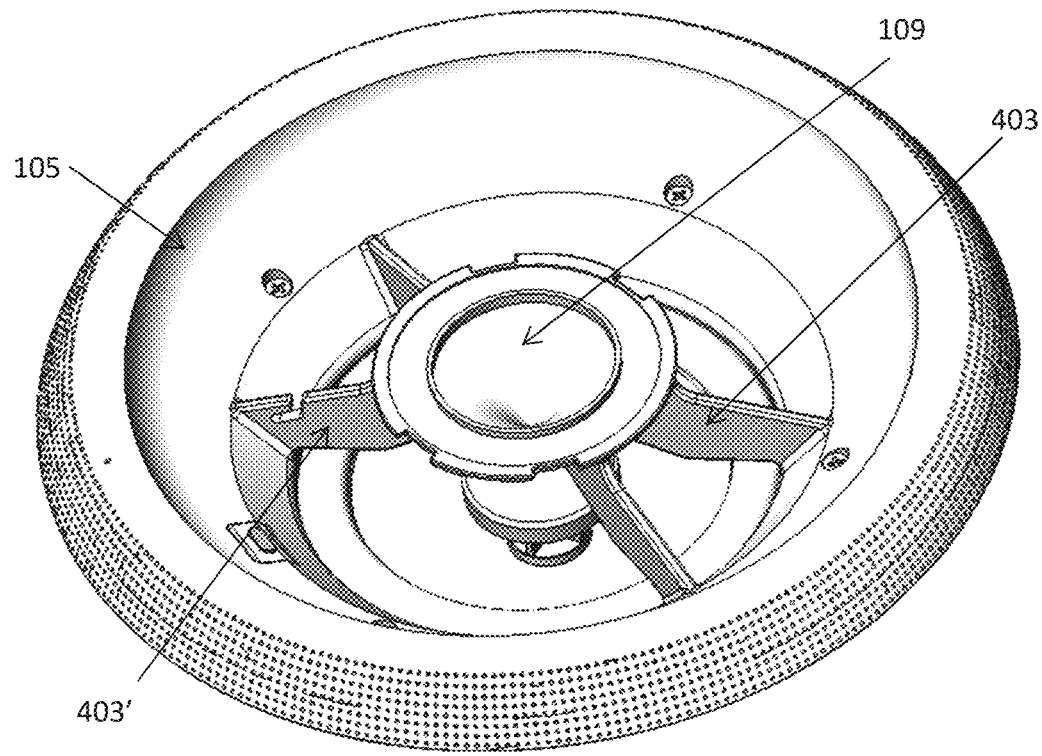

FIGS. 3 and 4 show alternative front perspective views of a compact public address access point, with (FIG. 3) and without (FIG. 4) the AP housing connected. In this example, the frame includes a plurality of struts 403, 403' connecting the central acoustic reflector (conical acoustic reflector 109) to the peripheral annular acoustic reflector 105. The struts are generally thin and only minimally block the region between the two, so as not to adversely affect the acoustic properties of the sonic waveguide formed when the AP housing is attached, as shown in FIG. 3. In these examples, a plurality of screw-actuated bracket adjustment sites are also shown, and screwing them in or out may adjust the position of each of a clamp bracket, as described below.

FIG. 5 shows an example of connecting (mounting) an AP housing 103 to the frame 105 of the speaker assembly. As illustrated by arrow 121, the AP housing may be coupled onto the frame and rotated (e.g., clockwise or counterclockwise) to secure the AP housing onto the frame over the speaker so that the speaker is completely or mostly (e.g., more than 50 percent, more than 60%, more than 70%, more than 75%, more than 80%, more than 85%, more than 90%, more than 95%, etc.) covered by the AP housing, leaving a gap between the annular reflection region and the periphery of the AP housing.

Figure 8:
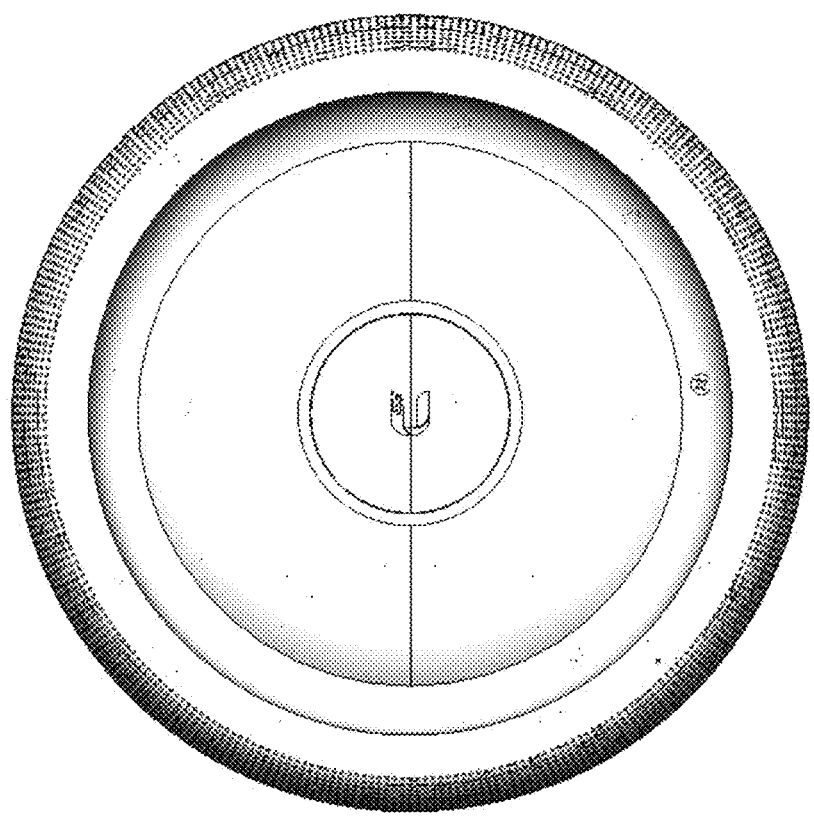
FIGS. 8 and 9 show top views of a compact public address access point with (FIG. 8) and without (FIG. 9) the wireless access point (AP), attached to the speaker assembly.
Figure 9:
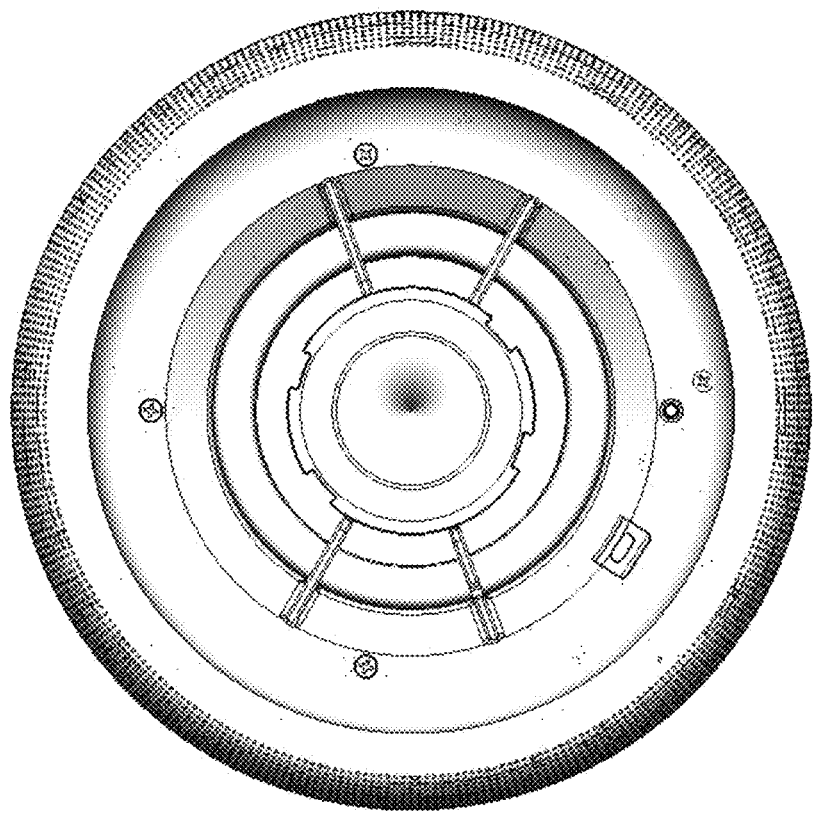
Figure 10:
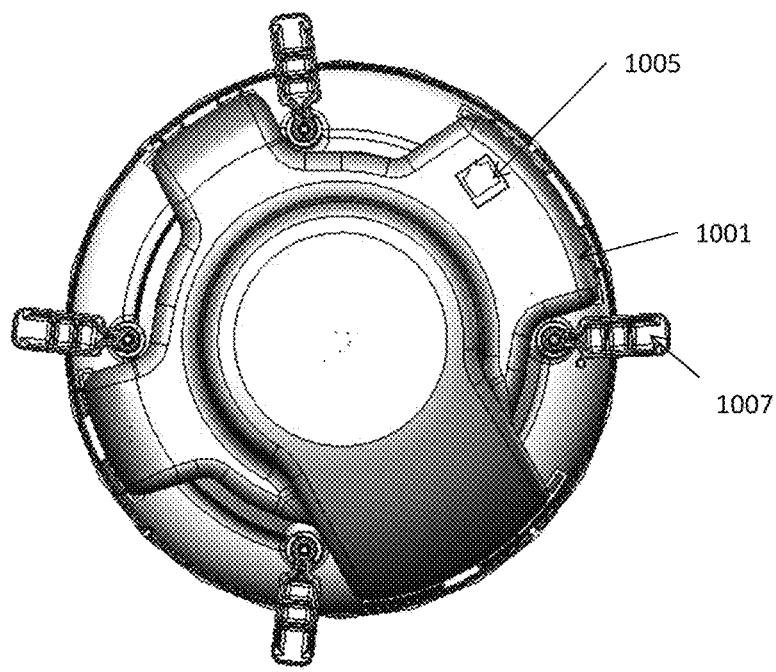
FIG. 10 shows a bottom view of a compact public address access point.

FIG. 6 shows a top view of the speaker interface, including the engagement region on the frame for the bottom of the AP housing, as shown in FIG. 7. In FIG. 7 the bottom of the AP housing 702 may include with complimentary engagement region(s) for engaging the frame (e.g., the inner, central conical acoustic reflector. The engagement region may be a track and/or engagement projection for engaging a complimentary engagement projection and/or track on the frame, including on the base of the central conical acoustic reflector. FIGS. 8 and 9 show top views of the same compact public address access point from FIGS. 1-7. In FIG. 8 the wireless access point (AP) housing is attached to the speaker assembly (frame, speaker, mounts, etc.); FIG. 9 shows the same view as FIG. 8, but with the AP housing removed. FIG. 10 shows a bottom view of a compact public address access point. In FIG. 10, a bottom cover 1001 covers and protects the speaker and frame, and this cover may include one more openings, including openings for plugs, such as an Ethernet plug 1005.

Figure 11:
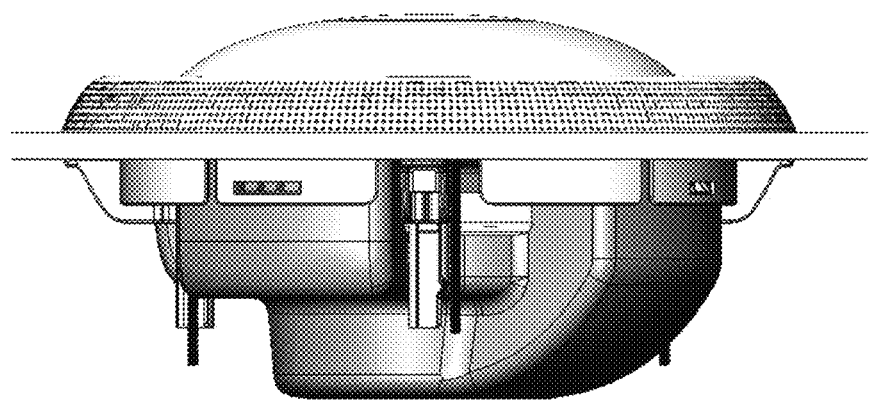
FIGS. 11 and 12 show side views of a compact public address access point (AP), with and without, respectively, connection to the access point housing portion. The apparatus is shown mounted to a surface (e.g., ceiling).
Figure 12:
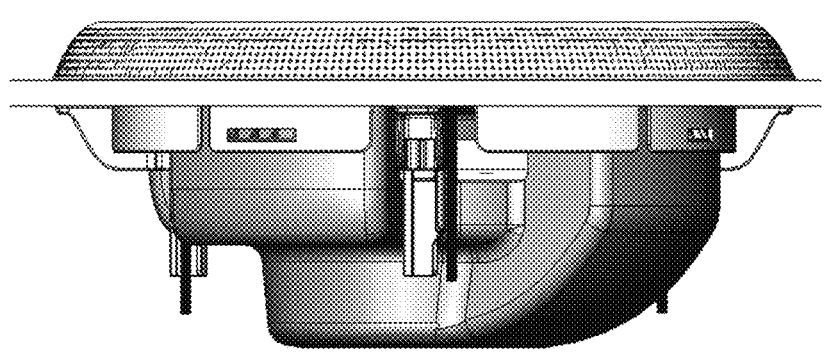

FIGS. 11 and 12 show side views of a compact public address access point (AP), with and without, respectively, connection to the access point housing portion. The apparatus is shown mounted to a surface (e.g., ceiling). In FIGS. 10-12, the mounting brackets 1007 are visible; there are four of them shown in the bottom view of FIG. 10, for example.

Figure 13:
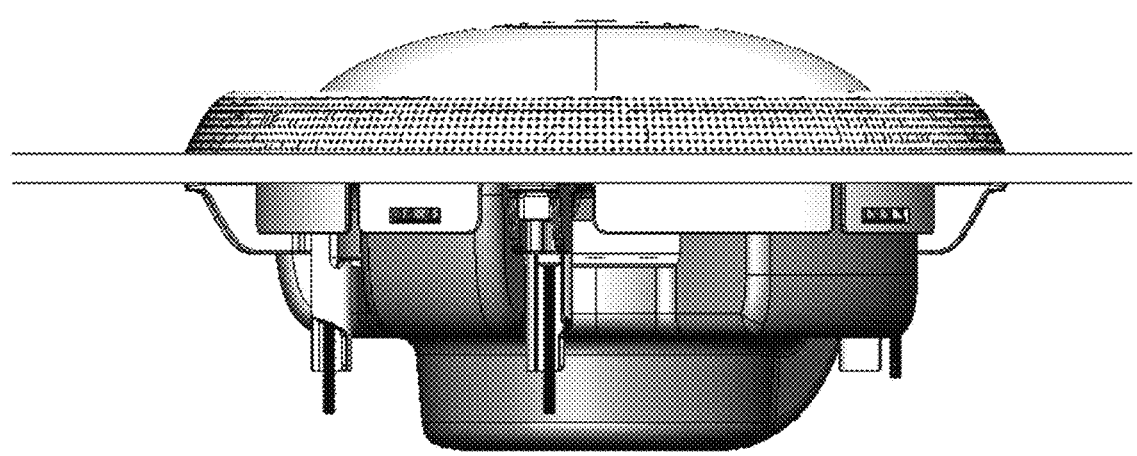
FIGS. 13, 14 and 15 show side views (left, right, top) of a compact public address access point apparatus including a speaker assembly and AP housing mounted to a ceiling (shown upside down, e.g., in relation to the ceiling).
Figure 14:
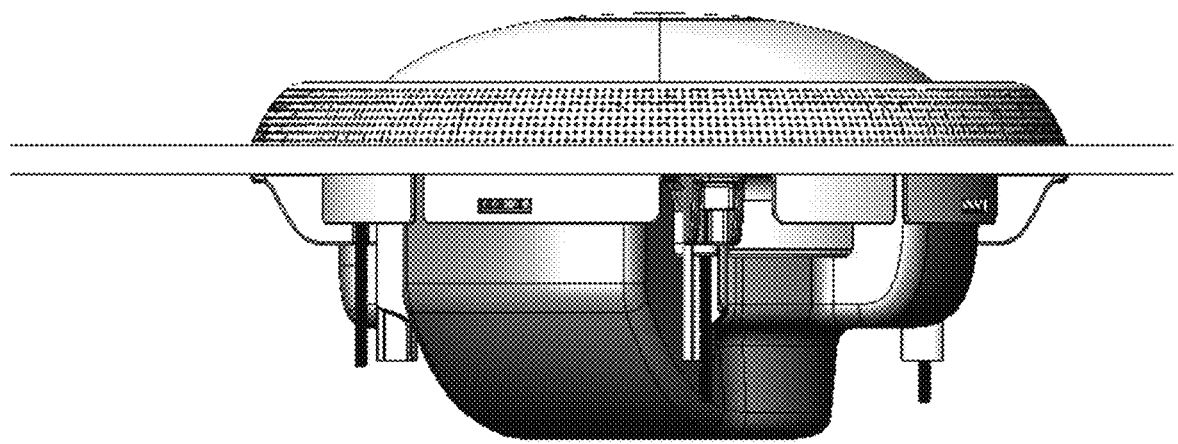
Figure 15:
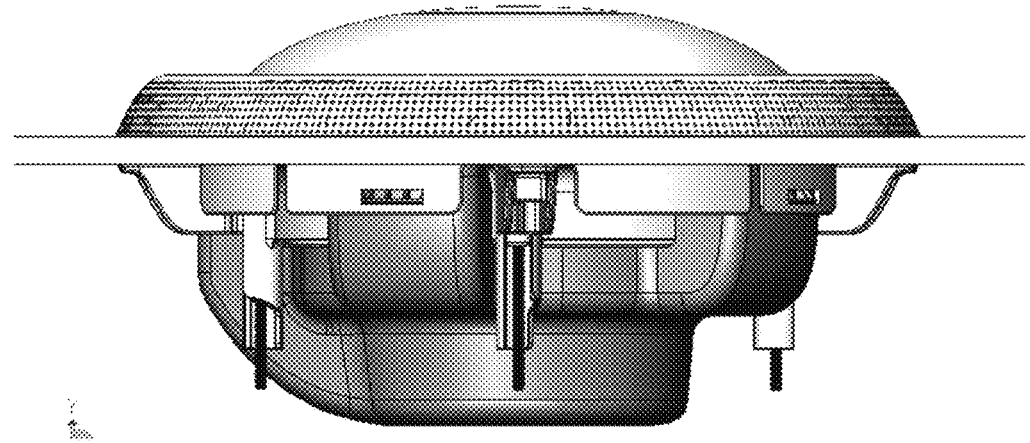

FIGS. 13, 14 and 15 show side views (left, right, top) of a compact public address access point apparatus including a speaker assembly and AP housing mounted to a ceiling (shown upside down, e.g., in relation to the ceiling).

Figure 16:
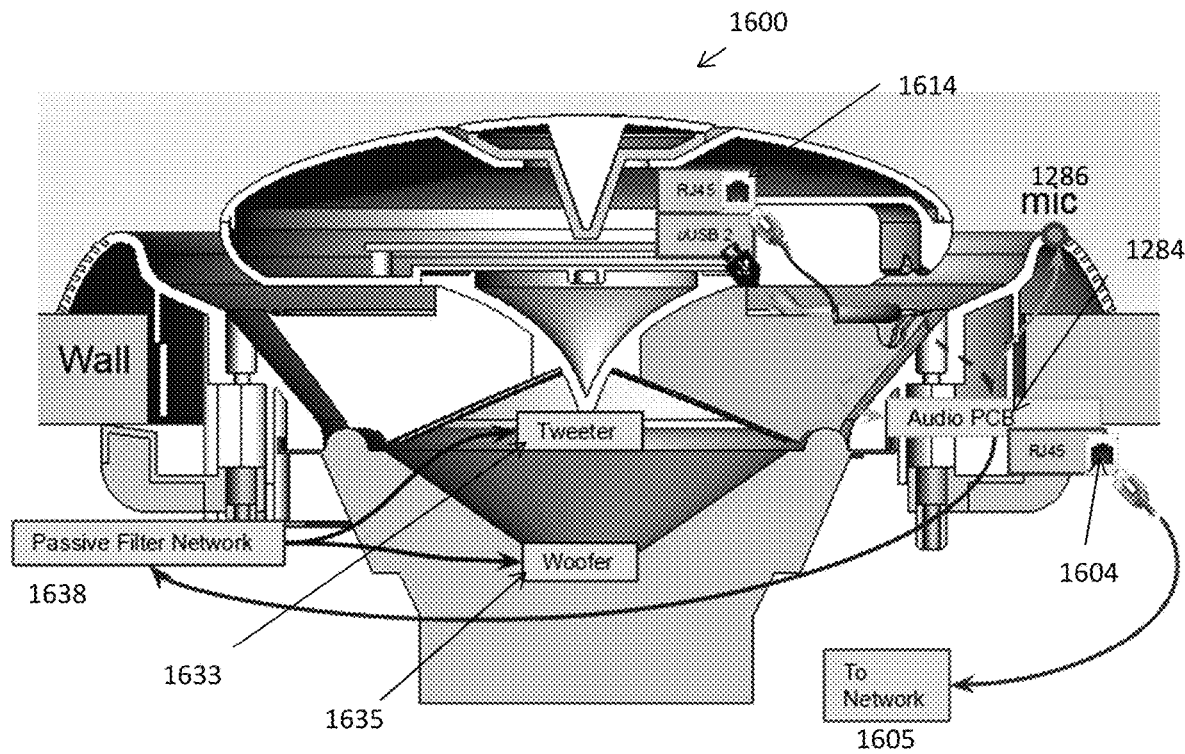
FIG. 16 is a schematic overview of an apparatus such as the compact public address access point shown in FIGS. 1-15, including connections. The speaker interface for the AP receives the network connection (e.g., a Power over Internet, POE, connection) which powers the speaker (including microphones and circuitry) and in turns powers and passes the data connection through to the AP. The AP, in turn, may control the speaker.

FIG. 16 is a schematic overview including a marked-up transverse section through a compact public address access point 1600 such as the one shown in FIGS. 1-15, including connections. In this example, as shown in FIGS. 1-15, the speaker interface for the AP receives a network connection (e.g., a Power over Internet, POE, connection) which powers the speaker (including microphones and circuitry) and in turns powers and passes the data connection through to the AP 1605. The AP, in turn, may control the speaker, and may connect to the input data and/or power input 1604 bus to the AP through a pair of connectors (shown in this example in FIG. 16 as a USB and Ethernet connection 1614). In this example the speaker may include any speaker elements, including tweeter 1633 and woofer 1635, which may form or may be part of a passive filter network 1638. Output on the speaker may be regulated and controlled by any audio circuitry 1284 that may be coupled to the frame, as shown. The cross-section also shows a microphone 1286 which may also be controlled by audio circuitry 1284.

Figure 17:
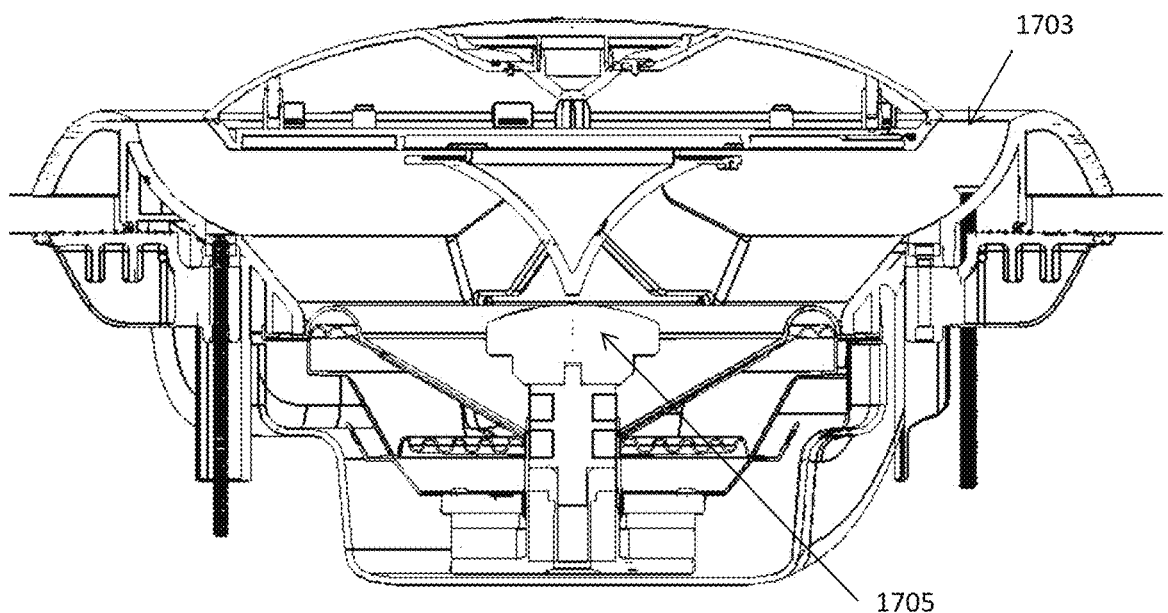
FIG. 17 is a section through the apparatus (compact public address access point) shown in FIGS. 1-15.

FIG. 17 is similar to the section shown in FIG. 16 showing a slightly different arrangement of the speaker 1705, the frame 1703, and the AP housing. In this example, the AP housing is somewhat lower profile, and is recessed into the frame. In FIG. 17, the section through the midline of the apparatus (compact public address access point) shows how the concave inner wall of the annular outer horn (annular acoustic reflector) are spaced apart from each other.

Figure 18:
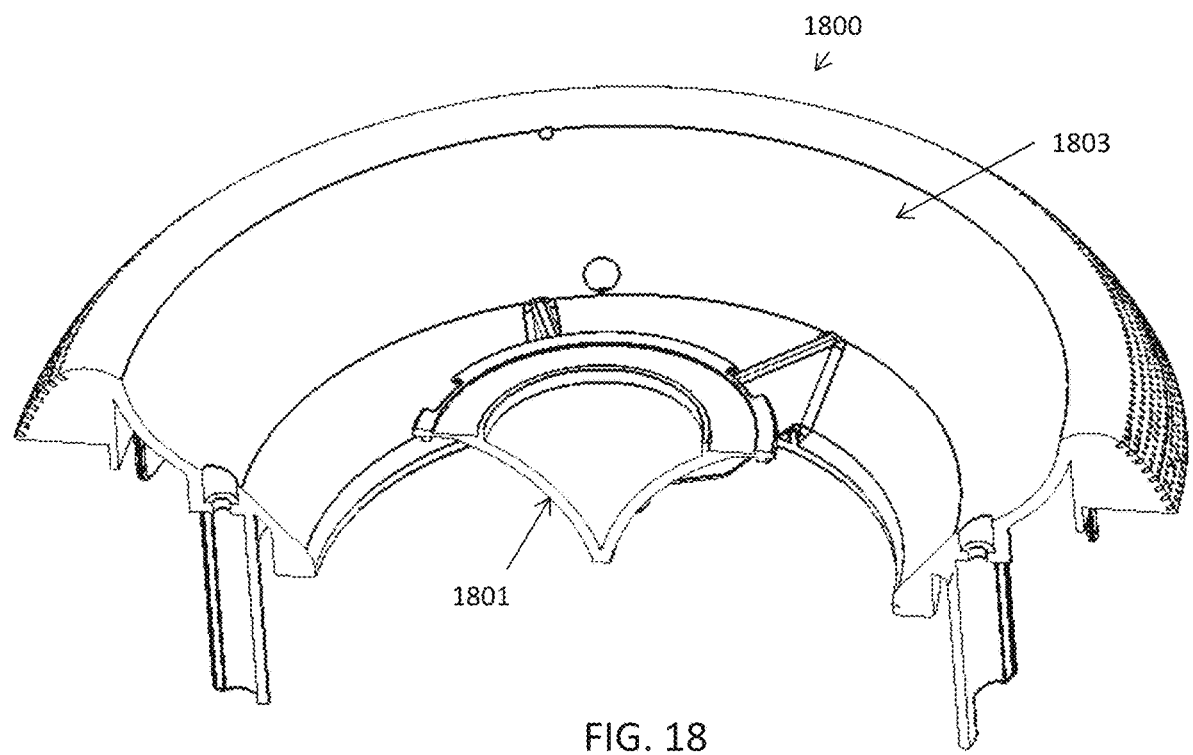
FIGS. 18 and 19 show sections through the frame/housing (including the acoustic reflector or horn structure) of the compact public address access point apparatus shown in FIGS. 1-15.
Figure 19:
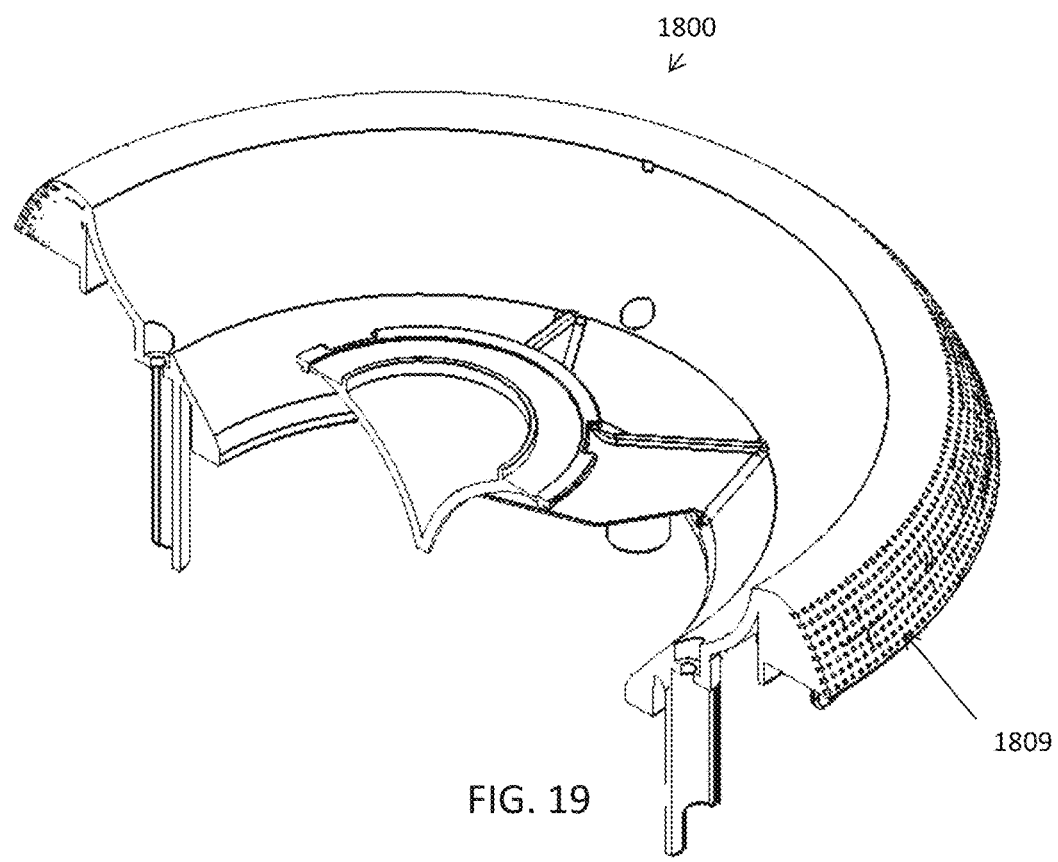

As mentioned, the frame, including the acoustic reflector surfaces, may be configured to permit sound to be emitted from the speaker, into the acoustic waveguide region between the inner acoustic and out from around the edge of the access point housing. An example of a frame of the speaker assembly is shown in FIGS. 18 and 19 (show in partial sectional views to highlight the outer curvature of the inner conical acoustic reflector 1801 (a first horn or trumpet member) and an outer annular region 1803 of the frame 1800 surrounding the conical acoustic reflector. The outer surface of the frame 1800 in this example, includes a plurality of small holes, notches, openings, etc., into or through the frame. These openings 1809, if present, are optional.

Figure 20:
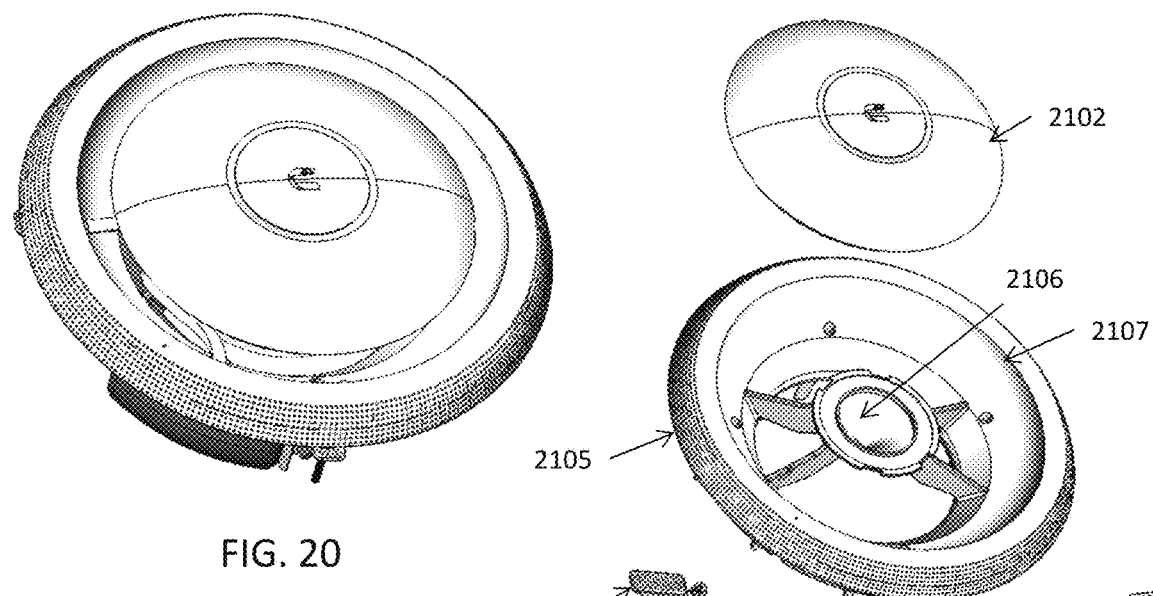
FIG. 20 shows a perspective front view of an exemplary compact public address access point.
Figure 21:
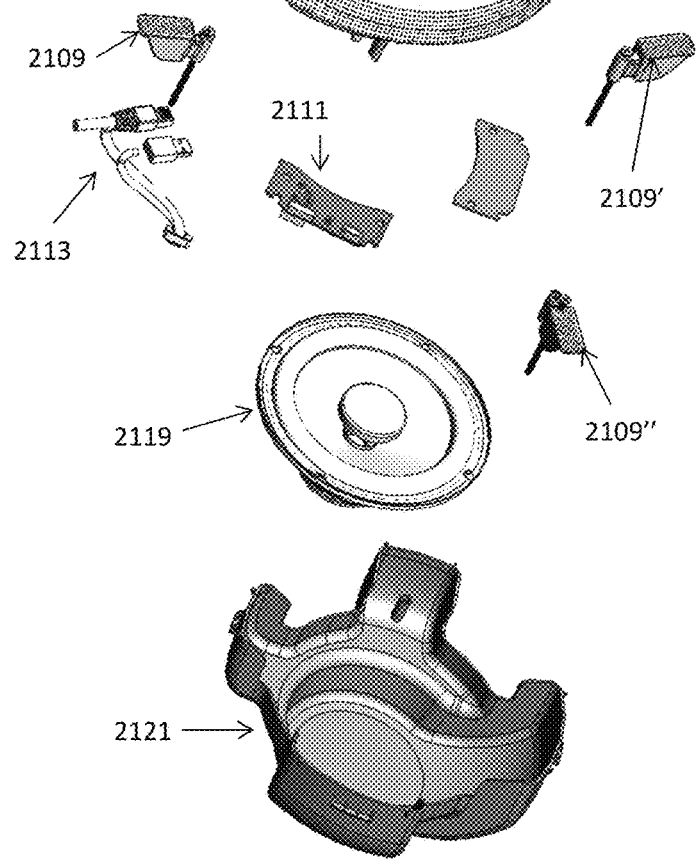
FIG. 21 shows an exploded view from the front, showing the AP housing, frame (e.g., speaker interface) including a conical acoustic reflector (e.g., horn) and annular region (annular reflector region), mounts (clamp mounts), circuitry (e.g., acoustic circuitry), connectors (e.g., Ethernet connector, USB connector), speaker (including tweeter, magnetic coils, etc.) and back housing.

FIG. 20 shows a perspective front view of a compact public address access point similar to that shown above. FIG. 21 shows an exploded view from the front of a compact public address access point, showing the AP housing 2102, frame 2105 (e.g., speaker interface) including an inner conical acoustic reflector 2106 (e.g., horn) and annular region 2107 (annular reflector region), mounts 2109 (clamp mounts), circuitry 2111, 2111' (e.g., acoustic circuitry), connectors 2113 (e.g., Ethernet connector, USB connector), speaker 2119 (including tweeter, magnetic coils, etc.) and back housing 2121. The speaker is in a stacked configuration relative to the AP housing, so that the AP housing is positioned in-line with speaker over the front of the speaker (the central axis in the primary direction of acoustic transmission).

Figure 22:
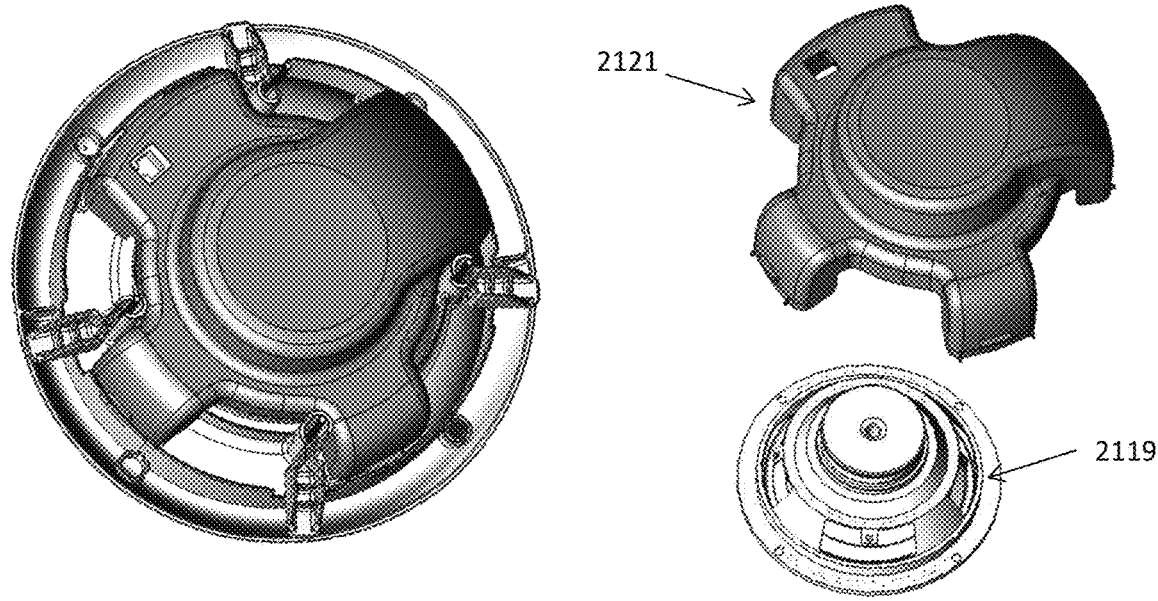
FIG. 22 is a perspective back view of an exemplary compact public address access point apparatus.
Figure 23:
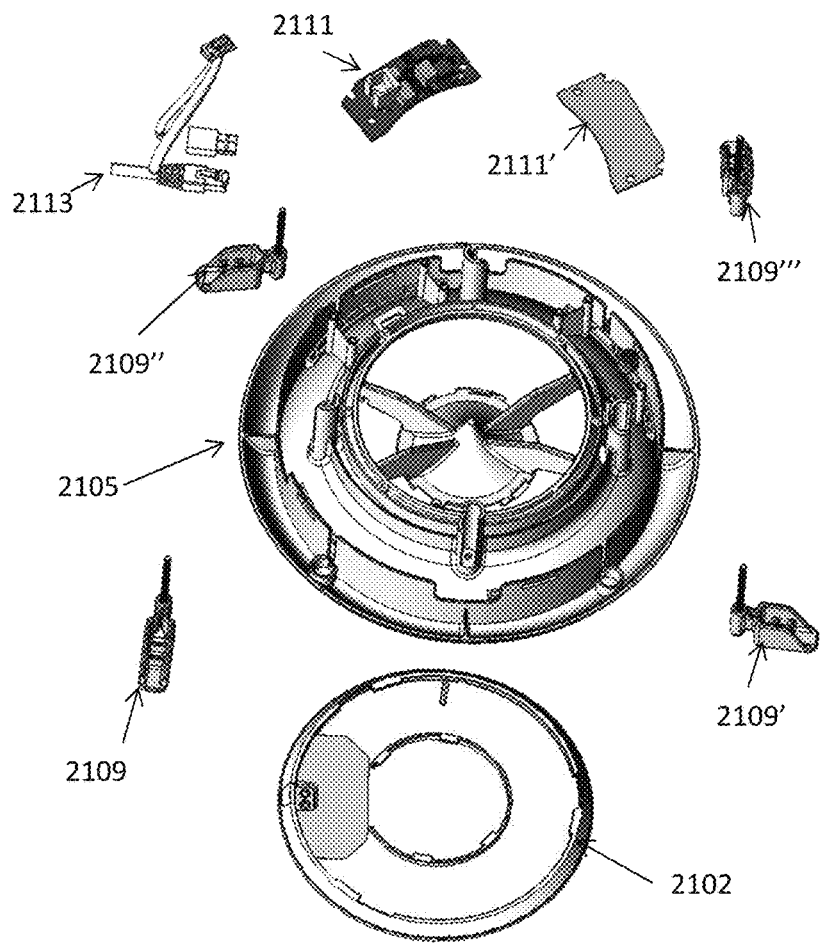
FIG. 23 shows an exploded view from the back view shown in FIG. 22, showing the AP housing, frame (including conical acoustic reflector/horn), mounts, circuitry, connectors, speaker (including tweeter, magnetic coils, etc.) and back housing.

FIG. 22 is a perspective back view of the compact public address access point apparatus of FIG. 21. FIG. 23 shows an exploded view from the back as shown in FIG. 22, showing the AP housing 2102, frame 2105, mounts 2109, 2109', 2109″, acoustic circuitry 2111, connectors 2113, speaker 2119 (including tweeter, magnetic coils, etc.) and back housing 2121.

Figure 24A:
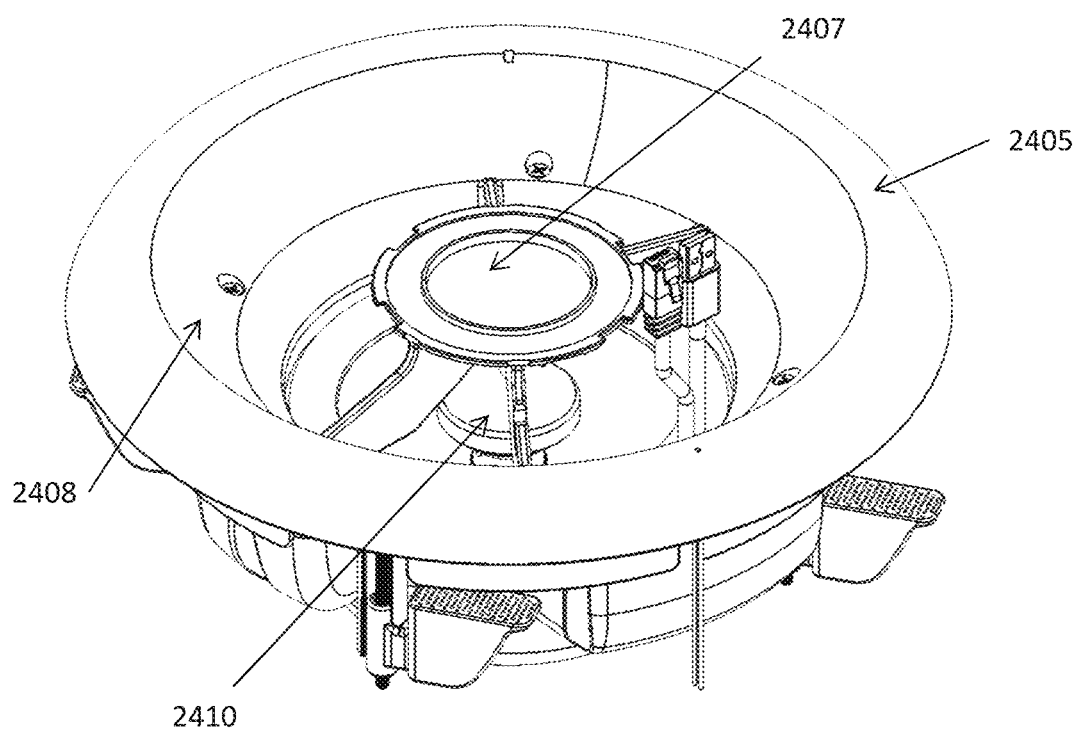
FIG. 24A is a front perspective view of another variation of a speaker/AP interface (compact public address access point apparatus).

FIG. 24A is a front perspective view of another variation of a speaker/AP interface (compact public address access point apparatus), also including a frame 2405 having an inner conical acoustic reflector 2407 and an outer annular acoustic reflector 2408 that are mounted over the speaker 2410 or speakers to secure an AP housing over the speaker(s).

Figure 24B:
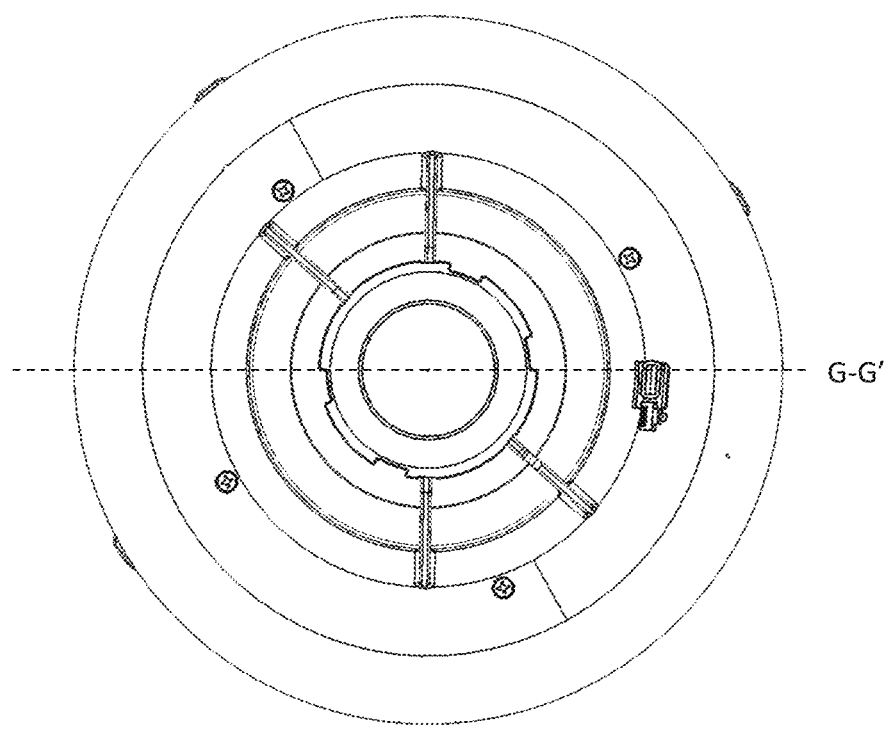
FIGS. 24B-24F show top, bottom, front, left side, and right side views, respectively of the compact public address access point apparatus shown in FIG. 24A.
Figure 24C:
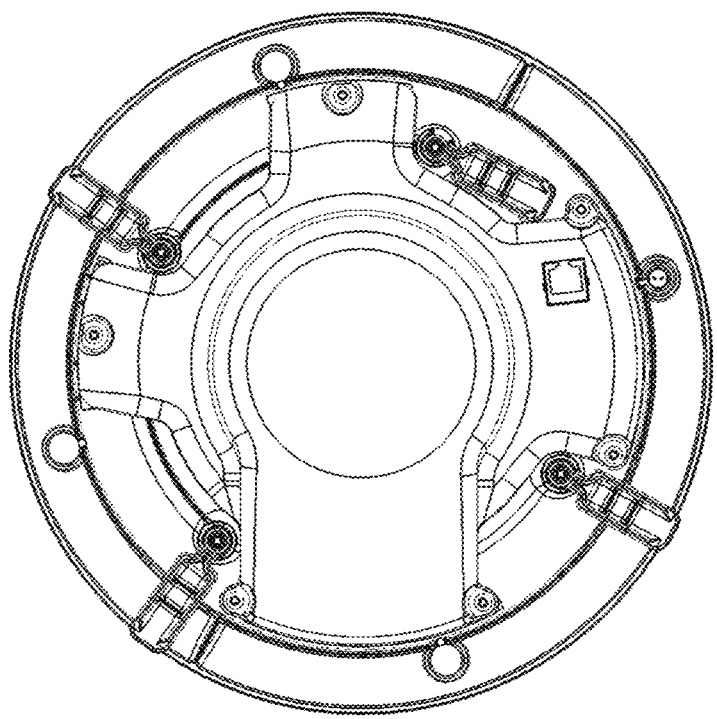
Figure 24D:
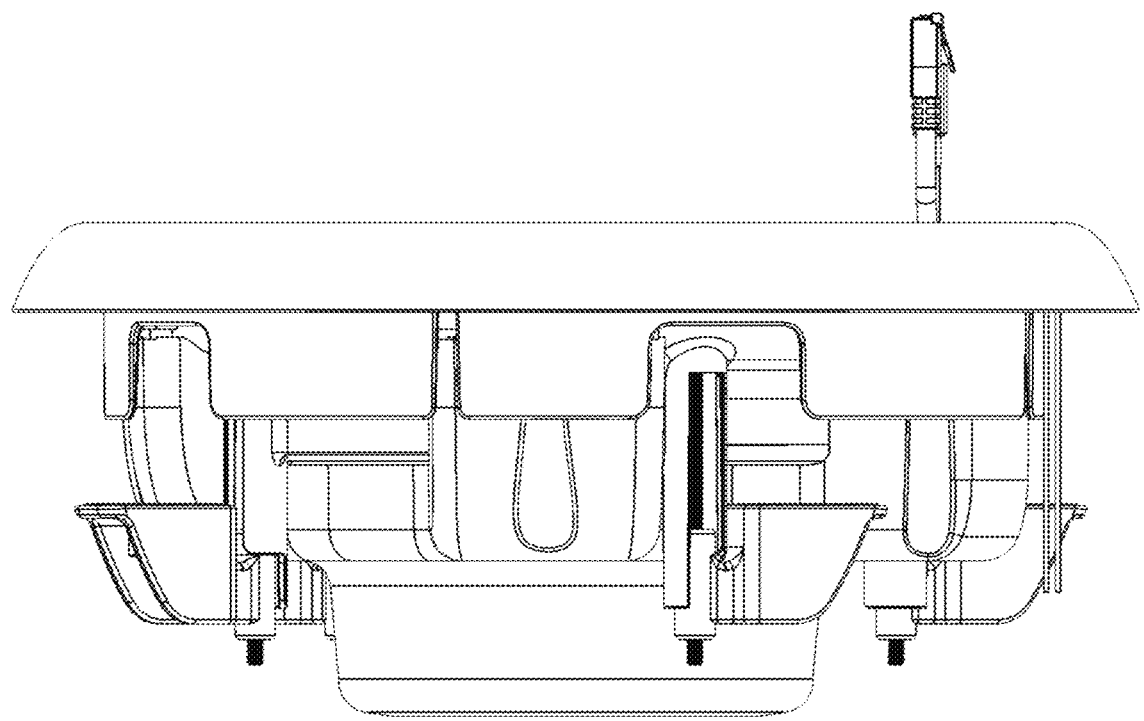
Figure 24E:
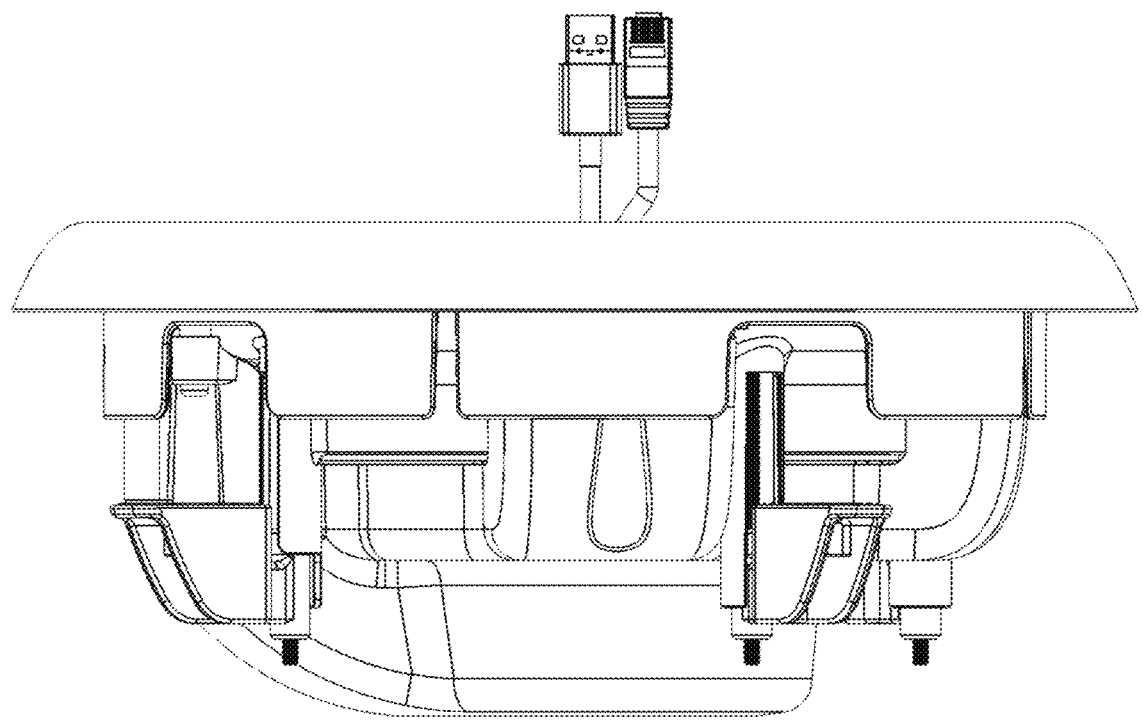
Figure 24F:
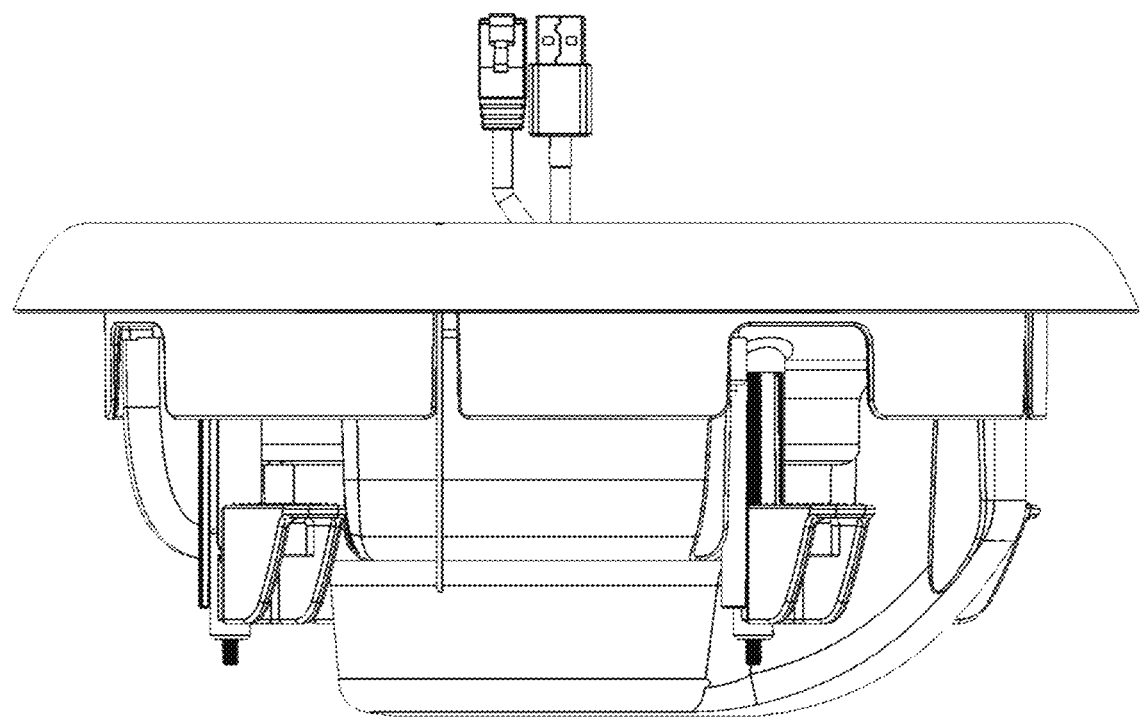
Figure 24G:
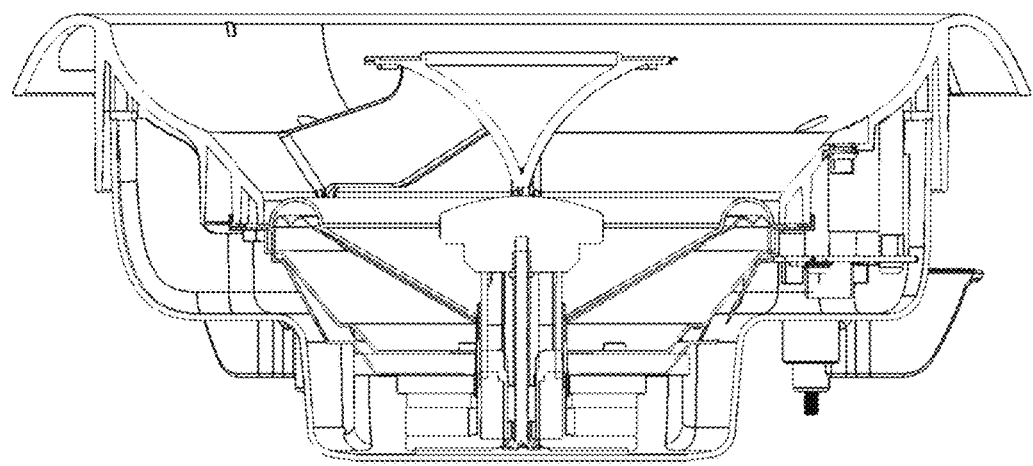
FIG. 24G is a section through a midline (line G-G' in FIG. 24B) of the compact public address access point apparatus of FIG. 24A.

FIG. 24B shows a top view, and FIGS. 24C, 24D, 24E, and 24F show bottom, front, left side, and right side views, respectively of the compact public address access point apparatus shown in FIG. 24A. FIG. 24G is a section through a midline (line G-G' in FIG. 24B) of the compact public address access point apparatus of FIG. 24A.

Figure 24H:
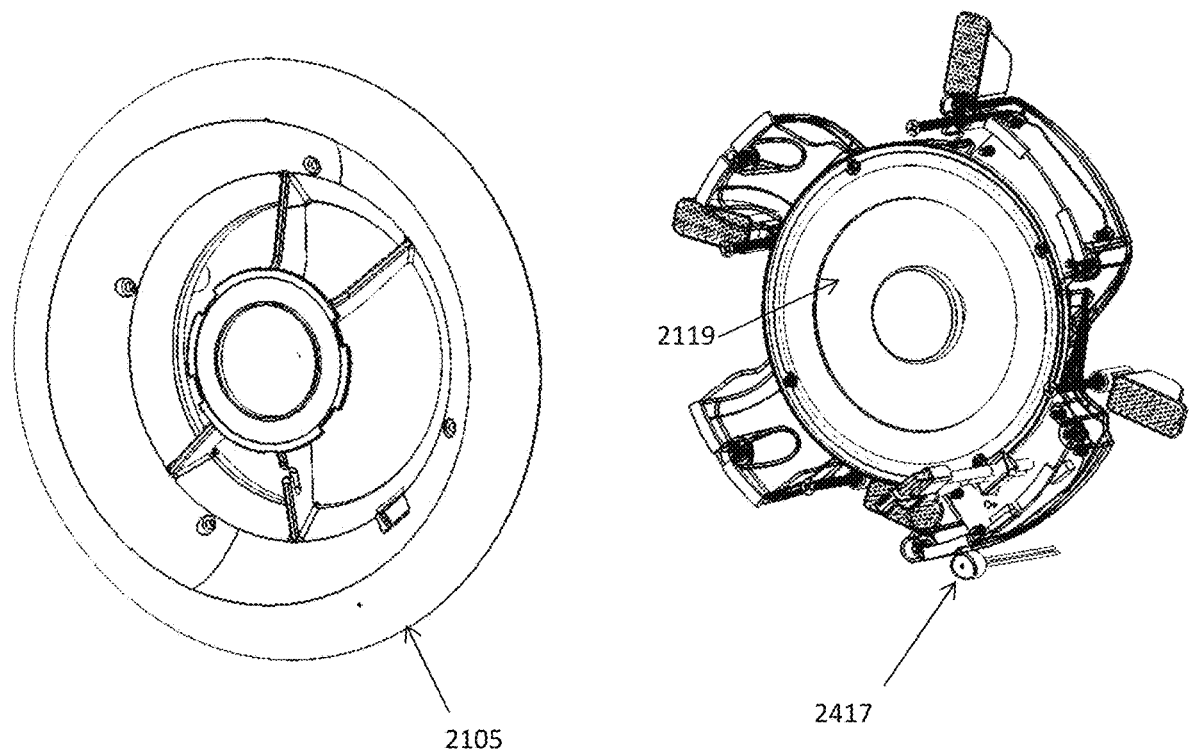
FIG. 24H is a perspective exploded view of the compact public address access point apparatus shown in FIG. 24A with the AP housing removed, showing the base of the conical reflector, the speaker and internal circuitry along with the wall mounting portions. Optionally, seismic retaining features (such as a leash and/or hook or buckle) may also be included (not shown).

In general, the frame 2105 may be mounted over the speaker 2119. FIG. 24H shows a perspective exploded view of the compact public address access point apparatus shown in FIG. 24A with the AP housing removed, showing the base of the conical acoustic reflector 2407, the speaker 21119 and internal circuitry along with the wall mounting portions. Optionally, seismic retaining features (such as a leash and/or hook or buckle, not shown) may also be included.

Figure 25A:
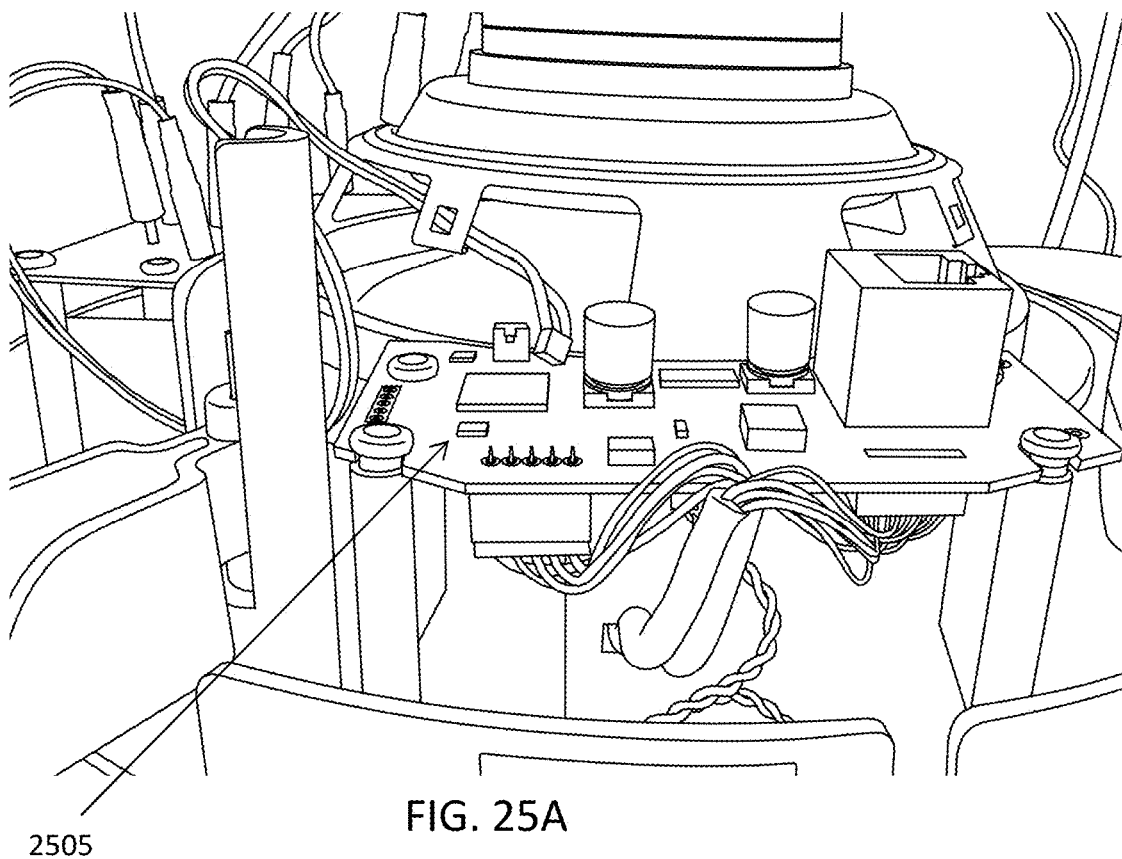
FIGS. 25A and 25B show the internal control circuitry of the speaker interface within the apparatus housing (back housing removed), including the connections to the speaker(s) and inputs (e.g., Ethernet connection, etc.).
Figure 25B:
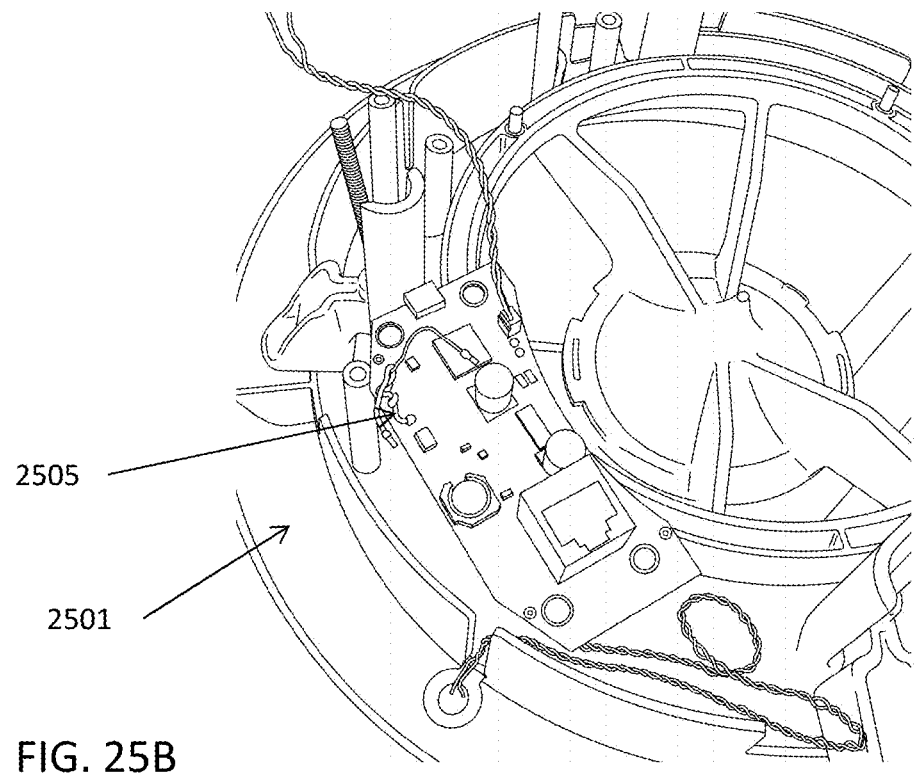
Figure 26:
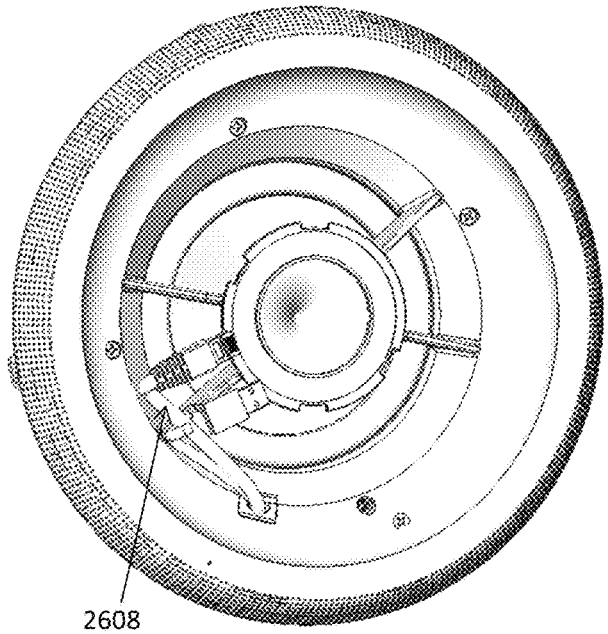
FIGS. 26 and 27 show cable connections between the speaker interface (speaker assembly) and the AP housing, including power and data connections (e.g., PoE).
Figure 27:
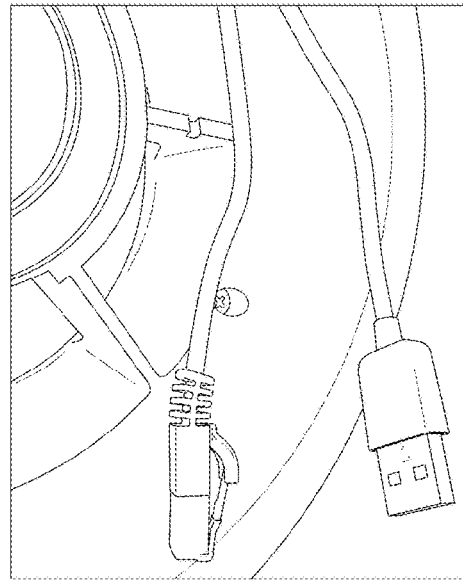

FIGS. 25A-25B show the internal acoustic control circuitry for the speaker interface within the apparatus housing (in these images, the back housing has been removed), including the connections to the speaker(s) and inputs (e.g., Ethernet connection, etc.). The acoustic circuitry 2505 may be mounted directly or indirectly to the frame 2501. FIGS. 26-27 show cable connections 2608 between the speaker interface (speaker assembly) and the AP housing, including power and data connections (e.g., PoE).

Figure 28:
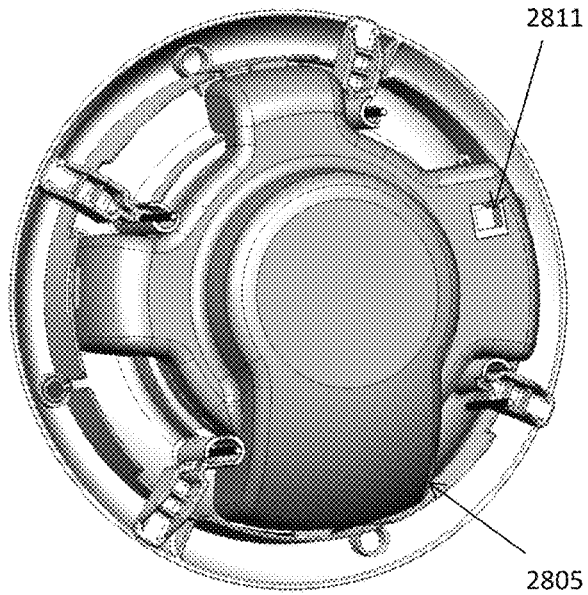
FIG. 28 shows the back of an exemplary apparatus including a back cover.
Figure 29:
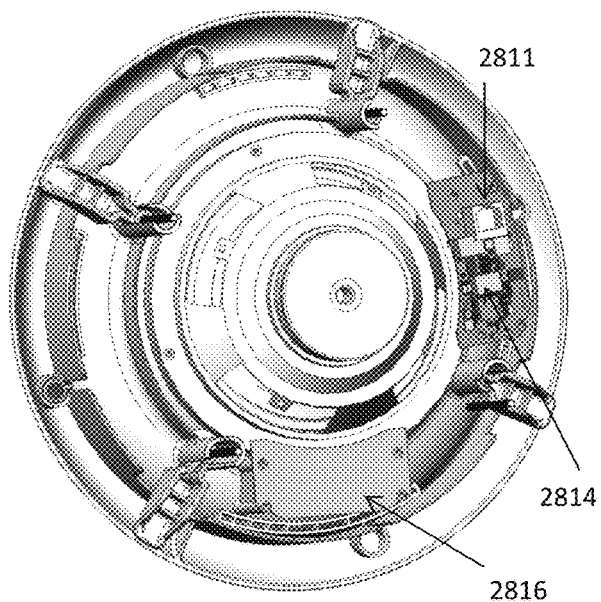
FIG. 29 shows the apparatus of FIG. 28 with the back cover removed. In both cases the PoE (Ethernet) connection) is visible.

FIG. 28 shows the back of an exemplary apparatus including a back cover 2805; FIG. 29 shows the apparatus of FIG. 28 with the back cover removed. In both cases the PoE (Ethernet) connection 2811 is visible, passing into the back of the apparatus. A first electronic board 2814 may support the Ethernet connection, and the same or a different circuit board (e.g., PCB) may hold additional circuitry for operating the acoustics (speaker, etc.). In FIG. 29 a second board 2816 is shown; this board may include any of the acoustic control circuitry, such as a D/A converter, analog amplifier, or the like.

Figure 30:
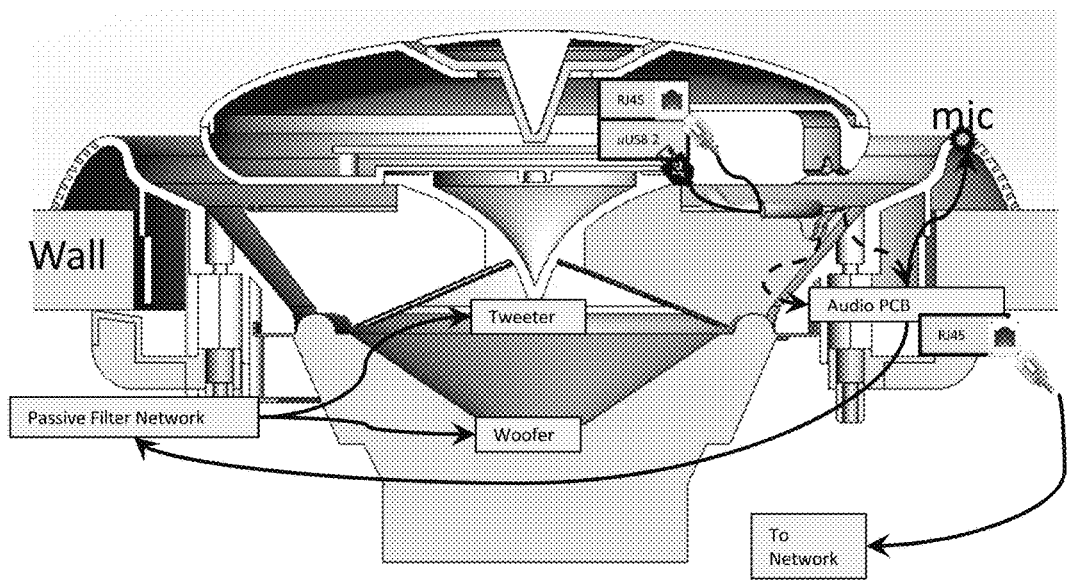
FIG. 30 is a schematic showing connections. In this example, Cat 6 and uUSB cable assembly connectors connect between the speaker assembly and the AP housing. Cable assembly is terminated on Audio PCB after threading through horn wall of the speaker interface. The network cable is routed from back side of the conical acoustic reflector (horn) to connect to the network. This approach allows no cables to be visible after in wall installation.

FIG. 30, like FIG. 16, is a schematic showing connections. In this example, Cat 6 and uUSB cable assembly connectors connect between the speaker assembly and the AP housing. Cable assembly is terminated on Audio PCB after threading through horn wall of the speaker interface. The network cable is routed from back side of the conical acoustic reflector (horn) to connect to the network. This approach allows no cables to be visible after in wall installation.

Figure 31:
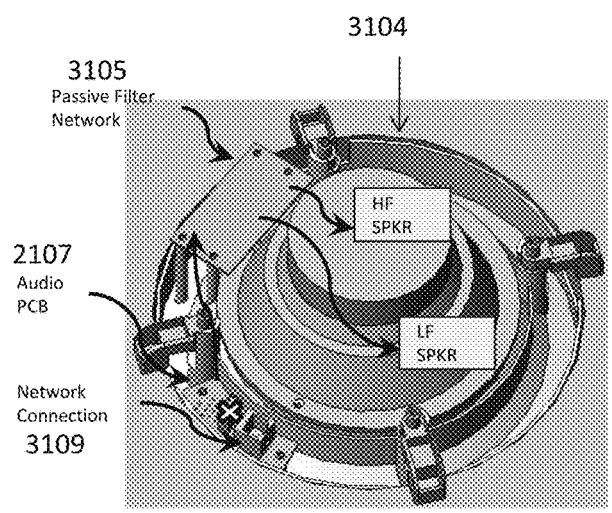
FIGS. 31 and 32 show back and front, respective, views of the compact public address access point apparatus with the AP removed, including the connectors and circuitry (e.g., passive filter network).
Figure 32:
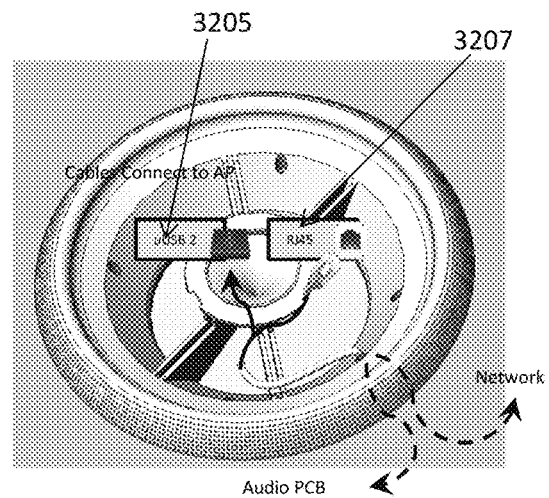

FIGS. 31 and 32 show back and front, respective, views of a compact public address access point apparatus 3104 with the AP housing removed, including the connectors and circuitry (e.g., passive filter network). For example, in FIG. 31, the apparatus includes a passive filter network 3105 that connects to the high frequency speaker and low-frequency speaker components (not shown). An audio circuitry (audio PCB 2107) may also connect and drive the speaker(s) and may receive input from a network connection 3109. In FIG. 32, cable connections between the speaker assembly (frame) and the AP housing, such as a USB connector 3205 and/or Ethernet connection 3207, are shown.

Figure 33:
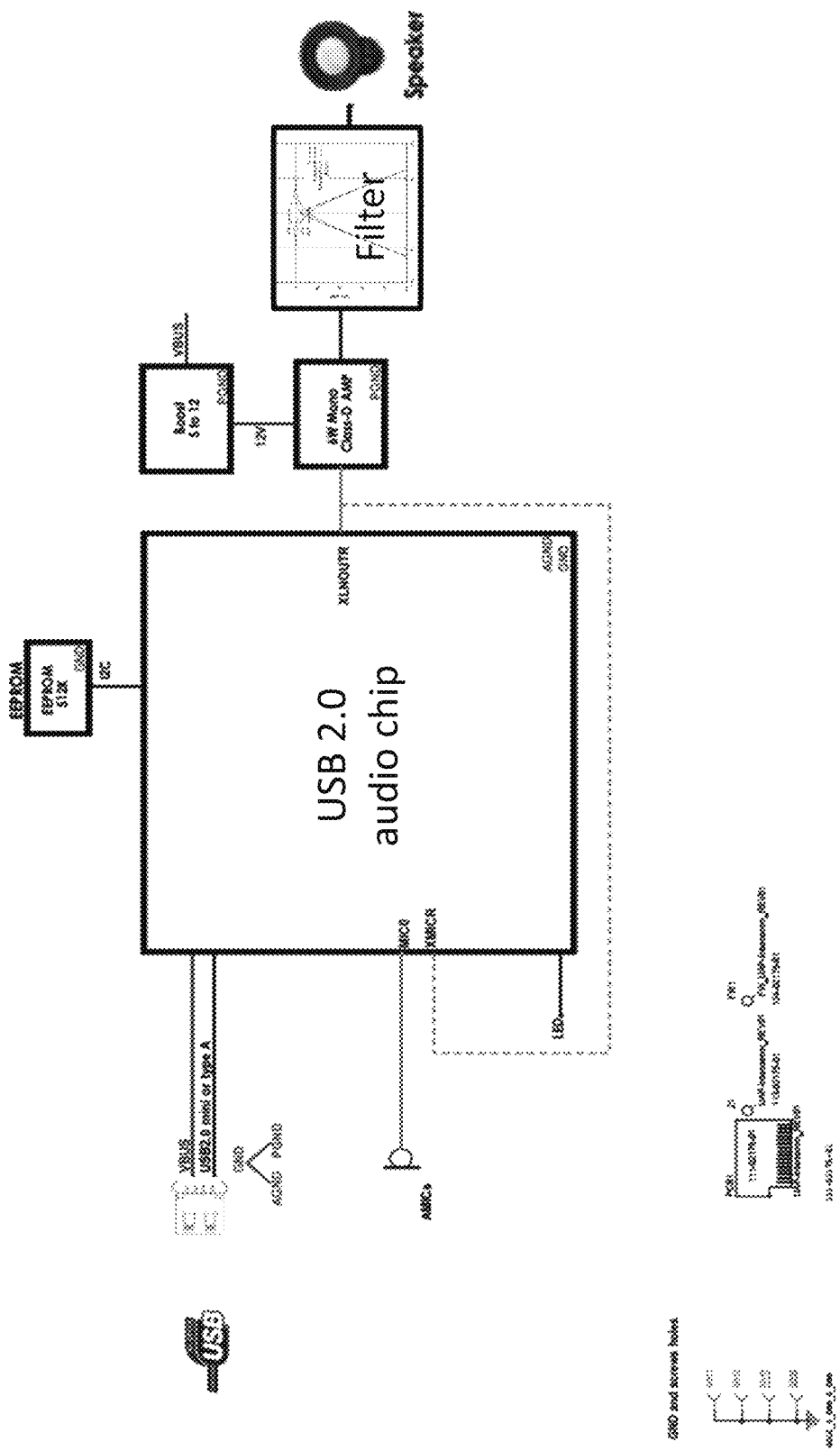
FIG. 33 shows an exemplary electrical layout with active filtering for a loudspeaker (speaker interface), including USB input (e.g., from AP, controlling speaker), on-board circuitry, filter, and speaker (magnetically-driven). Although only a single speaker is shown as part of the speaker interface, in some variations multiple speakers may be included, and may be controlled by the same or separate circuitry.

FIG. 33 shows an exemplary electrical layout with active filtering for a loudspeaker (speaker interface), including USB input (e.g., from AP, controlling speaker), on-board circuitry, filter, and speaker (magnetically-driven). Although only a single speaker is shown as part of the speaker interface, in some variations multiple speakers may be included, and may be controlled by the same or separate circuitry.

Figure 34:
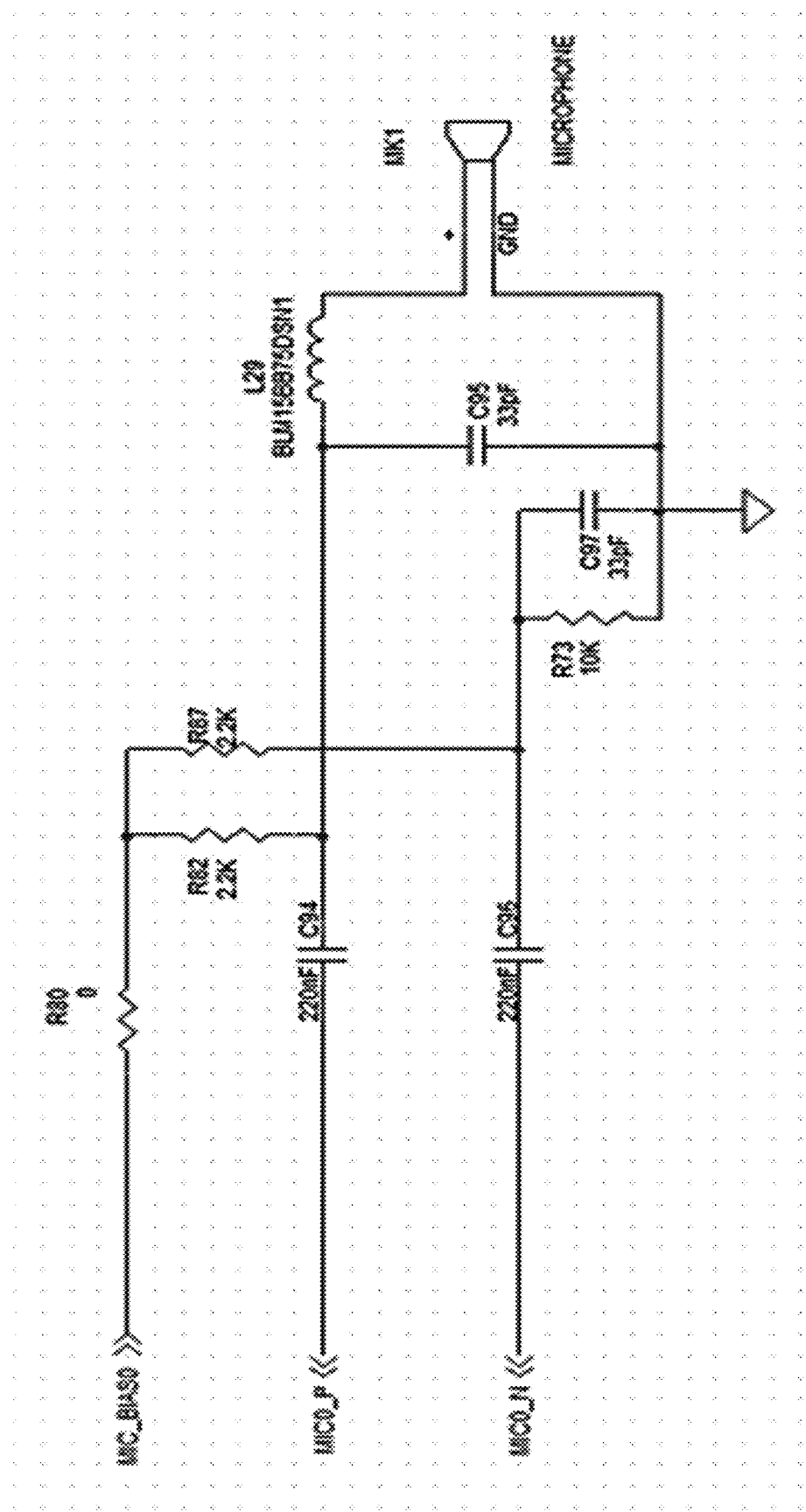
FIG. 34 shows another example of a circuit that may be included as part of the compact public address access point apparatus, controlling a microphone; the speaker interface may include one or more microphones.

FIG. 34 shows another example of a circuit that may be included as part of the compact public address access point apparatus, controlling a microphone; the speaker interface may include one or more microphones.

Figure 35:
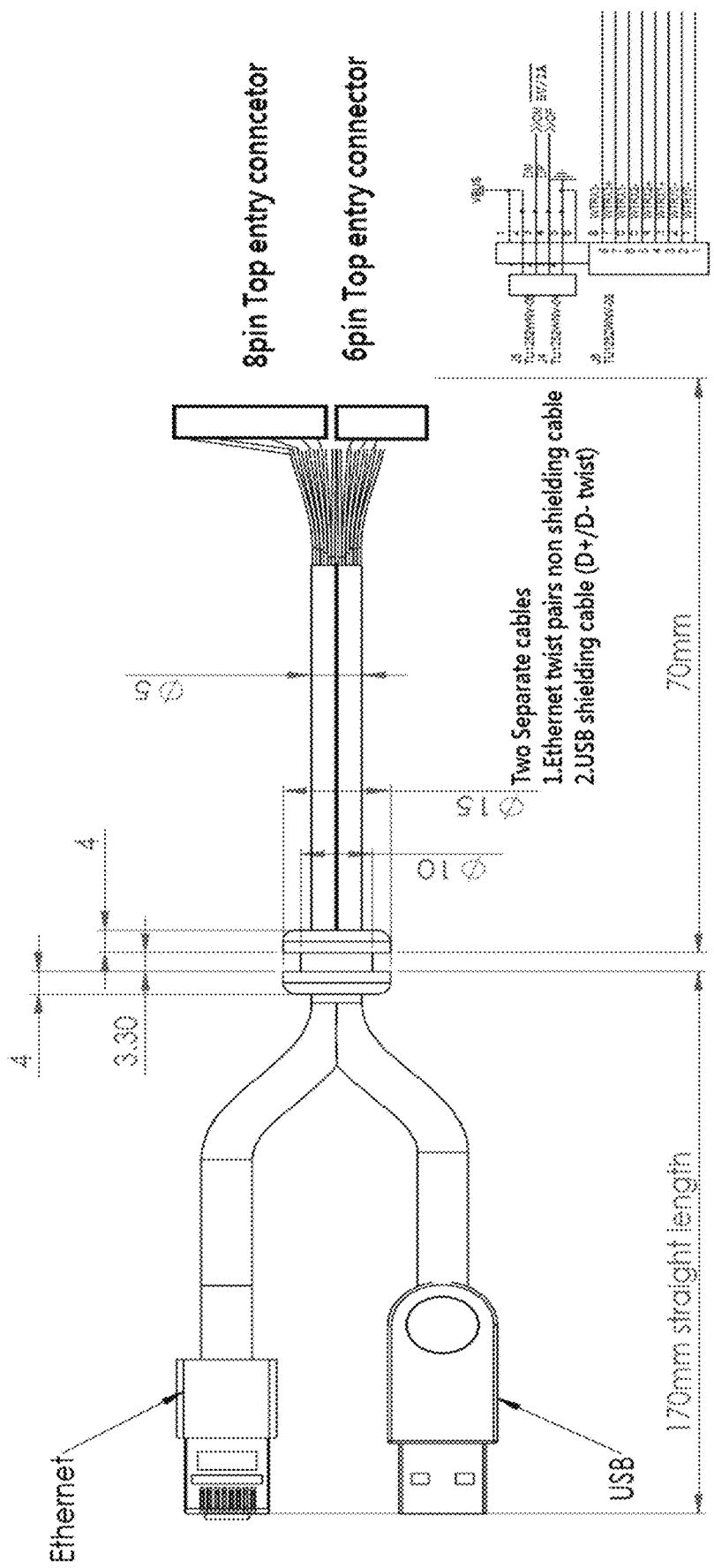
FIG. 35 is an example of a schematic of the cabling that may be included in any of the compact public address access point apparatuses described herein.

FIG. 35 is an example of a schematic of the cabling that may be included in any of the compact public address access point apparatuses described herein.

Figure 36:
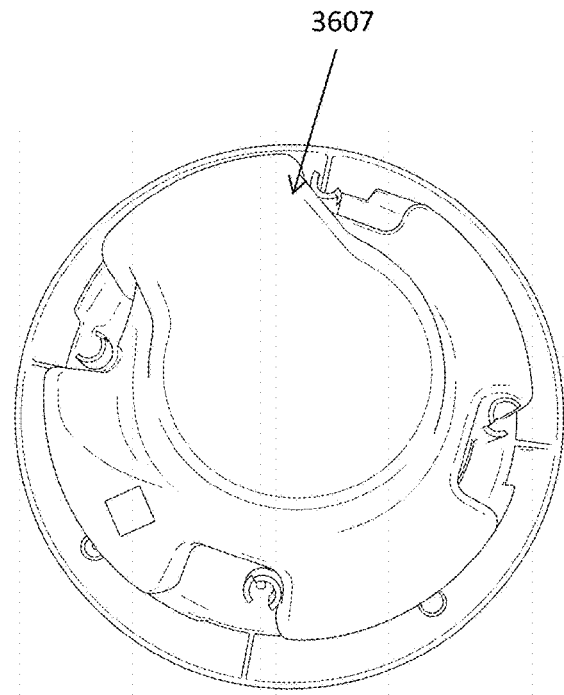
FIGS. 36, 37, and 38 show variations of back covers for compact public address access point apparatuses. The back cover may include vibration-damping or prevention, which may prevent rattling on the flat areas due to flexing with the acoustic waves. Without damping, a rattle may occur on back cover in the flat area when excited, e.g., with 200 Hz @ $3V_{rms}$. Structural ribs may be included to dampen/prevent this, and/or a slight radius may be included to the flat surface area to make it stronger. A foam, e.g., with PSA, may help prevent rattles due to touching of the magnet to the back cover or any cables that contact that area.
Figure 37:
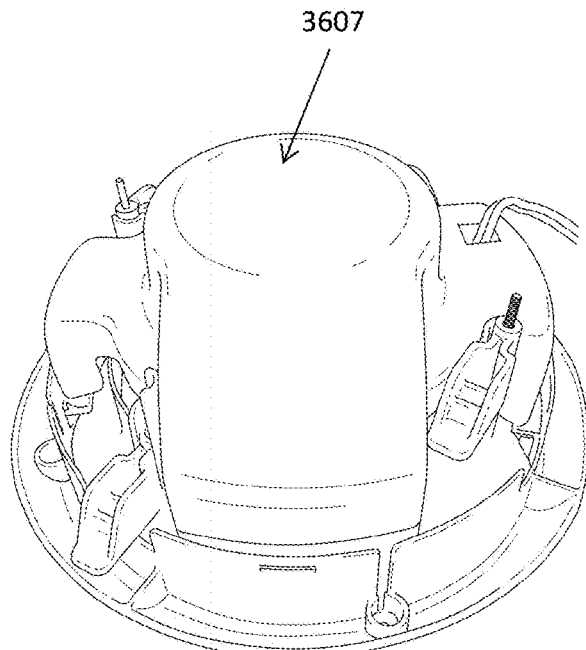
Figure 38:
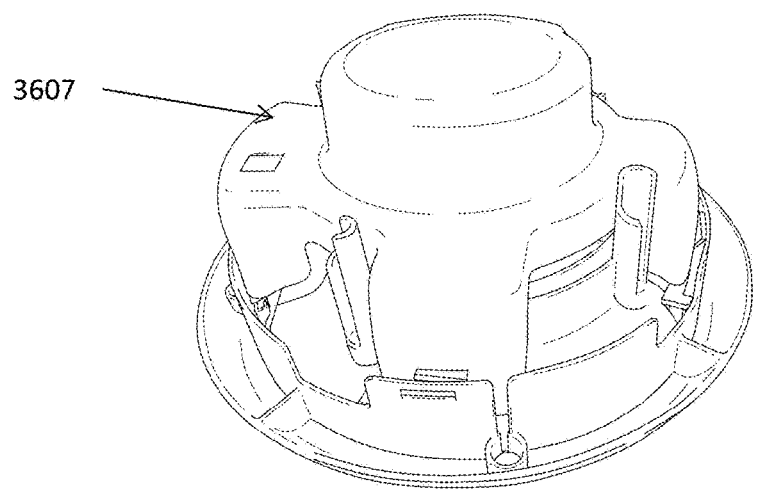

FIGS. 36, 37, and 38 show variations of back covers for compact public address access point apparatuses. The back cover 3607 may include vibration-damping or prevention, such as acoustic padding or foam, which may prevent rattling on the flat areas due to flexing with the acoustic waves. Without damping, a rattle may occur on back cover in the flat area when excited, e.g., with 200 Hz @ 3 Vrms. Structural ribs may be included to dampen/prevent this, and/or a slight radius may be included to the flat surface area to make it stronger. A foam, e.g., with PSA, may help prevent rattles due to touching of the magnet to the back cover or any cables that contact that area.

Figure 39A:
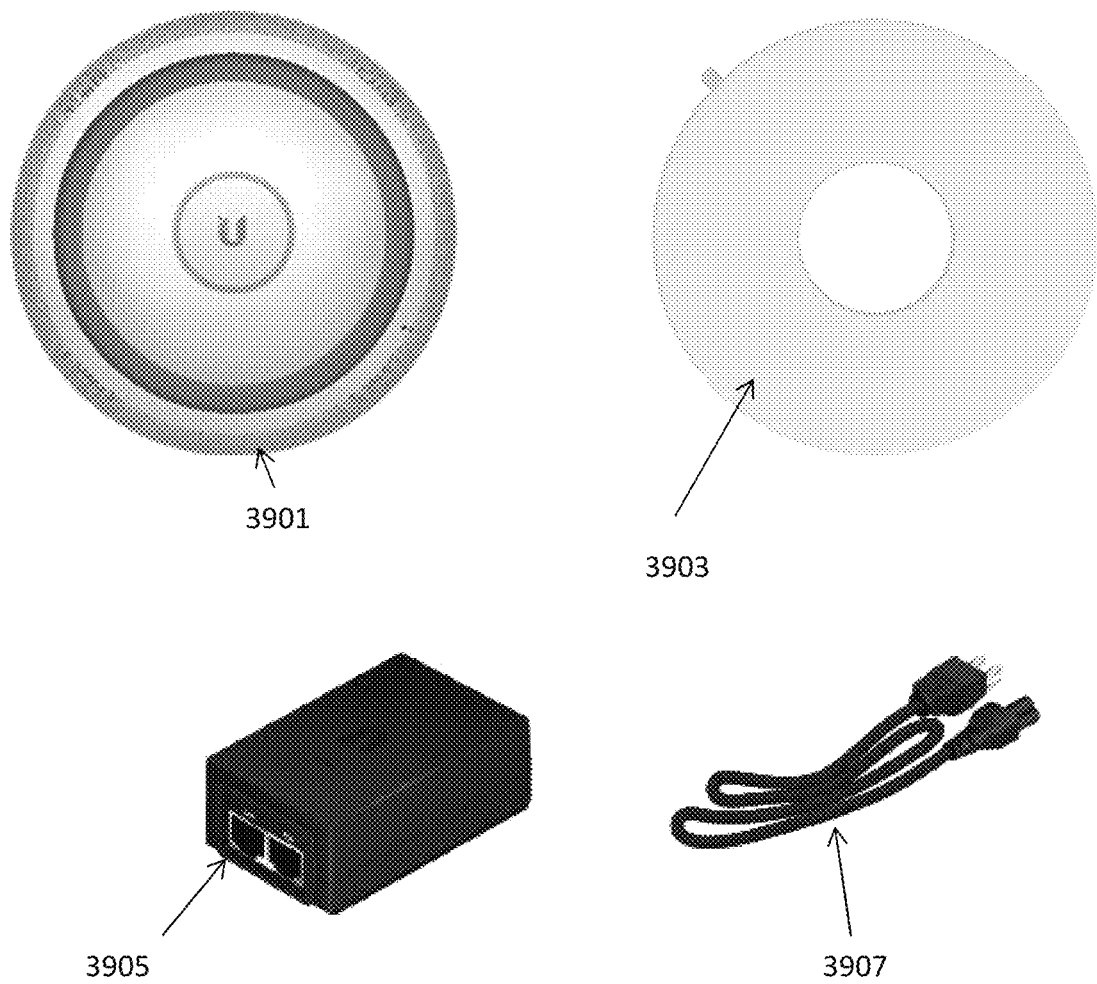
FIG. 39A illustrates one example of a kit including a compact public address access point apparatus, a mounting template, a power over Ethernet (PoE) converter (and mount) and a power cord.

FIG. 39A illustrates one example of a kit including a compact public address access point apparatus 3901, a mounting template 3903, a power over Ethernet (PoE) converter 3905 (and mount) and a power cord 3907. For example, the PoE converter may be a 48V, 0.5 A converter, and may include a mounting bracket for mounting within the wall or ceiling. In some variations the PoE converter is integrated into the apparatus.

Figure 39B:
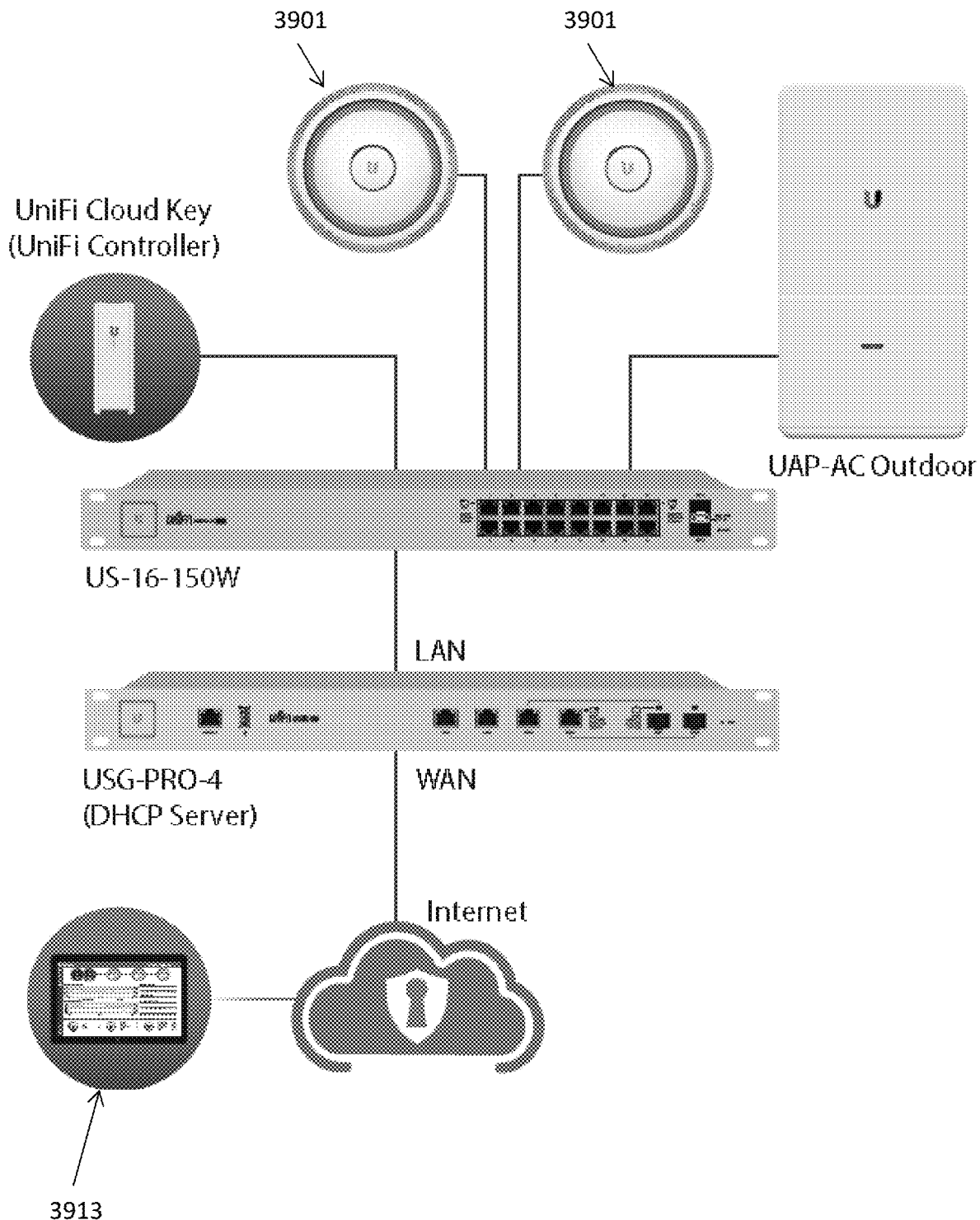
FIG. 39B is an example of a network diagram including one or more (two are shown) compact public address access point apparatuses.

FIG. 39B is an example of a network diagram including one or more (two are shown) compact public address access point apparatuses 3901, 3901'. In this example, the compact public address access point apparatuses are connected by PoE connection to a router and/or network server, which may in turn be connected to the cloud. The compact public address access point apparatuses may be controlled (e.g., to provide an acoustic signal to announce on the public address speakers) remotely using a hand-held wireless apparatus, such as a smartphone running a remote access software 3913. The software may permit a user to select which (or all) of the compact public address access point apparatuses to make an announcement on, then speak the announcement (or select a pre-recorded announcement) and make the announcement over one or more compact public address access point apparatuses.

Figure 39C:
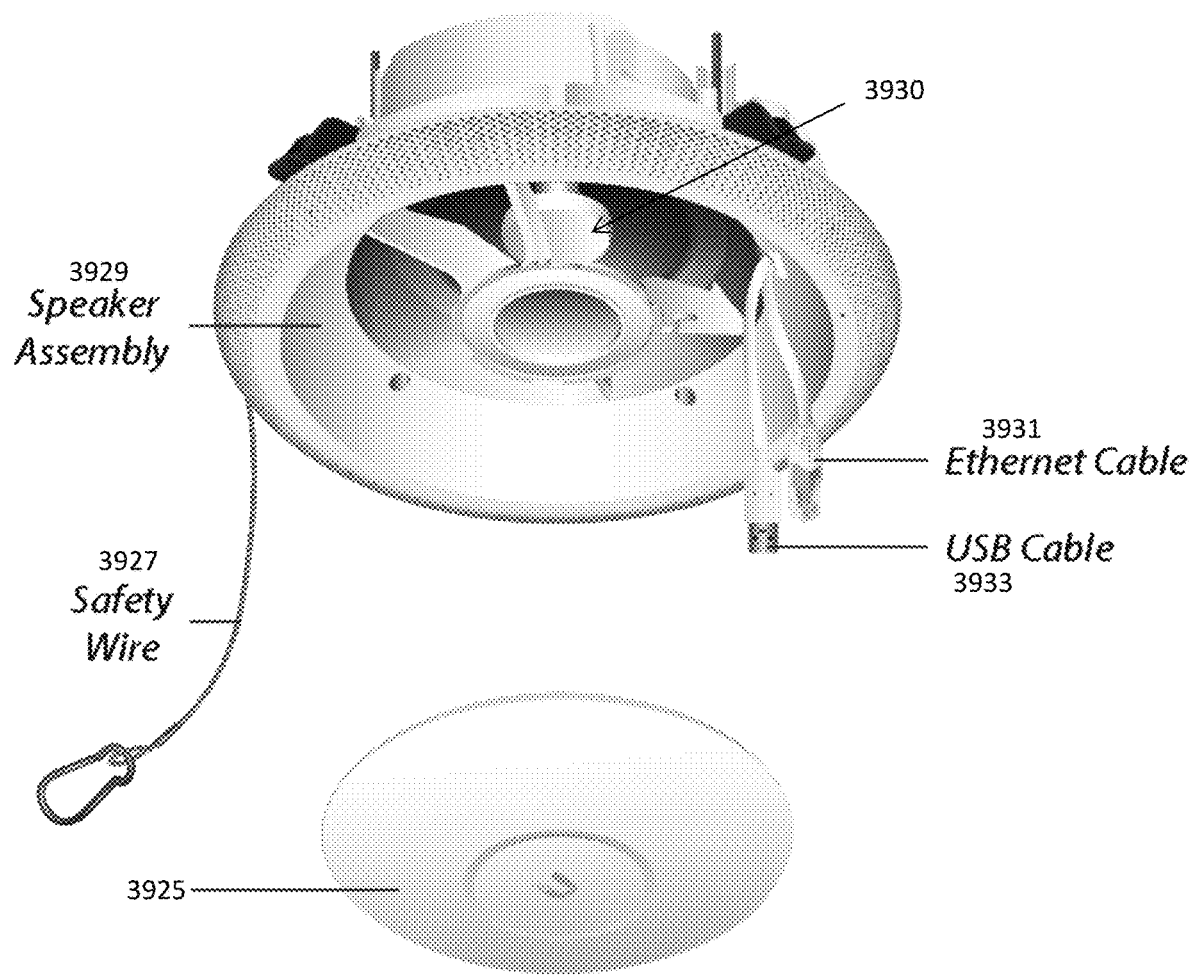
FIG. 39C is a front perspective view of another example of a compact public address access point apparatus, showing the AP (AP housing) separated from the speaker assembly (frame, speaker, acoustic control circuitry, etc.).
Figure 39D:
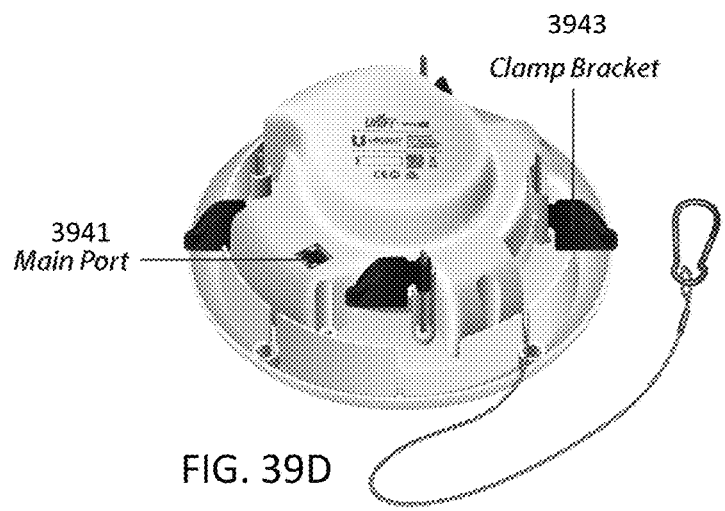
FIG. 39D is a back perspective view of the compact public address access point apparatus of FIG. 39C.

FIG. 39C is a front perspective view of another example of a compact public address access point apparatus, showing an AP (AP housing 3925) separated from the speaker assembly (frame 3929, speaker 3930, acoustic control circuitry (not visible), etc.). The apparatus may include one or more connections between the frame 3929 and the access point housing 2925, such as an Ethernet connection 3931 and/or a USB cable 3933. FIG. 39D is a back perspective view of the compact public address access point apparatus of FIG. 39C, showing a main Ethernet port 3941 and a plurality of clamp brackets 3943.

Figure 40A:
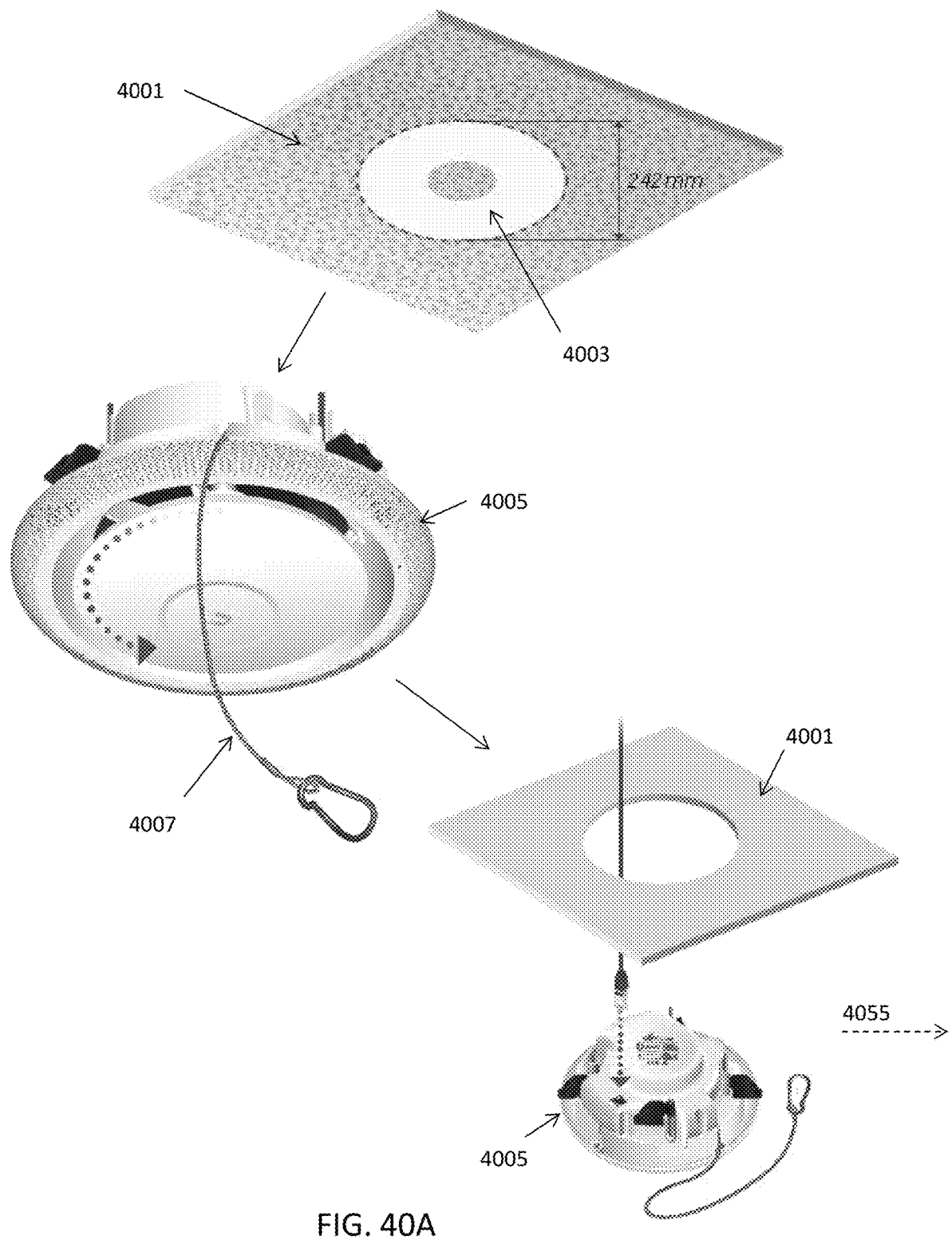
FIGS. 40A-40D illustrate one method of installing a compact public address access point apparatus.
Figure 40B:
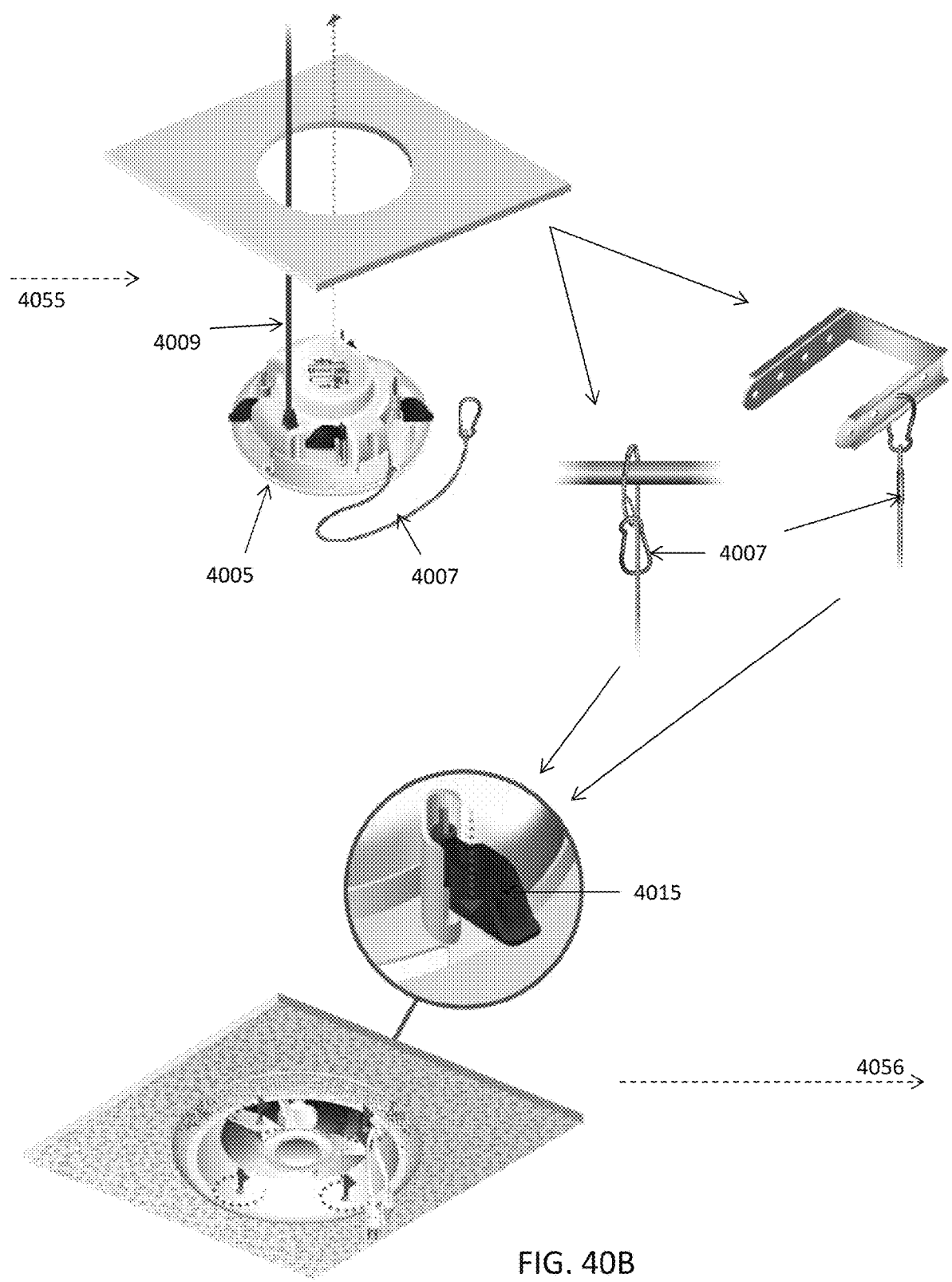

FIGS. 40A-40D illustrate one method of installing a compact public address access point apparatus. In this example, the installation instructions may include first removing a ceiling tile 4001 and removing the backing from a mounting template 4003 and positioning the template on the ceiling surface. A hole may then be cut (e.g., drilled) into the ceiling surface 4001'. Prior to inserting the apparatus into this hole, the AP housing may be separated from the rest of the apparatus 4005, e.g., by rotating the AP housing counterclockwise to release it from the speaker assembly. Thereafter, as shown in FIG. 40B, an Ethernet cable, including a PoE cable, may be coupled to the apparatus by inserting into the main port on the back of the apparatus. Optionally, a safety leash 4007 may be attached between the apparatus and a secure site in the ceiling or wall. The apparatus may then be secured in the opening by pushing it into the opening and using a screwdriver to actuate the set screws to drive the clamp brackets 4015 from a retracted position against the body of the device into an extended position so that they may hold the ceiling surface between the bracket and the frame or cover of the apparatus.

Figure 40C:
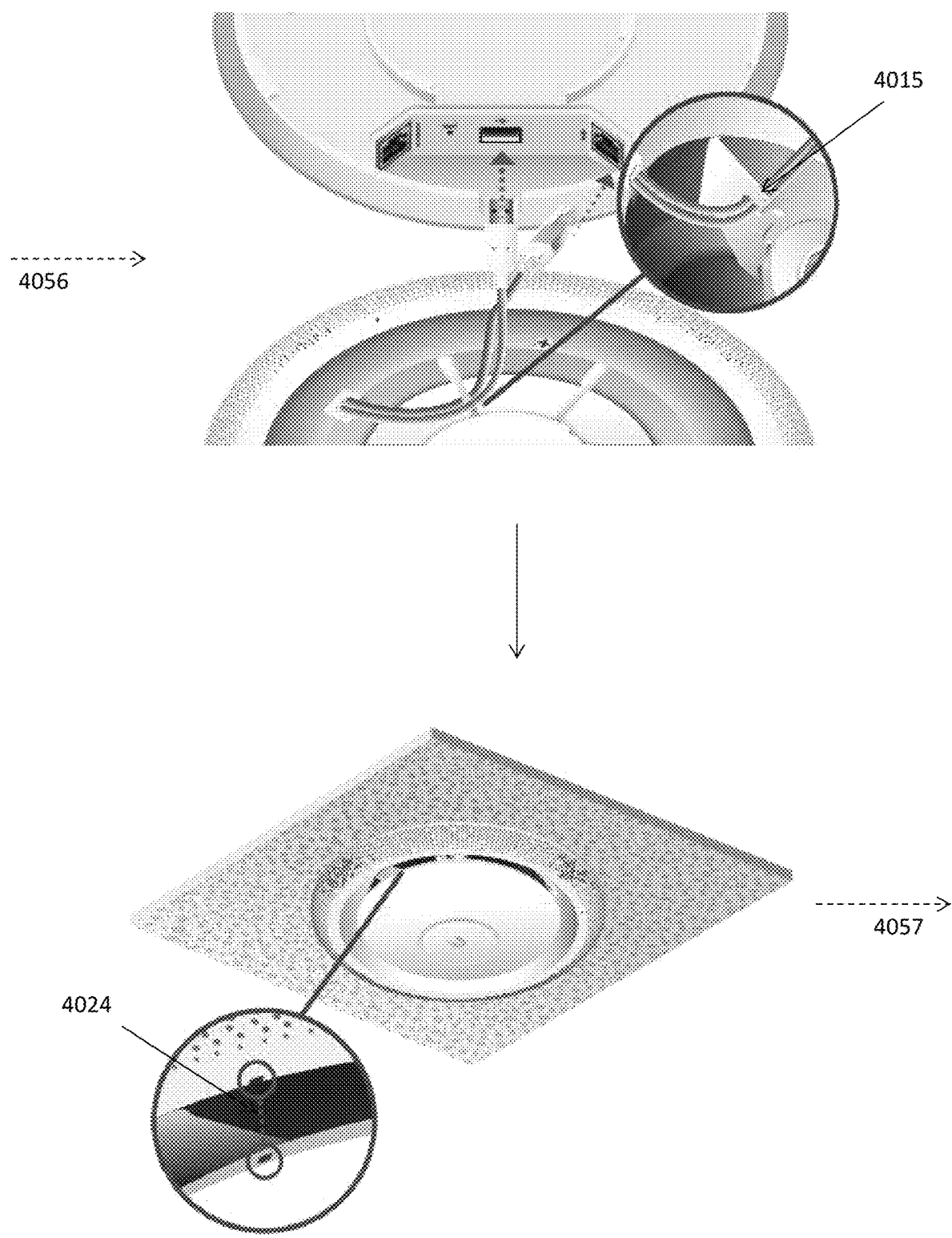
Figure 40D:
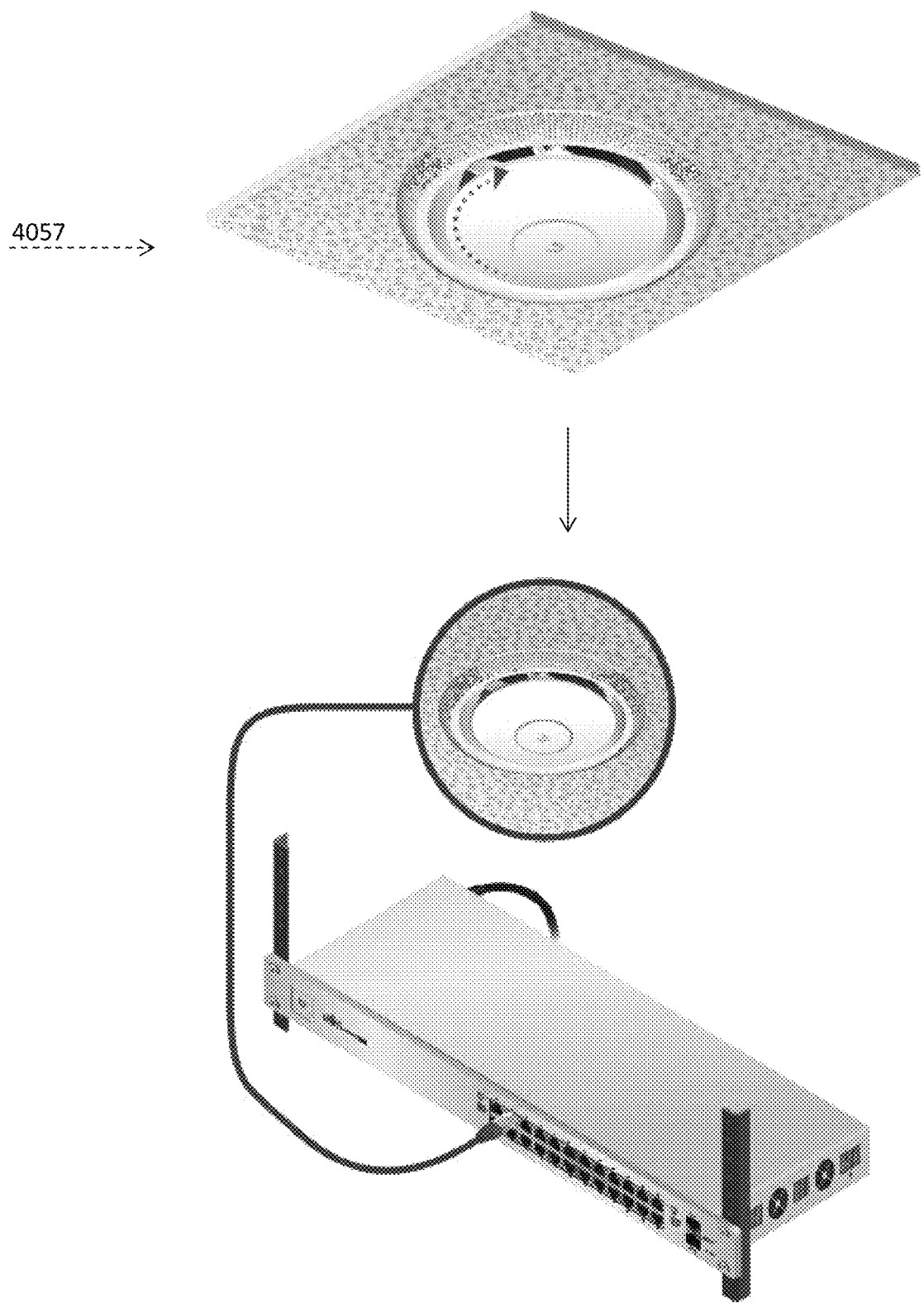

Thereafter, as shown in FIG. 40C, connectors may be made between the AP housing and the speaker assembly. When both USB and Ethernet connections are connected, the cables may be plugged in, as shown on the top of FIG. 40C, then excess cable length held in a slot 4018 in the frame, so that the cables are not visible when the AP housing is again inserted over the speaker, as shown in FIG. 40C. The AP housing may be mounted or coupled to the speaker assembly as shown so that there is a gap 4024 between the AP housing and the annular acoustic reflector inner surface. This gap may be greater than 5 mm, greater than 6 mm, greater than 7 mm, greater than 8 mm, greater than 9 mm, greater than 1 cm, greater than 1.2 cm, greater than 1.3 cm, etc. or between 4 mm and 2 cm, between 5 mm and 15 mm, between 5 mm and 10 mm, etc.). As shown in the top of FIG. 40D, the AP housing may then be secured (e.g., by rotating clockwise relative to the frame) to the frame. Alignment markers may indicate how to position the AP housing so that it can be screwed in, and/or how far to rotate it. If the ceiling tile was removed to secure the apparatus in place, the ceiling time may then be secured back in position. Thereafter, the compact public address access point apparatus may be powered up. For example, the apparatus may automatically sense PoE connection (e.g., 802.3 support) and be powered directly by the PoE or a separate power line. Once connected to the Ethernet connection as just described, the apparatus may be connected to the network through a switch, as shown in the bottom half of FIG. 40D.

Figure 41:
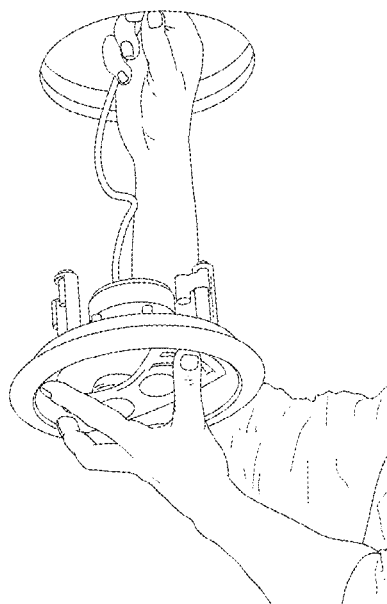
FIG. 41 illustrates the connection of compact public address access point apparatus to an in-wall POE (Ethernet) so that the apparatus may connect and provide data and power connection to the AP portion, when connected to the speaker assembly portion.

FIG. 41 illustrates the connection of compact public address access point apparatus to an in-wall POE (Ethernet) so that the apparatus may connect and provide data and power connection to the AP portion, when connected to the speaker assembly portion.

Figure 42A:
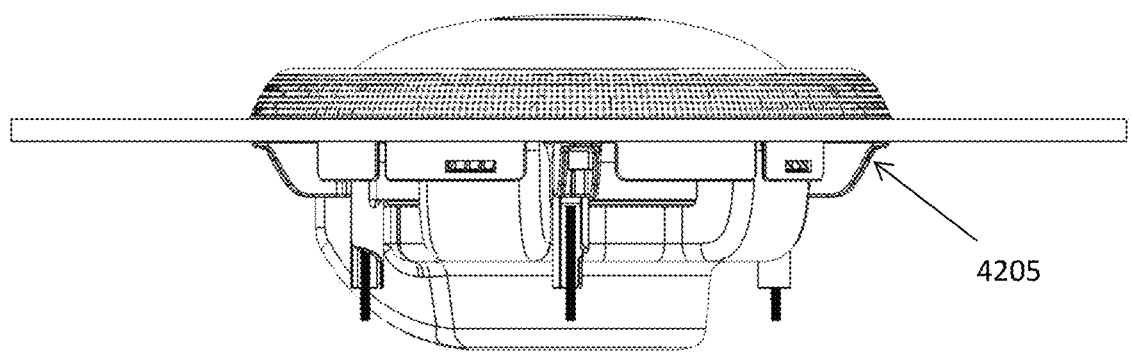
FIGS. 42A and 42B show an exemplary apparatus attached (FIG. 42A) and not attached (FIG. 42B) to a ceiling (shown upside down in these figures). Four clamps are engaged to hold the apparatus to the opening through the ceiling (e.g., acoustic board, drywall, etc.).
Figure 42B:
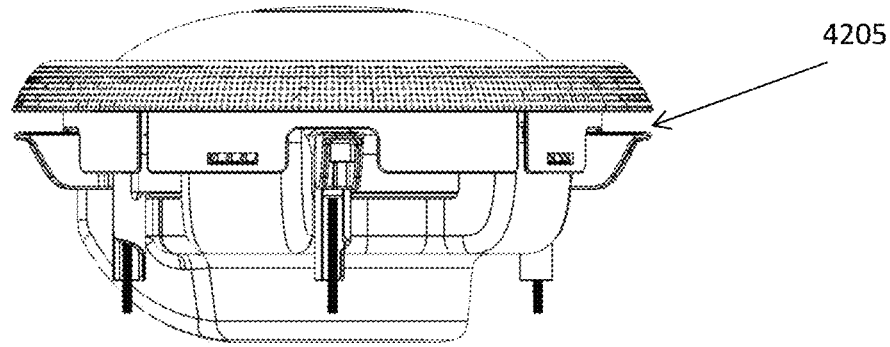

FIGS. 42A and 42B show an exemplary apparatus attached (FIG. 42A) and not attached (FIG. 42B) to a ceiling (shown upside down in these figures). Four clamps 4205 are engaged to hold the apparatus to the opening through the ceiling (e.g., acoustic board, drywall, etc.)

Figures 43, 44:
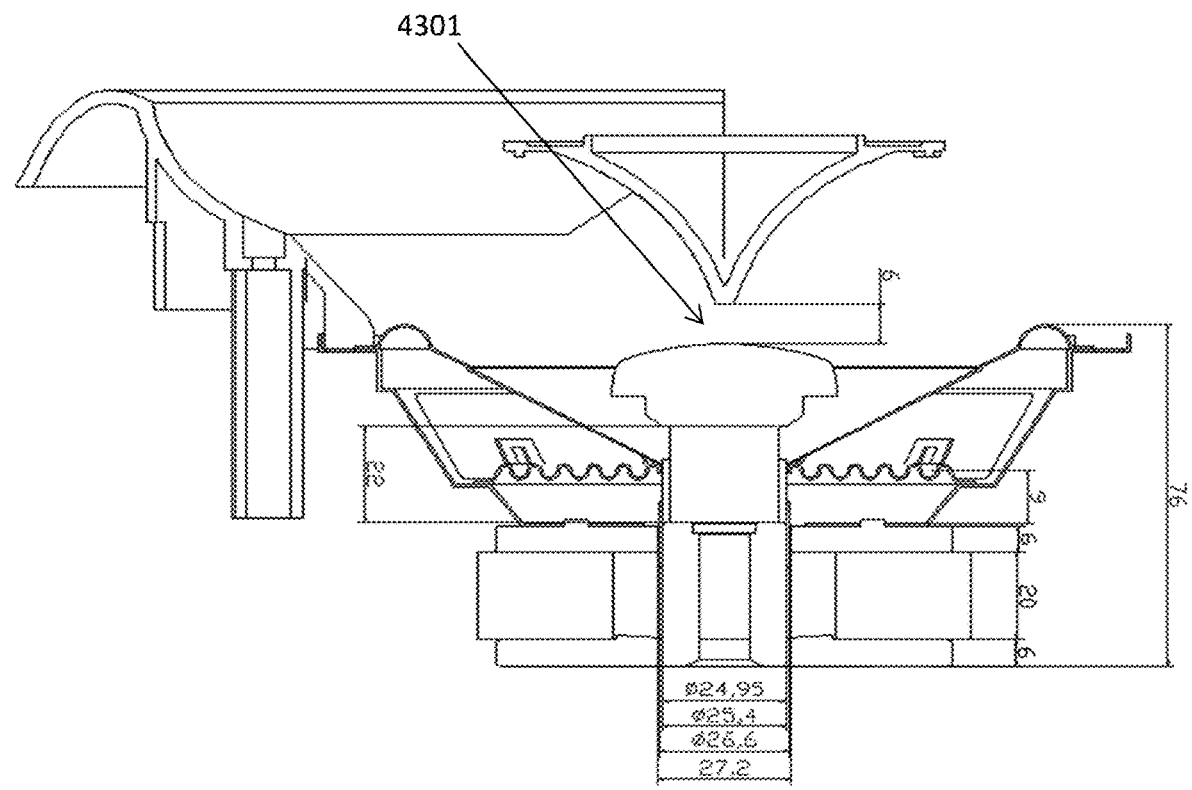
FIGS. 43 and 44 illustrate design features and/or modification of a speaker portion of a compact public address access point apparatus. For example the speaker may include a central tweeter that can be moved flush with a conical acoustic reflector beneath the AP housing over the speaker horn. The speaker itself may include a magnet of solid neodymium. The speaker (loudspeaker) may overall have a very high efficiency.

FIGS. 43 and 44 illustrate design features and/or modification of a speaker portion of a compact public address access point apparatus. For example the speaker may include a central tweeter 4301 that can be moved flush with a conical acoustic reflector beneath the AP housing over the speaker horn. The speaker itself may include a magnet 4401 of solid neodymium. The speaker (loudspeaker) may overall have a very high efficiency.

FIG. 45 is another schematic view of a speaker portion (showing a schematic representation on the left, and an external view on the right) of a compact public address access point apparatus. In this example, a ring magnet 4505 (for the speaker) is designed with a very low Mms to keep the efficiency of the speaker high. The speaker is powered by only 8 W USB amp. The target output is 94 dB (1 W/1 M).

Figure 48:
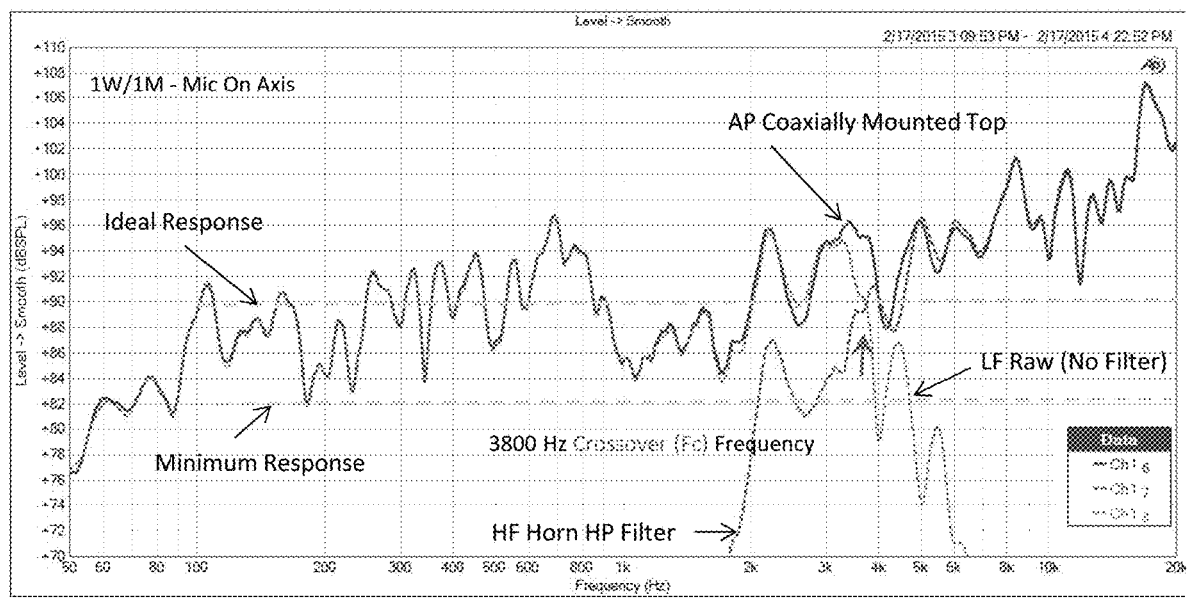

FIG. 46 is an illustration of one example of an apparatus (compact public address access point apparatus) in connecting the AP housing (for the AP portion of the apparatus) being mounted over the frame (e.g., the speaker assembly). In this example, the speaker, conical acoustic reflector and annular region are configured so that an acoustic signal between 70 Hz and 20 kHz (e.g., between 100 Hz and 20 kHz) emitted by the compact public address access point when the access point is mounted over the speaker apparatus is greater than 82 dBSPL (minimum response). FIGS. 47 and 48 illustrate exemplary output for a prototype compact public address access point apparatus over a range of frequencies. These examples are configured as a ceiling mounted compact public address access point apparatus.

Figure 49:
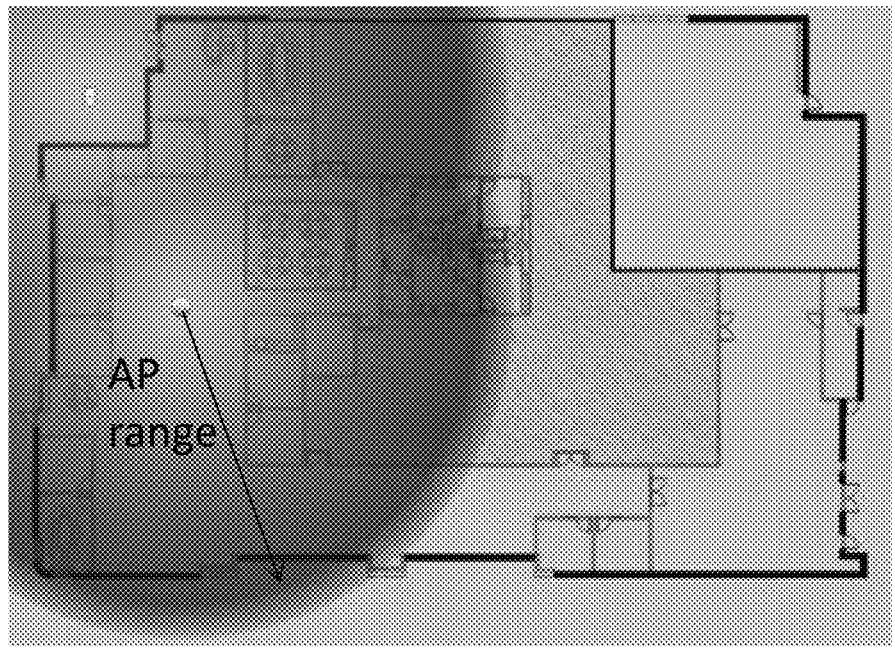
FIG. 49 shows a diagram of the inside of a building with a heat map region showing the WiFi transmission range of an exemplary compact public address access point apparatus.
Figure 50:
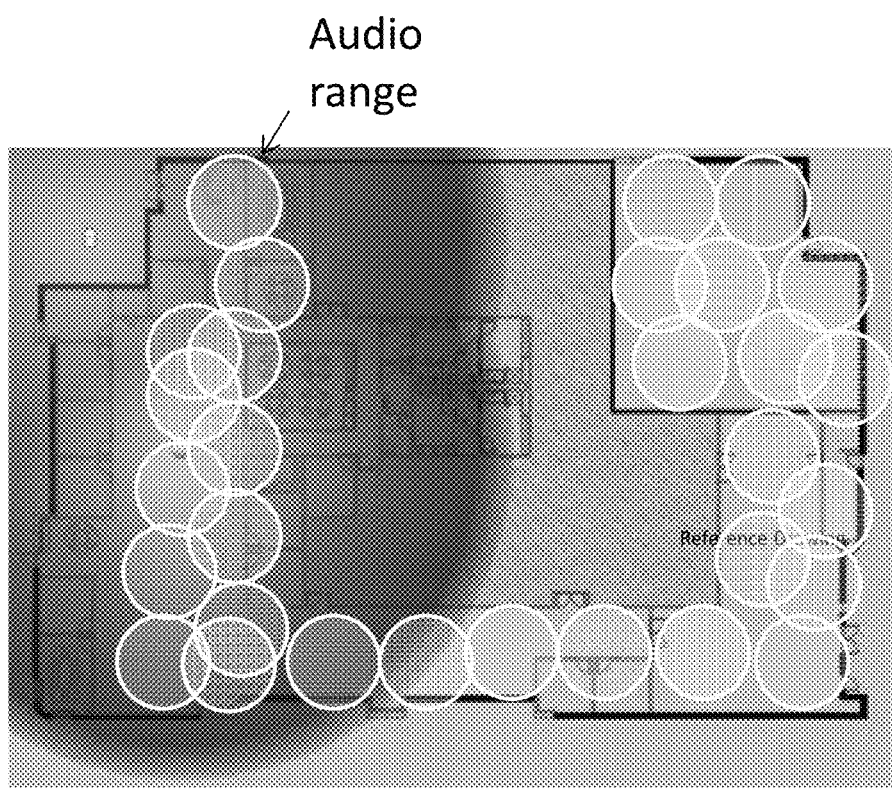
FIG. 50 overlays the map shown in FIG. 49 with acoustic projection range for a typical compact public address access point apparatus at typical operating levels (volumes, etc.). The smaller circles illustrate reasonable acoustic ranges.

In use, the apparatuses described herein may be used as part of a MESH network and may also or alternatively be included in an acoustic network to provide acoustic coverage of a large area, as well as wireless access coverage. For example, FIG. 49 shows a diagram of the inside of a building with a heat map region showing the WiFi transmission range of an exemplary compact public address access point apparatus. FIG. 50 overlays the map shown in FIG. 49 with acoustic projection range for a typical compact public address access point apparatus at typical operating levels (volumes, etc.). The smaller circles illustrate reasonable acoustic ranges.

Figure 51:
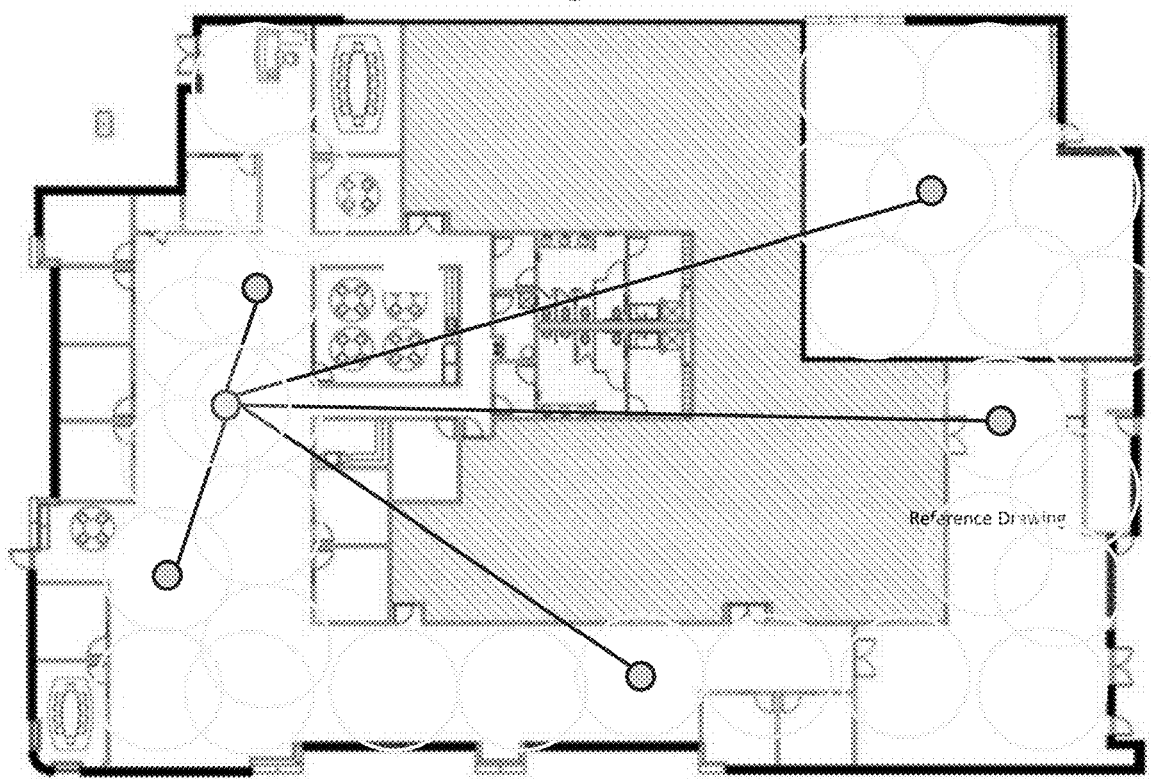
FIGS. 51 and 52 illustrate mesh assignments for multiple APs and speakers that may be used to cover an internal layout of a building.
Figure 52:
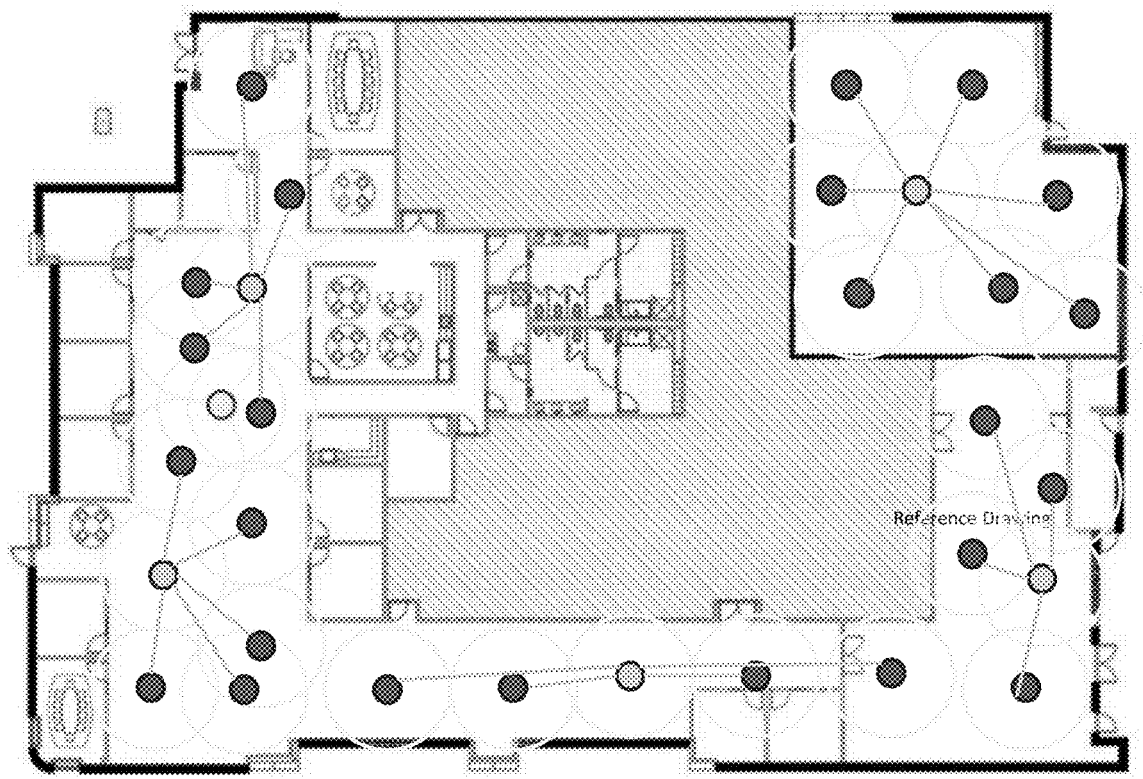
Figure 53:
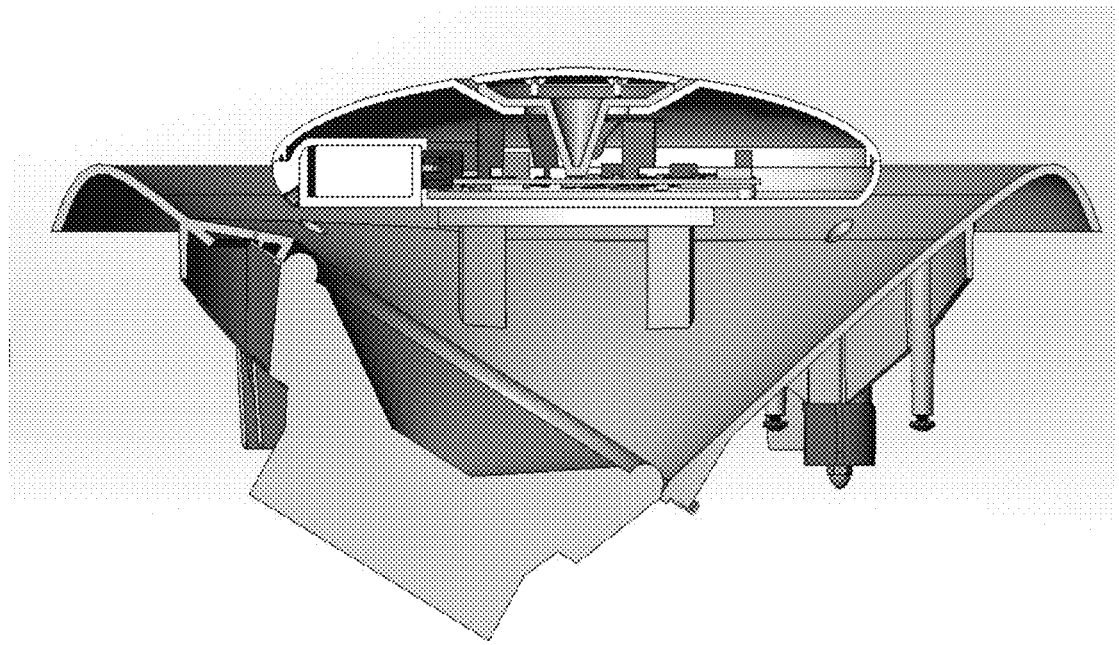
FIGS. 53-64 illustrate alternative variations of compact public address access point apparatuses as described and shown herein.

FIGS. 51 and 52 illustrate mesh assignments for multiple APs and speakers (including full compact public address access point apparatus and 'dummy' speakers that may be configured as part of a speaker network for use with one or more compact public address access point apparatuses) that may be used to cover an internal layout of a building. In FIG. 51, the mesh configuration shows an overlay of speaker coverage for even SPL mapping. The ratio of speakers to AP may be, e.g., 10 to 1 (scalability is an issue due to the radiation range. WiFi is linear attenuation while sound is logarithmic). Thus, as shown in FIGS. 51 and 52, a system may include a plurality of installed hubs for either or both speaker/APs. For example, in some variations each speaker may be a compact public address access point apparatus (and may include an integrated AP). In some variations, the system may include speaker interfaces with attached APs and additional "audio hubs" added to optimize sound patterns on the floor. Signal could be sent to the audio-only hubs (which may be speaker interfaces for APs without APs attached) via Bluetooth, analog wire or other connection. Line voltage would power audio amplifiers; secondary 70 V distributed speaker system with step down transformers may be used to configure power. This is illustrated in FIG. 52.

Figure 54:
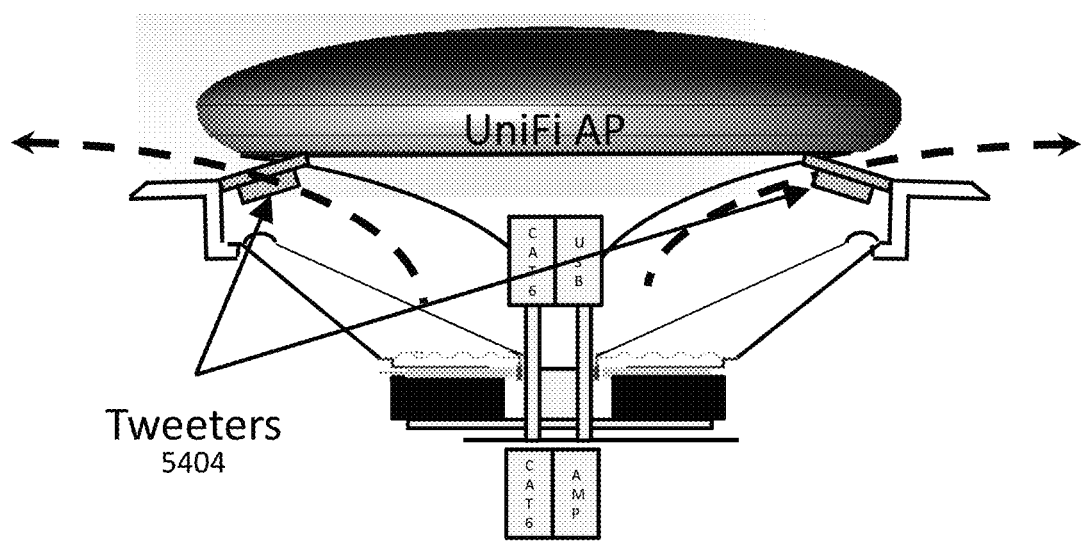
Figure 55:
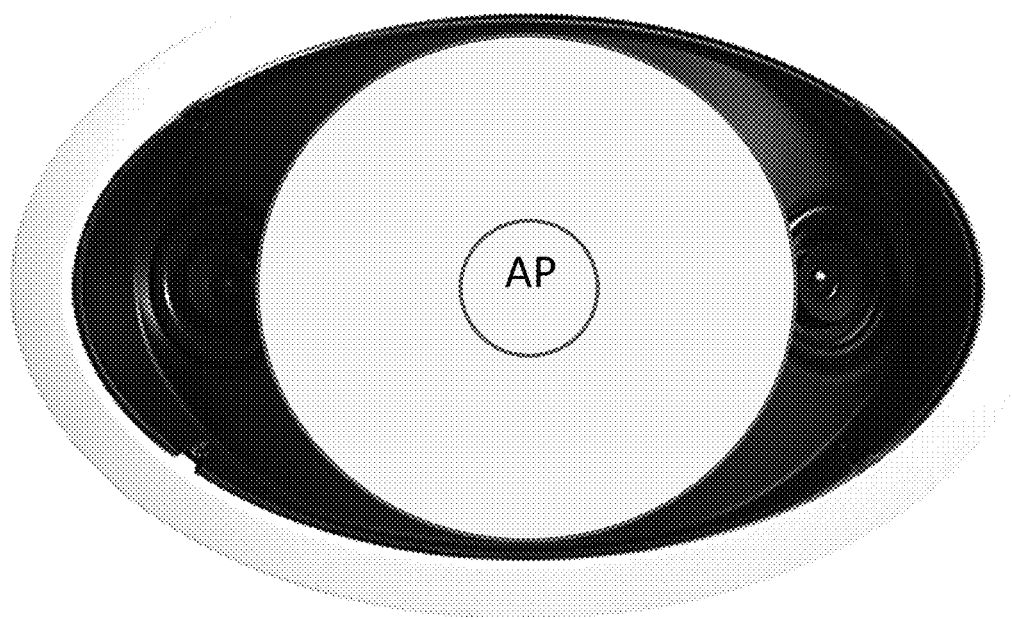

FIGS. 53-64 illustrate alternative variations of compact public address access point apparatuses as described and shown herein. In some variations (e.g., FIGS. 53, and 61-63), the speaker is off-set (off of the central axis of the apparatus). For example, FIG. 54 shows a variation in which multiple tweeters are positioned near the outer region of the central horn of the speaker interface. FIG. 55 is an example in which the compact public address access point apparatus includes two speakers, allowing stereo. The AP housing is positioned over the center region, though it may be offset. In general, the apparatus may include more than two speakers.

Figure 56:
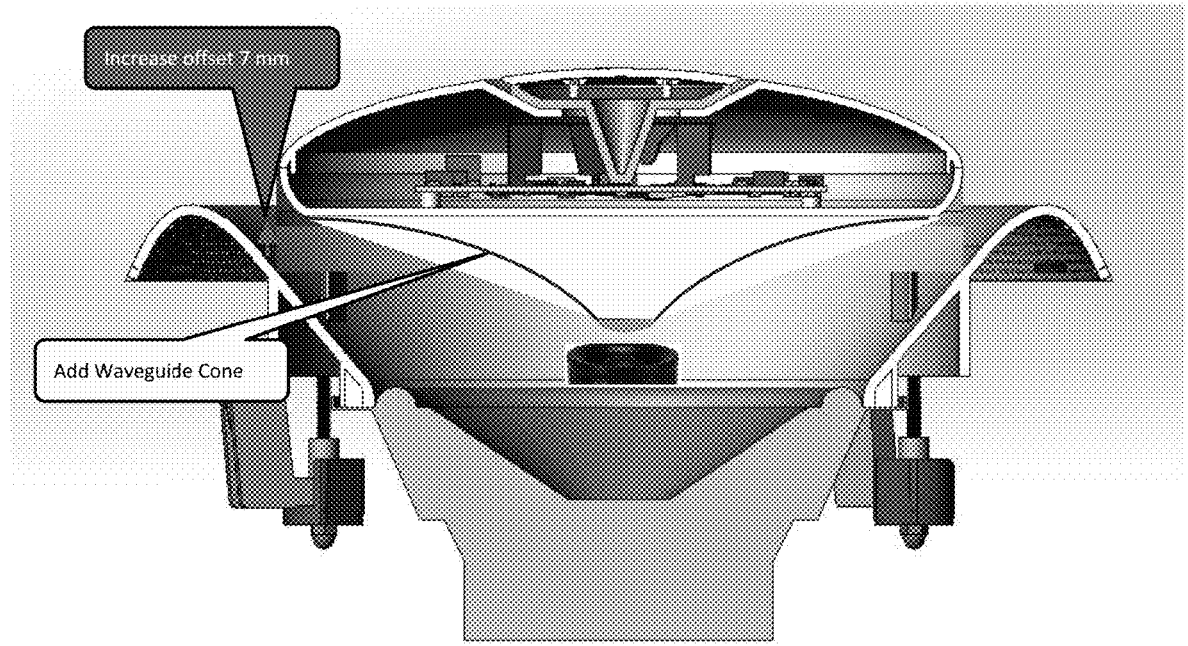

FIG. 56 is an example of a first variation of a compact public address access point apparatus having a sloped (straight-line) conical acoustic reflector profile, compared to a concave profile (also referred to herein as a waveguide cone region). The spacing between the lower edge of the AP housing (when attached) and the annular region of the frame may be >7 mm.

Figure 57:
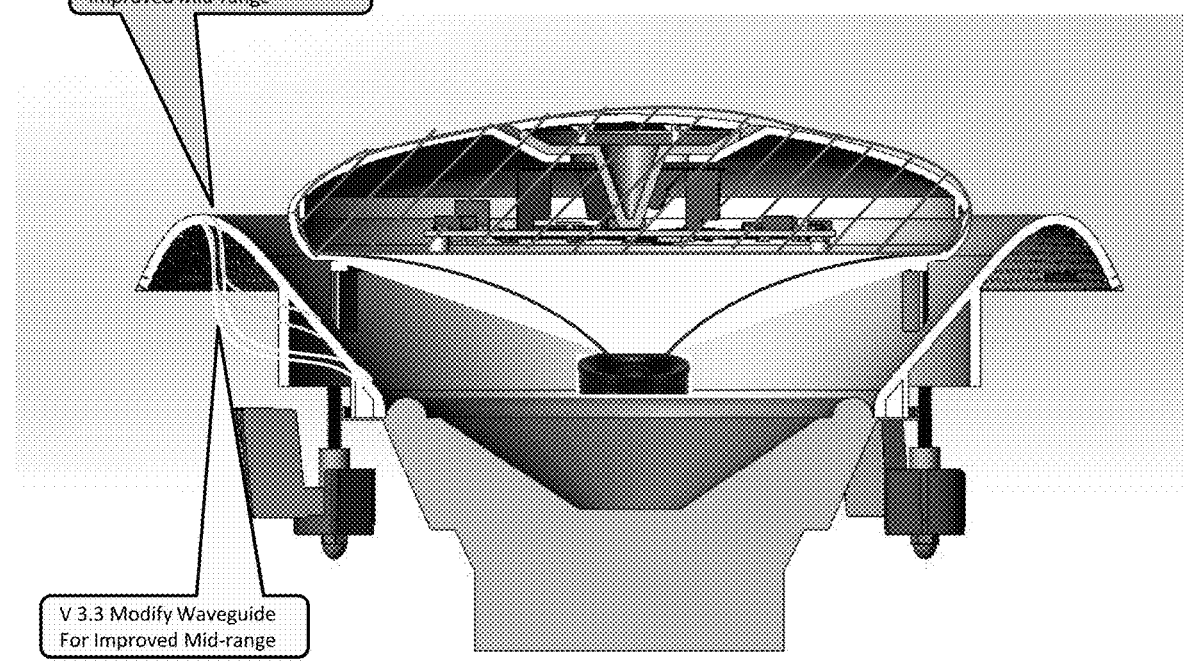
Figure 58:
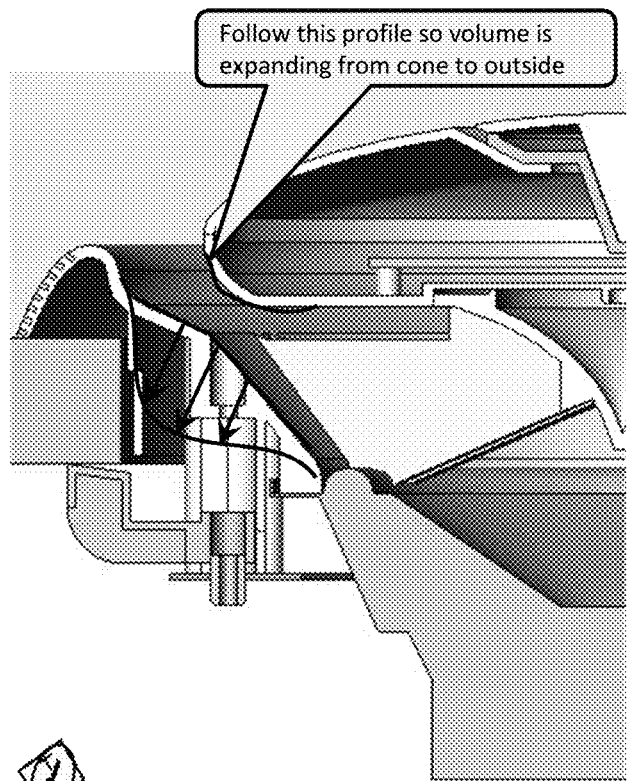
Figure 59:
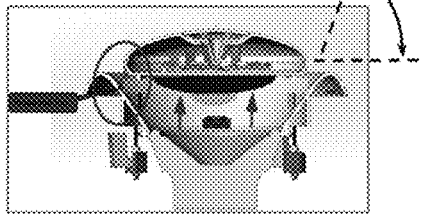
Figure 60:
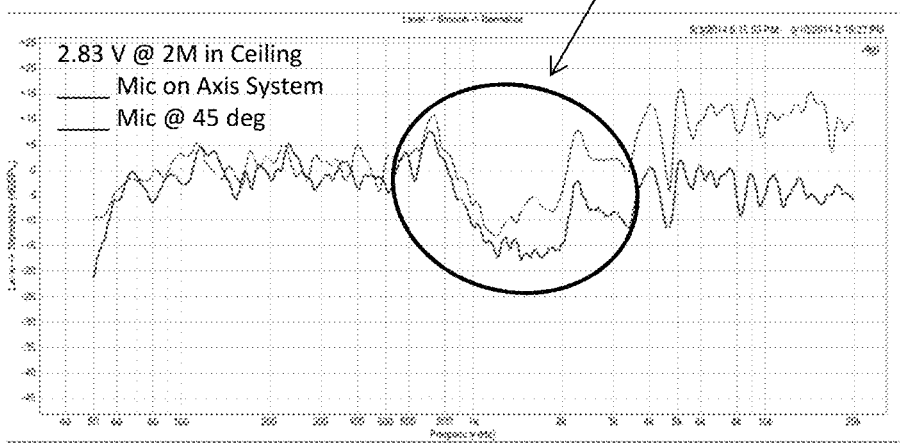

FIG. 57 is example showing how the variation of FIG. 56 may be modified, e.g., to increase the curvature of the horn profile ('waveguide') and/or the concavity of the annular region of the frame. FIG. 58 shows one of the modifications suggested in FIG. 57 in greater detail, in which the profile of the annular region surrounding the conical reflector (sonic waveguide) follows the lower profile/curvature of the AP housing when attached, which may prevent mid-range frequency drop-out shown in FIG. 60 for the variation shown in FIG. 59. FIG. 59 shows a variation similar to that shown in FIG. 56. FIG. 60 shows the output over frequency for the variation shown in FIG. 56.

Figure 61:
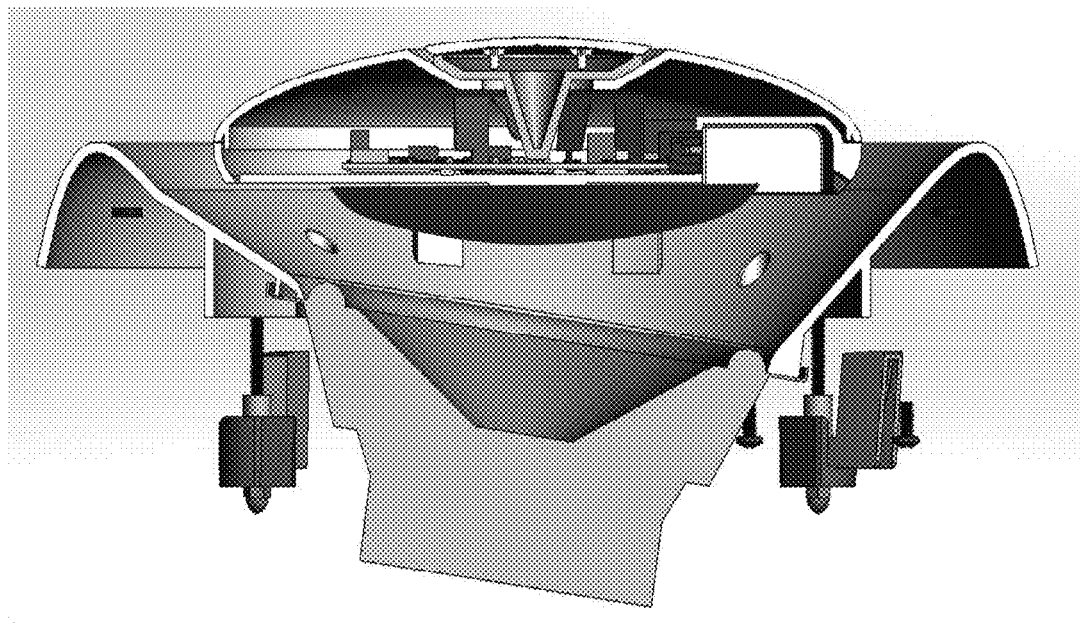
Figure 62:
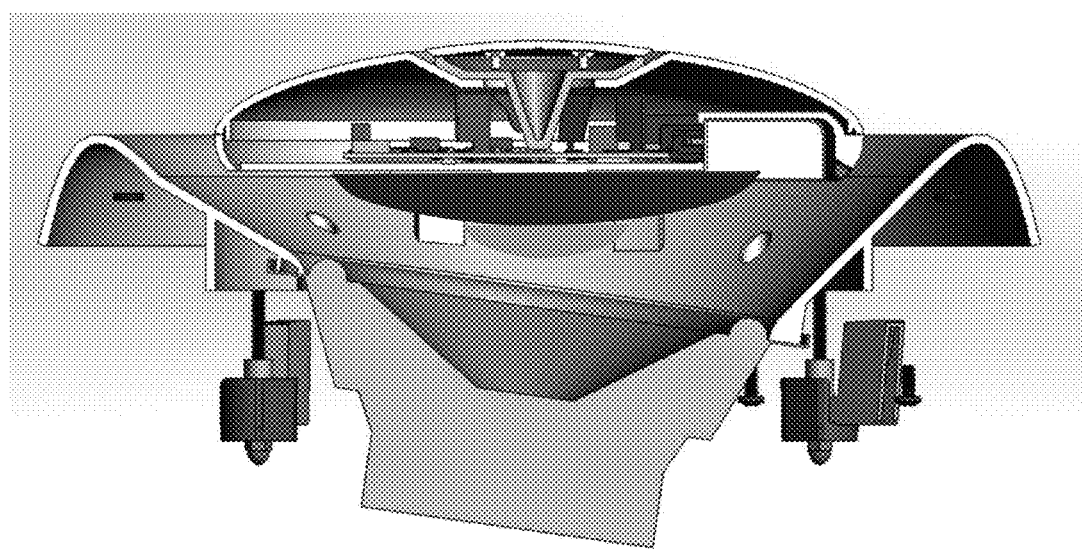
Figure 63:
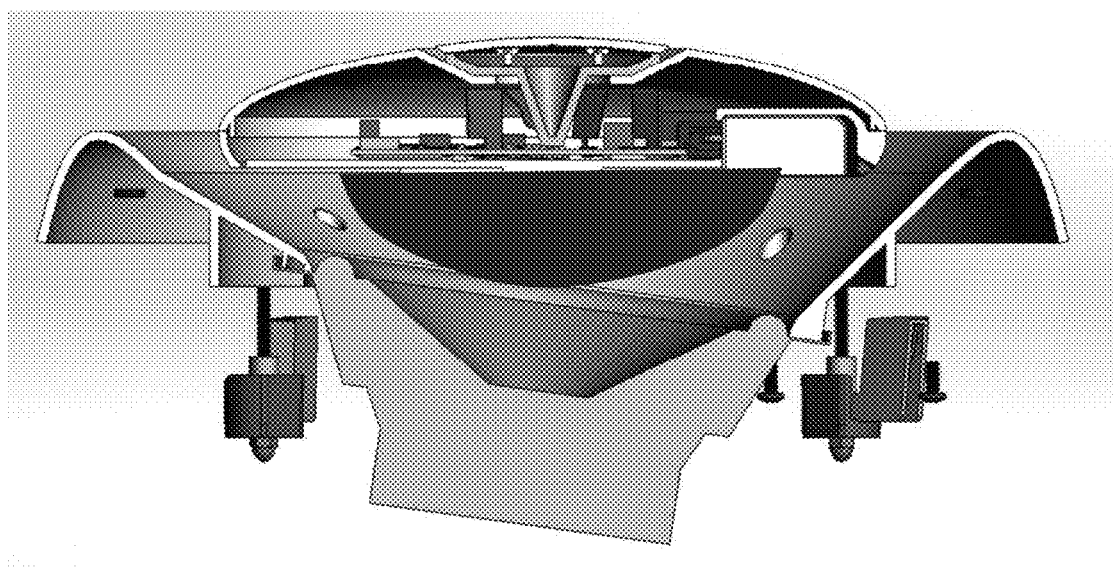

FIGS. 61-63 illustrate variations including different sizes and shapes of central annular reflector regions beneath the AP attachment region (shown as domes, rather than conical acoustic reflectors) of various shapes and sizes.

Figure 64:
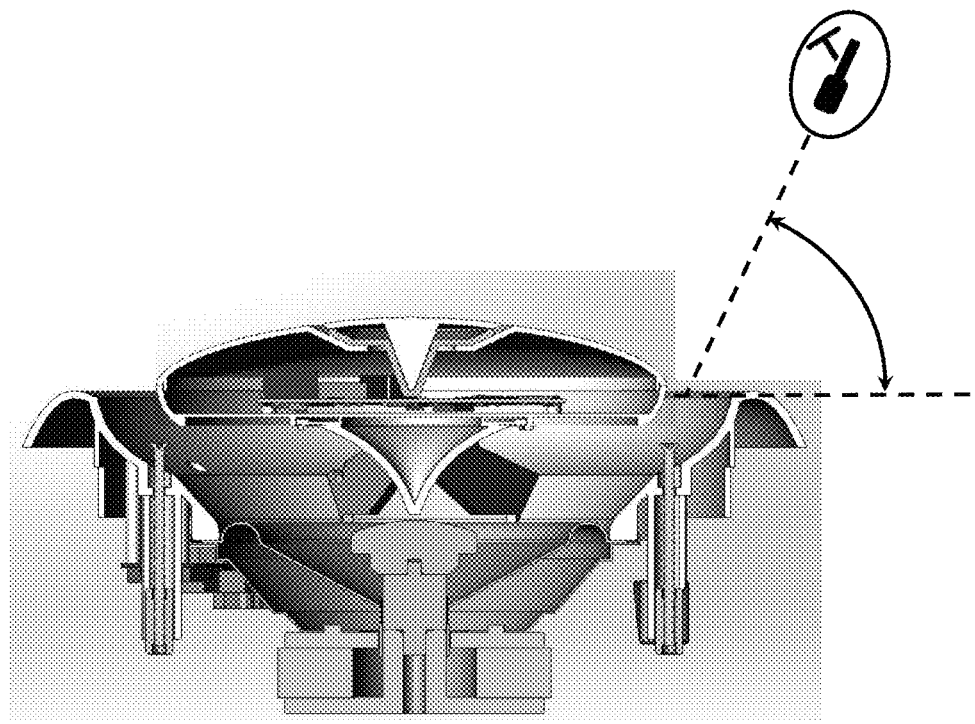
Figure 65:
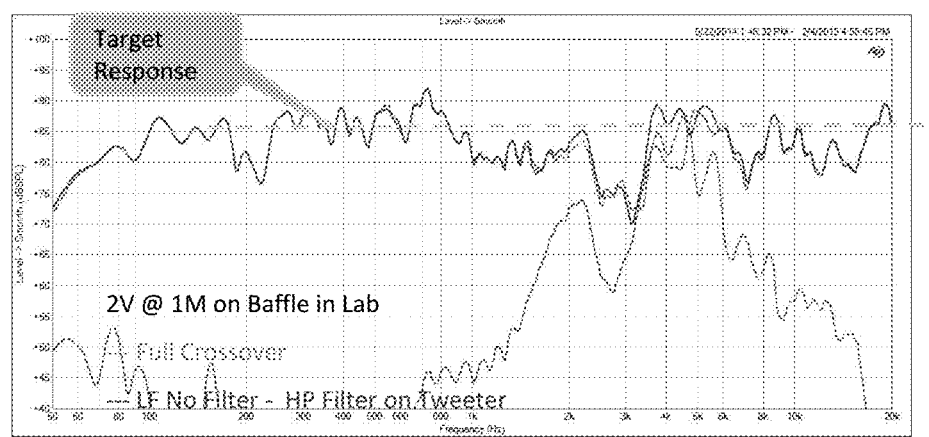
FIG. 65 shows an exemplary frequency response curve.

FIG. 64 is a schematic similar to the variation shown in FIGS. 1-15, and FIG. 65 shows an exemplary frequency response curve measured from a similar prototype. Although there is a reduction in output when the AP (WiFi) is attached to the central waveguide (plastic horn), the apparatus may be implemented without a LF filter, and only use a Mylar Cap and Inductor on Tweeter (HF).

FIG. 66 lists engineering specifications for one example of a compact public address access point apparatus as described herein.

Figure 67:
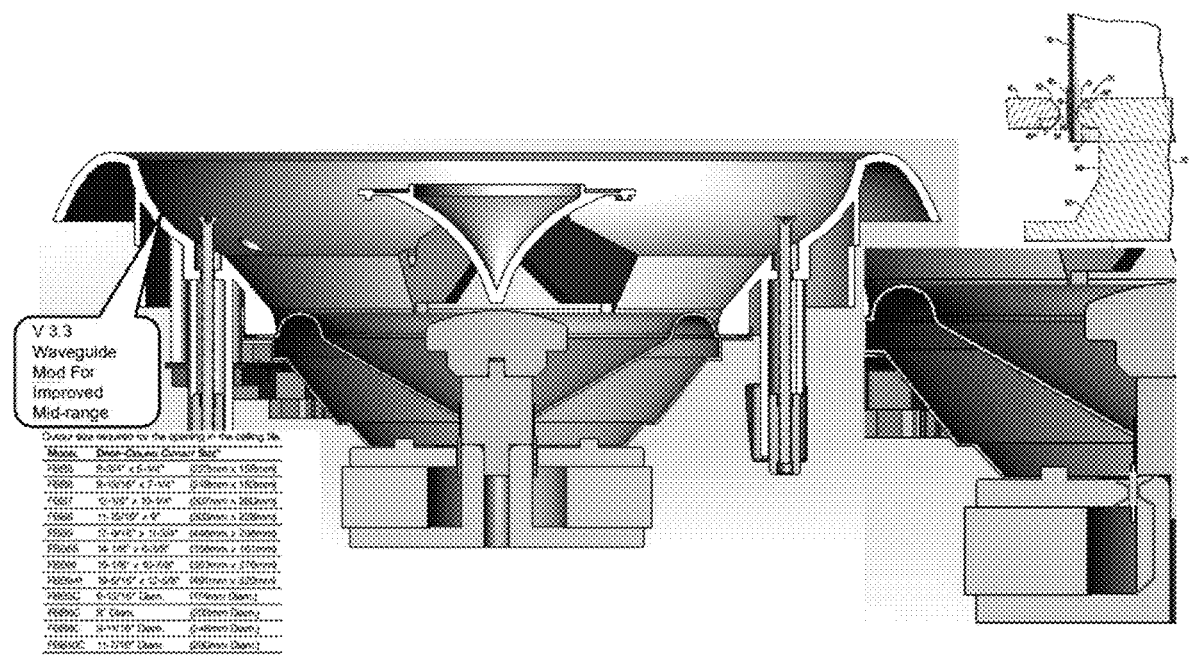
FIG. 67 is section thorough an exemplary compact public address access point apparatus having specs similar to those listed in FIG. 66.

FIG. 67 is section thorough an exemplary compact public address access point apparatus having specs similar to those listed in FIG. 66.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of making a public address from a wireless access point (AP), the method comprising:
    receiving a public address signal indicated for audio broadcast at a compact public address AP apparatus; and
    emitting the public address signal as an audible signal from a speaker of the compact public address AP, wherein the speaker is mounted behind a housing of the AP, the housing enclosing an antenna and radio, so that the audible signal is projected from a front of the speaker and reflected from a conical acoustic reflector positioned between the front of the speaker and the housing of the AP so that the audible signal is directed out of an annular region surrounding the conical acoustic reflector and housing of the AP, wherein the annular region comprises a concave inner wall facing the conical acoustic reflector.

2. The method of claim 1, further comprising wirelessly transmitting the public address signal from a handheld device, wherein the public address signal is indicated for audio broadcast.

3. The method of claim 1, wherein the compact public address AP apparatus concurrently connects a plurality of wireless devices to a network to which the radio of the compact public address AP is connected.

4. The method of claim 1, further comprising receiving an audible response signal from a microphone of the compact public address AP, encoding the audible response signal, and transmitting the encoded audible response signal.

5. The method of claim 4, further wherein transmitting the encoded audible response signal comprises transmitting the encoded audible response signal to a handheld device.

6. The method of claim 4, wherein the radio and antenna of the compact public address AP concurrently emit the public address signal as the audible signal and simultaneously couple one or a plurality of wireless devices to a network using 3×3 MIMO operation in 2.4 GHz, 5 GHz or 2.4 and 5 GHz radio bands.

7. A method of making a public address from a wireless access point (AP), the method comprising:
    wirelessly transmitting a public address signal from a handheld device, wherein the public address signal is indicated for audio broadcast;
    receiving the public address signal at a compact public address AP apparatus; and
    emitting the public address signal as an audible signal from a speaker of the compact public address AP, wherein the speaker is mounted behind a housing of the AP, the housing enclosing an antenna and radio, so that the audible signal is projected from a front of the speaker and reflected from a conical acoustic reflector positioned between the front of the speaker and the housing of the AP so that the audible signal is directed out of an annular region surrounding the conical acoustic reflector and housing of the AP, wherein the annular region comprises a concave inner wall facing the conical acoustic reflector;
    wherein the compact public address AP apparatus concurrently connects a plurality of wireless devices to a network to which the radio of the compact public address AP is connected.

8. The method of claim 7, further comprising receiving an audible response signal from a microphone of the compact public address AP, encoding the audible response, and transmitting the encoded audible response signal.

9. The method of claim 7, further comprising receiving an audible response signal from a microphone of the compact public address AP, encoding the audible response, and transmitting the encoded audible response signal to the handheld device.

10. The method of claim 7, wherein the radio and antenna of the compact public address AP concurrently emit the public address signal as an audible signal and simultaneously couple one or a plurality of wireless devices to a network using 3×3 MIMO operation in the 2.4 GHz, 5 GHz or 2.4 and 5 GHz radio bands.

11. A method of installing a compact public address access point (AP), wherein the compact public address access point includes a speaker surrounded by a frame and an access point housing covering the speaker, further wherein the access point housing encloses a wireless radio and antenna configured to connect a plurality of wireless devices to a network, the method comprising: cutting a hole into a ceiling surface; releasing the access point housing from a speaker assembly of the compact public address access point to expose a conical acoustic reflector positioned between a front of the speaker and the housing of the AP and an annular region comprising a concave inner wall facing the conical acoustic reflector; connecting an Ethernet cable from the ceiling into a main port of the compact public address access point for connection to the network; adjusting a plurality of clamp brackets so that the compact public address AP is held within the hole when the clamp brackets hold the ceiling surface between the clamp bracket and the compact public address AP; and applying data and power through the Ethernet connection to the wireless radio and antenna of the AP.

12. The method of claim 11, wherein cutting the hole into the ceiling surface comprises placing a mounting template against the ceiling surface to guide cutting the hole.

13. The method of claim 11, wherein releasing the access point housing comprises rotating the access point housing relative to the compact public address access point.

14. The method of claim 11, further comprising connecting a second Ethernet cable between the access point housing and the speaker assembly.

15. The method of claim 11, further comprising connecting a USB connector between the access point housing and the speaker assembly.

16. The method of claim 11, further comprising re-attaching the access point housing to the speaker assembly.

17. The method of claim 11, further comprising attaching a safety wire coupled to the compact public address access point to a structural point in the ceiling.

18. The method of claim 11, further comprising concurrently emitting an audible signal from a speaker of the compact public address AP and connecting, via the wireless radio, a plurality of wireless devices to the network.

19. A method of installing a compact public address access point (AP), wherein the compact public address access point includes a speaker surrounded by a frame and an access point housing covering the speaker, further wherein the access point housing encloses a wireless radio and antenna configured to connect a plurality of wireless devices to a network, the method comprising:
   placing a mounting template against a ceiling surface;
   cutting a hole into a ceiling surface;
   releasing the access point housing from a speaker assembly of the compact public address access point to expose a conical acoustic reflector positioned between a front of the speaker and the housing of the AP and an annular region comprising a concave inner wall facing the conical acoustic reflector;
   connecting an Ethernet cable from the ceiling into a main port of the compact public address access point for connection to the network;
   adjusting a plurality of clamp brackets so that the compact public access AP is held within the hole when the clamp brackets hold the ceiling surface between the clamp bracket and the compact public address access point;
   connecting a second Ethernet cable between the AP housing and the speaker assembly;
   connecting a USB connector between the access point housing and the speaker assembly;
   re-attaching the access point housing to the speaker assembly; and
   applying data and power through the Ethernet connection to the wireless radio and antenna of the AP.

20. The method of claim 19, wherein releasing the access point housing comprises rotating the access point housing of the compact public address access point to disconnect it from the compact public address access point.

21. The method of claim 19, further comprising attaching a safety wire coupled to the compact public address access point to a structural point in the ceiling.

22. The method of claim 19, further comprising concurrently emitting an audible signal from a speaker of the compact public address AP and connecting, via the wireless radio, a plurality of wireless devices to the network.

* * * * *